US007769613B2

(12) United States Patent
Han

(10) Patent No.: US 7,769,613 B2
(45) Date of Patent: Aug. 3, 2010

(54) SYSTEM AND METHOD FOR ESTIMATING THE VALUE OF ATHLETE USING GAME ACHIEVEMENT EVALUATION MODEL

(76) Inventor: Pil-Soo Han, # 320, Hanyang Univ Center for Business Incubation, 1271 Sa-3dong, Sangnok-gu, Aansan-si, Gyeonggi-do (KR) 426-910

( * ) Notice: Subject to any disclaimer, the term of this patent is extended or adjusted under 35 U.S.C. 154(b) by 1373 days.

(21) Appl. No.: 10/538,670

(22) PCT Filed: Apr. 7, 2005

(86) PCT No.: PCT/KR2005/000998
§ 371 (c)(1),
(2), (4) Date: Jun. 10, 2005

(87) PCT Pub. No.: WO2005/121995
PCT Pub. Date: Dec. 22, 2005

(65) Prior Publication Data
US 2007/0005331 A1    Jan. 4, 2007

(30) Foreign Application Priority Data
Jun. 7, 2004    (KR) ...................... 10-2004-0041350

(51) Int. Cl.
*G06F 17/30*    (2006.01)
(52) U.S. Cl. .............................. 705/7; 705/10; 434/219
(58) Field of Classification Search ................... None
See application file for complete search history.

(56) References Cited

U.S. PATENT DOCUMENTS

| | | | | |
|---|---|---|---|---|
| 5,018,736 A | * | 5/1991 | Pearson et al. ................. | 463/29 |
| 5,713,793 A | * | 2/1998 | Holte ........................... | 463/25 |
| 6,371,855 B1 | * | 4/2002 | Gavriloff ..................... | 463/42 |
| 7,458,093 B2 | * | 11/2008 | Dukes et al. ................. | 725/141 |
| 2004/0110552 A1 | * | 6/2004 | Del Prado ..................... | 463/4 |

FOREIGN PATENT DOCUMENTS

WO        WO 9737734 A1 * 10/1997

OTHER PUBLICATIONS

Kahn LM (1993). Managerial quality, team success, and individual player performance in major league baseball. Industrial & Labor Relations Review. 46(3): 531-547.*
Mullin CJ and Dunn LF (2002). Using baseball card prices to measure star quality and monopsony. Economic Inquiry. 40(4): 1-18.*
Faurot DJ and McAllister S (1992). Salary arbitration and pre-arbitration negotiation in major league baseball. Industrial and labor relations Review. 45(4): 697-710.*
Yilmaz MR and Chatterjee S (2003). Salaries, performance, and owner's goals in major league baseball: A view through data. Journal of Managerial Issues. 15(2): 243-255.*

* cited by examiner

*Primary Examiner*—Romain Jeanty
*Assistant Examiner*—Brett Feeney
(74) *Attorney, Agent, or Firm*—The Farrell Law Firm, LLP

(57) ABSTRACT

The present invention relates to a system and method for estimating the value of athletes using a game achievement evaluation model, wherein objectified quality evaluation is performed including a game situation classified into attack addition, attack subtraction, defense addition and defense subtraction, game factors are defined based on the classified factors, the assignment principle is set, the game factors are subclassified into game situation factors, and the game factors and the game situation factors are given with weights, unlike quantity-based record evaluation by an existing athlete contribution evaluation method. The existing record input method is dependent upon quantitative record only, and thus does not include situation information on how player plays a game under what situation.

5 Claims, 6 Drawing Sheets

SYSTEM AND METHOD FOR ESTIMATING THE VALUE OF ATHLETE USING GAME ACHIEVEMENT EVALUATION MODEL

TECHNICAL FIELD

The present invention relates to a system and method for estimating the value of athletes using a game achievement evaluation model, and more particularly, to a system and method for estimating the value of athletes using a game achievement evaluation model, wherein objectified quality evaluation is performed in such a manner that a game situation is classified into attack addition (contribution), attack subtraction (error), defense addition (contribution) and defense subtraction (error), 129 game factors are defined based on the classified factors, the assignment principle is set, the game factors are sub-classified into 1277 game situation factors, and the game factors and the game situation factors are given with weights, unlike quantity-based record evaluation by an existing athlete contribution evaluation method.

BACKGROUND ART

Generally, annual salary calculation (evaluating the value of athletes) is decided through a process in which the game capability contributed by athletes, the publicity of a team, the capability of mobilizing spectators, and the future game capability are selected as evaluation items, game contents of athlete during play are sub-divided and evaluation of merits is averaged in order to perceive them, external game factors are added fixed based on them, and both a ball club and athletes discuss about the merits and demerits related to the annual salary while confronting with each other. In selecting the game capability having the highest important thing as the evaluation items and then applying it, however, the athlete and the ball club have a competitive position about the amount of the salary due to their subjective positions even after an agreement is reached. Thus, the amount of profits held by both is in reverse proportion to each other.

This results in a distributive outcome in which the greater the profit given to one side, the smaller the profit given to the other side even after the agreement is reached. The fundamental cause of this problem lies in that there does not exist a common objective calculation method in which the evaluation items of the game capability are sub-divided and evaluation of merits is decided. That is, existing evaluation methods are obviously inclined to be subjective. Due to this, points that must be recognized as the merits to both sides are recognized as damages of a concerned party.

As such, in professional sports industry, although a harmonious annual salary agreement in both sides is the most urgent and acute problem from the viewpoint of sports industry development, there is not a mediation tool, i.e., a direct calculation model, which is a program related to annual salary calculation. Of course, if an agreement is broken off in a wage negotiation procedure, there are several methods for solving a dispute, such as a mediation or arbitration method of helping concerned parties to reach an agreement through negotiations and bargaining, a method of allowing a third party to assist decision making, a method of allowing the legitimate authority within an organization to make decision as a substitute, and a lawsuit method in which a dispute is solved according to a strict law court procedure by a judicial officer based on public power of the country. These methods are, however, insufficient to evaluate the degree of contribution by athletes in an objective manner.

In existing searches ("Annual Salary Calculation Model of Korean Baseball Athlete" by Kim Eung-Sik, a doctoral thesis of SUNGKYUNKWAN UNIVERSITY GRADUATE SCHOOL, 1998, "Development of Annual Salary Calculation Model of Korean Football Athlete" by Sin Mun-Sun, a doctoral thesis of SEJONG UNIVERSITY GRADUATE SCHOOL, (2003), in order to present the annual salary calculation model, annual salary calculation types that are practiced in respective ball clubs are analyzed, and how much are internal and external factors affecting annual salary calculation occupied in annual salary calculation by what percentage based on opinions regarding annual salary calculation of pertinent ball clubs through questionnaires. They, however, do not present any tool capable of calculating factors that describe the annual salary only based on game achievements being the internal results of athletes. In other words, in existing game achievement record methods, only a quantitative record based on quantitative values is carried out on the basis of the capability of an athlete. There does not exist a qualitative record met hod considering a relative side including negative values of internal game achievements being an actual ability of an athlete.

Therefore, there is a need for a model which can generates and present factors becoming the basis for a model necessary for annual salary negotiations by developing a method capable of recording, evaluating and recording the ability of athletes in a qualitative manner.

Meanwhile, a procedure for annual salary trade of professional basketball athletes will now be described. In case of U.S. NBA (National Basketball Association), an agent is entrusted with negotiations. In case of KBL (Korea Basketball League), an agent is not permitted for negotiations. A concerned party directly negotiates through discussion with the family, etc. Thus, the concerned party is fundamentally weak in legal problems generated when an agreement is reached or is broken off. As a result, the athlete is not well prepared for negotiations compared to the persons related to ball clubs, who have relatively lot of experience. Furthermore, under the situation in which there does not exist proper annual salary calculation that can be used for a negotiation process, the contracting parties have to understand each other based on a formal calculation method. This makes the contracting parties to have unclear feelings even after the annual salary agreement is reached. It is estimated that this phenomenon results from the fact that the contracting parties negotiate only formal results in a state where qualitative contents depending on situations occurring during play are not considered because an existing writing method of recording game contents can perform only quantitative calculation.

Accordingly, an athlete evaluation tool, which sufficiently considers vocational characteristics of athletes, gropes for the rationality in view of business management of ball clubs, and is needed for a wage negotiation procedure that induces common people to actively participate in the procedure, is very important. There are, however, almost no precedent researches into this tool due to absence in the necessity, a difficulty in performing the researches, etc.

Furthermore, if professional sports are to be advanced, a dissonance between ball club and athletes is small, a measurement tool capable of exactly determining an actual ability of an athlete must be developed, and a system in which the tool is transferred to spectators must be precedent. In this case, the spectators will have more interest in sports games. Game factors and an athlete evaluation formula for current athlete evaluation, however, are subjective, and have a limit to the use rationally. Since basketball was originally invented, game rules were set, and game was played among groups, research matters for the development of factors necessary to evaluate athlete are wholly lacking. Corporation aggregates that manage professional leagues or respective ball clubs have made an effect to manipulate and change the game factors from the viewpoint of spectators, but rarely have strived to develop a model in which spectators, athletes and leaders are made get interested, and game results are analyzed and adapted. That is, the existing athlete evaluation method set an absolute reference and does not use other subjective and willful evaluation.

However, this method is impossible to present probability data based on game achievement since it is not a method in which game contents are not recorded on a situation basis. It is thus inevitable that all factors including athlete directions of directors or coaches and operation conception during play are subjected to sensual, subjective and empirical decision. This situation causes distrust among parties concerned due to the unreasonable evaluation method in which low annual salary is provided contrary to good game achievement in deciding the athlete annual salary. As such, there is a problem in that such a behavior in which a fundamental problem of sports has not been researched adds confusion in perceiving and understanding spectators.

Furthermore, in the Korean baseball industry, the position-based power ranking formula of Sports Chosun, which is a method of evaluating the ability of athletes will now be examined. In this method, records of athletes are converted on the basis of 40 minutes, the ran kings are decided on an item basis, and all the ranks are summed to decide the ranking. If the sum is lower, it belongs to higher ranking. The reason why the 40-minute unit is adopted instead of an average game record in the basis method is that an average game participation time is different every athlete. In other words, an athlete who participates in game for average 30 minutes and an athlete who participates in game for average 20 minutes cannot be compared in a simple manner. Accordingly, a total of game participation time is converted into the number of games and is then divided by records. That is, in this method, an athlete is evaluated based on a record that is obtained on average per game. Instead, an athlete who has lots of game participation time is considered to have a high degree of contribution to a team. Thus, an average game participation time item is created and included in the total record. Such an evaluation formula can be expressed into "record×40/total game participation time)=ranking.

In Sports Chosun newspaper (dated Feb. 14, 2003), in evaluating the ability of an athlete, items that belong to a common evaluation factor in each position includes game participation time, the number of successful two-point shoots, the ratio of successful two-point shoots, the ratio of successful free throw, assists, fouls, snatches, errors and scores; the number of successful three-point shoots, the ratio of successful three-point shoots and rebounds when evaluating point guard, shooting guard and small forward; and attack rebound, defense rebound and block shooting, which are additional evaluation factors, when evaluating power forward and center. On the assumption that a position-based role can be identified in a game, it is reasonable to decide the ranking using other references depending upon positions.

As such, Power Ranking is useful in a sense. As athletes having different positions cannot be compared, however, there is a disadvantage in that the whole athletes cannot be compared with each other.

First, rank values vary according to the numerical values of the same items depending upon which position does an athlete has. It is thus not meaningful to compare athletes that belong to different categories, i.e., have different positions. In order to evaluate the total ranking of athletes, all the athletes must be evaluated equally based on objectified numerical values not the rank selection method. Other references applied to respective positions must be objective classifications that are obtained through various opinions. If they do not have the objectivity, application to other references on a position basis may result in significant error.

Second, if the rank is selected based on absolute numerical values upon selection of parameters, a problem arises. An example is as follows.

| A | B |
|---|---|
| Total number of 2 points; Number of successful 2 points; The ratio of successful 2 points | |
| 200:100:50% | 100:80:80% |

Assuming that the above table was obtained under the condition in which two players A, B have the same game participation time, considering the number of successful 2 points and considering the ratio of successful 2 points, in evaluating the two athletes, will have different results depending upon situation. If a team of the player A is strong in rebound, the player A can be evaluated to have a higher ratio of team contribution than that of the player B. On the contrary, if the team of the player A is weak in rebound, the player B can be evaluated to have a higher ratio of team contribution than that of the player A. That is, if the team of the player A is strong in rebound, it will be given with a re-attack chance if the number of shoot throws is many. If the team of the player A is weak in rebound, the exactness of shoot will become a cause of victory and defeat. As a result, although the shoot ratio is lowered, there occurs a case where it does not significantly affect victory and defeat. It cannot be said that the higher the shoot ratio, the higher a cause of victory. It is thus unreasonable to evaluate the superiority and disadvantageous of athletes based on the shoot ratio.

Further, in equal comparison, if an athlete who is low in the shoot ratio has higher goals than that of an object athlete, this can also be said to be the degree of contribution, which is comparable to the shoot ratio. That is, when commanding shooting in a basketball game, a shooter should not shoot at random although there is a shooting chance. Only when shooting is attempted considering whether rebound of a team has be en secured when commanding shooting, whether a re-attack right is secured is decided when a ball does not pass through a ring. Thus, only when all shootings related to field shooting are made when they can be checked, game rhythm of a team will be kept. Accordingly, if any team gains an advantage over an opponent team in attack rebound, it can be said that athletes having a high score can be evaluated to have increased the degree of contribution to a team regardless of the shoot ratio when the shooting is one compatible with the above condition. As such, various analyses are possible under various conditions. Resultantly, since under what condition the athlete A and the athlete B have scored is not considered, it is difficult to exactly evaluate the value of score. The meaning of the evaluation of the athlete is also low. That is, if the values of shooting must be compared not the shoot ratio, the degree of contribution to a team by the athletes will be evaluated depending upon when shooting made by a shooter has a big difference in score, when it is in a seesaw situation or a tie situation, or shooting is successful in a reversal chance. Furthermore, evaluation can be different depending upon shooting by assist of a co-player, or shooting by an individual skill of self-effort. It will be contradiction to say that evaluation is efficiency although it is simple and clear.

Third, rebound is classified into defense and attack in the evaluation factors of power forward and center. It is considered that it is meaningless to divide the rebound under the condition in which there is no additional weight. Although it exists, fouls having a high frequency of occurrence have to be classified into foul that permit a free throw, foul that dos not permit a free throw, foul that provides even free throw permission and attack right, and the like. As such, since erroneous classification may change the rank of contribution among athletes, and influence athlete persons, careful attention must be paid.

Accordingly, evaluation based on game achievements of athletes is a measure to evaluate the athletes. It is necessary to minimize contradiction and to perform objectification through verification.

DISCLOSURE OF INVENTION

Accordingly, the present invention has been made in view of the above problems occurring the prior art, and it is an object of the present invention to provide a system and method for estimating the value of athletes using a game achievement evaluation model, wherein objectified quality evaluation is performed in such a manner that a game situation is classified into attack addition (contribution), attack subtraction (error), defense addition (contribution) and defense subtraction (error), 129 game factors are defined based on the classified factors, the assignment principle is set, the game factors are sub classified into 1277 game situation factors, and the game factors and the game situation factors are given with weights, unlike quantity-based record evaluation by an existing athlete contribution evaluation method.

Another object of the present invention is to provide a system and method for estimating the value of athletes using a game achievement evaluation model, wherein what achievement obtained by one athlete is generated in which situation can be exactly bolki and the flow of game can be estimated according to a newly developed athlete evaluation formula unlike an existing record input method which is usually dependent upon quantitative record, and does not have situation information on how an athlete plays game under what situation.

Further another object of the present invention is to provide a system and method for estimating the value of athletes using a game achievement evaluation model, wherein 129 game factors and 1277 game situation factors are sub-divided to record actual results of athletes, lots of situation factors are presented unlike an existing play record method that makes an attempt to describe lots of things through a small number of game factors, and the situation factors are objectified on a situation basis using weight, helping finding meaningful underground factors, whereby a more efficient annual salary calculation model than an existing athlete contribution evaluation method can be presented.

Further another object of the present invention is to provide a system and method for estimating the value of athletes using a game achievement evaluation model, wherein in generating weights in order to evaluate the degree of contribution by athletes, an average is not used as a representative value, but weights are divided by 400 so as to represent that final analysis results are equal to numerical values of goal scores considering the sensitiveness for the number of goal using a median, thereby increasing the sensitivity for the number of athletes and reducing the feeling of refusal Still another object of the present invention is to provide a system and method for estimating the value of athletes using a game achievement evaluation model, wherein if users, baseball players, baseball-related institutes, baseball ball clubs and press (sports) institutes request the degree of athlete contribution by athletes or athlete ball clubs, a settlement number is authenticated in financial institute/credit card companies/mobile communication company billing servers before settlement, settlement is performed in a payment system server, and a communication service company server transmits settlement information, transmission information, etc. to corresponding terminals and servers via e-mail, SMS of mobile phones, or the messenger.

To accomplish the objects of the present invention, there is provided a system for estimating the value of athletes using a game achievement evaluation model, the system comprising: a manager server having a function of receiving a member joining request when a user, a baseball player, a baseball-related institute, a basketball ball club and a press (sports) institutes have access to a web site in order to know the degree of contribution for qualitative evaluation of the athletes or the athlete ball clubs for the purpose of annual salary calculation of professional athletes, the scout of amateurs and mercenary scout, an athlete draft, an athlete trade, etc., a function of registering members and assigning Ids to the members, a function of storing and managing the members who joined the web site in a manager server DB, and a function of, with the degree of contribution by the athletes being classified into attack addition (contribution), attack subtraction (error), defense addition (contribution) and defense subtraction (error) according to game situations, setting 129 game factors based on the classified factors, setting the game factors to detailed 1277 game situation factors, assigning numerical values to the game factors and the game situation factors with a different weight, and sending quantitative results to a corresponding server or terminal if the user, the baseball player, the baseball-related institute, the basketball ball club and the press (sports) institutes request the results through the server or terminal; a user terminal having a function of having access to a web site within the manager server to make requests for member joining in order to know the degree of contribution for qualitative evaluation of the athletes or the athlete ball club for the purpose of annual salary calculation of the professional athletes, the scout of amateurs and mercenary scout, the athlete draft, the athlete trade, etc., a function of being assigned with an ID from the manager server after becoming a member, and a function of requesting the degree of quantitative contribution of the athletes to the manager server, and receiving the degree of contribution data of the athletes; a baseball player terminal having a function of having access to a web site within the manager server to make requests for member joining in order to know the degree of contribution for qualitative evaluation of the athletes or the athlete ball club for the purpose of annual salary calculation of the professional athletes, the scout of amateurs and mercenary scout, the athlete draft, the athlete trade, etc., a function of being assigned with an ID from the manager server after becoming a member, and a function of requesting the degree of quantitative contribution of the athletes to the manager server, and receiving the degree of contribution data of the athletes; a baseball-related institute server having a function of having access to a web site within the manager server to make requests for member joining in order to know the degree of contribution for qualitative evaluation of the athletes or the athlete ball club for the purpose of annual salary calculation of the professional athletes, the scout of amateurs and mercenary scout, the athlete draft, the athlete trade, etc., a function of being assigned with an ID from the manager server after becoming a member, and a function of requesting the degree of quantitative contribution of the athletes to the manager server, and receiving the degree of contribution data of the athletes; a basketball ball club server having a function of having access to a web site within the manager server to make requests for member joining in order to know the degree of contribution for qualitative evaluation of the athletes or the athlete ball club for the purpose of annual salary calculation of the professional athletes, the scout of amateurs and mercenary scout, the athlete draft, the athlete trade, etc., a function of being assigned with an ID from the manager server after becoming a member, and a function of requesting the degree of quantitative contribution of the athletes to the manager server, and receiving the degree of contribution data of the athletes; a press (sports) institute server having a function of having access to a web site within the manager server to make requests for member joining in order to know the degree of contribution for qualitative evaluation of the athletes or the athlete ball club for the purpose of annual salary calculation of the professional athletes, the scout of amateurs and mercenary scout, the athlete draft, the athlete trade, etc., a function of being assigned with an ID from the manager server after becoming a member, and a function of requesting the degree of quantitative contribution of the athletes to the manager server, and receiving the degree of contribution data of the athletes; a financial institute/credit card company/mobile communication company billing server having a function of receiving an authentication request for one or a plurality of financial information, card information and mobile communication information, which are settlement numbers of the user, the baseball player, the baseball-related institute, the basketball ball club and the press (sports) institute, from the manager server, and a function of comparing one or a plurality of financial information, card information and mobile communication information with information stored in a corresponding database among the financial institute server, the credit card company server and the mobile communication company billing server, and sensing the authentication result to the manager server; a payment system server having a function of receiving one or the plurality of the settlement numbers among the user, the baseball player, the baseball related institute, the basketball ball club and the press (sports) institute, who are authenticated by the financial institute/credit card company/mobile communication company billing server, from the manager server, and a function of confirming the settlement number and then sending the settlement results to the manager server; and a communication service company server having a function of receiving the degree of contribution information of the players and the settlement information from the manager server after being settled by the settlement system server, and a function of sending the degree of contribution information by the players and the settlement information, which are received from the manager server, to a terminal, a user or a baseball player mobile phone of the user, the baseball player, the baseball related institute, the basketball ball club and the press (sports) institute via e-mail, SMS of a mobile phone, a messenger, etc.

There is provided a system as claimed in claim 1, wherein the manager server comprises:

a member subscription unit for allowing the user, the baseball player, the baseball-related institute, the baseball ball club, the press (sports) institute, etc. to request member joining through the server or terminal; a member permission unit for authorizing the member joining, and then assigning an ID to the member; a member information database (DB) for storing and managing members; an athlete contribution degree database (DB) for storing and managing the degree of contribution by athletes; a game factor unit including an attack addition game factor unit indicating attack contribution portions such as team morale increase contribution addition generated by a game situation of an athlete, an attack subtraction game factor unit indicating attack error portions such as point acquisition cancellation error subtraction, a defense addition game factor unit indicating defense contribution portions such as full possible losing point dissipation contribution addition, and a defense subtraction game factor unit indicating defense error portions such as full self-blame possible losing point error subtraction; an 1277 game situation factor unit including an attack addition game situation factor unit indicating detailed items of attack addition game factors indicating attack contribution portions generated by a game situation of an athlete, an attack subtraction game situation factor unit indicating detailed items of attack subtraction game factors indicating attack error portions, a defense addition game situation factor unit indicating detailed items of defense addition game factors indicating defense contribution portions, and a defense subtraction game situation factor unit indicating detailed items of defense subtraction game factors indicating defense error portions; a median setting unit for setting representative values for respective detailed items that constitute the game factor unit and the game situation factor unit; a weight setting unit for multiplying the game factor median and the game situation fact or median set in the median setting unit; and a contribution degree calculation unit for calculating the degree of contribution by athletes based on a difference between addition factors including contribution factors for attack and defense addition to which weights are applied, and subtraction factors including error factors for attack and defense subtraction to which weights are applied.

To accomplish the objects of the present invention, A method of estimating the value of athletes using a game achievement evaluation model, wherein a member subscription process comprises the steps of:

allowing one or a plurality of a user, a baseball player, a baseball-related institute, a basketball ball club and a press (sports) institute to have access to a web site through a manager server; allowing one or a plurality of the user, the baseball player, the baseball-related institute, the basketball ball club and the press (sports) institute to make requests for member joining to a member subscription unit; allowing a member permission unit of the manager server to decide whether to allow authorization; if the authorization is not allowed, allowing the member joining to be rejected, and if the authorization is allowed, allowing the member joining to be allowed; if one or a plurality of the user, the baseball player, the baseball-related institute, the basketball ball club and the press (sports) institute is allowed to be a member, allowing the manager server to assign IDs to one or a plurality of terminals or servers of the user, the baseball player, the baseball-related institute, the basketball ball club and the press (sports) institute through the member permission unit; and allowing the manager server to store the Ids in the member information database.

Also a method of estimating the value of athletes using a game achievement evaluation model, wherein a value calculation process comprises the steps of:

(a) allowing a game factor unit within a manager server to set attack addition game factors of 41 items, attack subtraction game factors of 34 items, defense addition game factors of 30 items and defense subtraction game factors of 24 items;
(b) allowing a game situation factor unit within the manager server to set game situation factors of 1227 items for each of the items of the attack addition game factors, the items of the attack subtraction game factors, the items of the defense addition game factors and the items of the defense subtraction game factors; (c) allowing a median setting unit within the manager server to set the median for each of the game factors and the game situation factors under the game situation principle for the attack addition game factors, the attack subtraction game factors, the defense addition game factors and the defense subtraction game factors; (d) allowing a weight setting unit within the manager server to set weight for each of the game situation factors under the game situation principle for the attack addition game factors, the attack subtraction game factors, the defense addition game factors and the defense subtraction game factors to (each game factor median×each game situation factor median)÷400; (e) allowing a contribution degree calculation unit within the manager server to calculate the degree of game contribution by the athletes from the game situation factors, the weight, etc, as addition factors (a game situation factor×a corresponding weight)−a subtraction factor (a game situation factor×a corresponding weight); and (f) calculating the value of the athletes based on the degree of game contribution.

Furthermore, the method as claimed in claim 4, wherein in step (a), detailed items of the attack addition game factor unit include full shooting capture ability contribution addition, shooting chance capture ability contribution addition, possible losing point removal contribution addition, full team morale-inspired contribution addition, team morale-inspired contribution addition, high degree-skill contribution addition, full disadvantage overcome ability contribution addition, disadvantage overcome ability contribution addition, disadvantage overcome fail contribution addition, full point-possible securing contribution addition, score-possible providing contribution addition, score record cancellation-considered contribution addition, full score chance ability loss contribution addition, point chance ability loss contribution addition, alternate score additional contribution addition, lucky score addition contribution addition, indirect chance fostering contribution addition, direct chance assistance contribution addition, indirect chance sacrifice contribution addition, direct chance sacrifice contribution addition, athlete defense shrinkage contribution addition, opponent team defense shrinkage contribution addition, attack time re-application contribution addition, full point cooperation contribution addition, point cooperation contribution addition, teamwork completion cooperation contribution addition, teamwork cooperation contribution addition, positive participation contribution addition, shooting chance cooperation contribution addition, full shooting chance cooperation contribution addition, swift attack cooperation contribution addition, full swift attack cooperation contribution addition, possession acquisition contribution addition, free throw possession ability contribution addition, full possession acquisition contribution addition, possession acquisition-side contribution addition, score record acquisition contribution addition, opponent teamwork degeneracy contribution addition, opponent team formation obstruction contribution addition, opponent defense disturbance contribution addition and right shooting timing contribution addition; detailed items of the attack subtraction game factor unit include point acquisition cancellation error subtraction, direction team-moral degeneracy error subtraction, indirect team moral degeneracy error subtraction, possession-possible chance removal error subtraction, possession loss providing error subtraction, indirect possession loss providing error subtraction, possession loss-possible providing error subtraction, possible losing point providing error subtraction, indirect possible losing point providing error subtraction, full possible losing point providing error subtraction, score-possible removal error subtraction, indirect score-possible removal error subtraction, full score chance dissipation error subtraction, indirect score chance dissipation error subtraction, general full score chance dissipation error subtraction, general indirect score chance dissipation error subtraction, game basic capability lack error subtraction, score addition chance dissipation error subtraction, victory factor removal error subtraction, unreasonable shooting attempt error subtraction, right shooting timing lack error subtraction, teamwork cooperation lack error subtraction, full teamwork cooperation lack error subtraction, positive participation lack error subtraction, full positive participation lack error subtraction, prediction ability lack error subtraction, personal defense shrinkage load error subtraction, team member personal defense shrinkage load error subtraction, team defense shrinkage degeneracy error subtraction, teamwork lowering fostering error subtraction, teamwork formation obstruction error subtraction, instant chance cooperation lack error subtraction, opponent swift attack-possible chance assignment error subtraction and opponent free throw-possible assignment error subtraction; detailed items of the defense addition game factor unit include full possible losing point dissipation contribution addition, possible losing point dissipation contribution addition, full losing point allowance dissipation contribution addition, possession acquisition-possible assignment contribution addition, shooting fail factor assignment contribution addition, full shooting fail factor assignment contribution addition, shooting mental shrinkage contribution addition, counter team morale lowering contribution addition, direct the other party morale lowering contribution addition, possible losing point previous removal contribution addition, game rhythm interception contribution addition, teamwork stability opponent assignment contribution addition, losing point minimum-possible assignment contribution addition, optimal defense ability contribution addition, full optimal defense ability contribution addition, defense positive participation contribution addition, full defense positive participation contribution addition, teamwork assistance contribution addition, error inducing factor assignment contribution addition, full error-inducing assignment contribution addition, score chance-possible assignment contribution addition, full score-possible assignment contribution addition, the other party personal defense shrinkage contribution addition, opponent team defense shrinkage contribution addition, defense confusion recovery contribution addition, possession acquisition contribution addition, opponent teamwork formation obstruction contribution addition, opponent team member formation obstruction contribution addition, swift attack-possible chance providing contribution addition and positive sacrifice participation contribution addition; and detailed items of the defense subtraction game factor unit include minimum self-blame losing point assignment error subtraction, full self-blame losing point assignment error subtraction, full self-blame possible losing point error subtraction, maximum self-blame losing point assignment error subtraction, countermeasure absence losing point error subtraction, countermeasure absence possible losing point error subtraction, countermeasure absence-inducing error subtraction, assistance self-blame losing point-considered error subtraction, assistance self-blame-possible losing point-considered error subtraction, situation coping ability lack error subtraction, assistance coping ability lack error subtraction, basic defense ability lack error subtraction, indirect opponent team morale-inspired error subtraction, direct opponent team morale-inspired error subtraction, personal defense shrinkage error subtraction, personal defense shrinkage fostering error subtraction, team defense shrinkage fostering error subtraction, mentality control ability lack error subtraction, opponent teamwork consolidation chance providing error subtraction, teamwork collapse curse providing error subtraction, possible losing point increase-induced error subtraction, game flow prevention ability lack error subtraction, team-pattern confusion assignment error subtraction and team member formation difficulty providing error subtraction 9.

Moreover the method as claimed in claim 4, wherein in step (b), the game situation factors for the items of the attack addition game factors, the items of the attack subtraction game factors, the items of the defense addition game factors, and the items of the defense subtraction game factors are divided into 7 items, 13 items, 21 items, 5 items, 9 items, 12 items and 4 items, the 7 items are contribution in disadvantageous point (over −7) situation, contribution in advantageous point (over +7) situation, contribution in disadvantageous point seesaw approach (−6~−4) situation, contribution in advantageous point seesaw approach (+6~+4) situation, contribution in disadvantageous point seesaw (−1~−3) situation, contribution in advantageous point seesaw (+1~+3) situation and contribution in tie situation; the 13 items are contribution in disadvantageous point (over −7) situation, contribution in advantageous (over +7) situation, disadvantageous point seesaw approach (−6~−4) entry possible contribution in an advantageous point situation (over −7), disadvantageous point situation (over +7) entry-possible contribution in a disadvantageous point seesaw approach situation (+6~+4), contribution within disadvantageous point seesaw approach (−6~−4) in disadvantageous point seesaw approach (−6~−4) situation, possible contribution within disadvantageous point seesaw approach (+6~+4) in a seesaw approach (+6~+4) situation, disadvantageous point seesaw situation (−1~−3) entry-possible contribution in an advantageous point seesaw approach situation (−6~−4), disadvantageous point seesaw approach situation (+6~+4) entry-possible contribution in a disadvantageous point seesaw situation (+1~+3), possible contribution within a disadvantageous point seesaw situation (−1~−3) in a disadvantageous point seesaw situation (−1~−3), possible contribution within a disadvantageous point seesaw situation (+1~+3) in a disadvantageous point seesaw situation (+1~+3), tie situation entry-possible contribution in a disadvantageous point seesaw situation (−1~−3), disadvantageous point seesaw situation (+1~+3) entry-possible contribution in a tie situation, and disadvantageous point seesaw situation (+1~+3) entry-possible contribution in a disadvantageous point seesaw situation (−1~−3); the 21 items are Point in disadvantageous point (over −7) situation, Point in advantageous (over +7) situation, a disadvantageous point seesaw approach (−6~−4) entry point in an advantageous point situation (over −7), a disadvantageous point situation (over +7) point in a disadvantageous point seesaw approach (+6~+4) situation, a point within a disadvantageous point seesaw approach (−6~−4) in an advantageous point seesaw approach (−6~−4) situation, a point within a disadvantageous point seesaw approach (+6~+4) in a disadvantageous point seesaw approach (+6~+4) situation, a disadvantageous point seesaw situation (−1~−3) point in a disadvantageous point seesaw approach (−6~−4) situation, a disadvantageous point seesaw approach situation (+6~+4) point in a disadvantageous point seesaw situation (+1~+3), a point within a disadvantageous point seesaw situation (−1~−3) in a disadvantageous point seesaw situation (−1~−3), a point within a disadvantageous point seesaw situation (+1~+3) in a disadvantageous point seesaw situation (+1~+3), a tie situation point in a disadvantageous point seesaw situation (−1~−3), a disadvantageous point seesaw situation (+1~+3) point in a tie situation, a disadvantageous point seesaw situation (+1~+3) point in a disadvantageous point seesaw situation (−1~−3), a tie point simultaneously with attack time end or quarter end in a disadvantageous seesaw situation (−1~−3), a reverse point simultaneously with attack time end or quarter end in a disadvantageous seesaw situation (−1~−3), a reverse point simultaneously with attack time end or quarter end in tie situation, a tie point in last attack with game end time being left several seconds in a disadvantageous seesaw situation (−1~−3), a reverse point in last attack with game end time being left several seconds in a tie situation, a tie point simultaneously with game end buzzer in a disadvantageous seesaw situation (−1~−3), a reverse point simultaneously with game end buzzer in a disadvantageous seesaw situation (−1~−3) and a reverse point simultaneously with game end buzzer in tie situation; the 5 items are one foul record, a second foul record, a third foul record, a fourth foul record and a walkout foul record; the 9 items are walk-out in extra game and one or more participation stops, walk-out after five minutes in the fourth quarter, walk-out before five minutes in the fourth quarter, walk-out after five minutes in the third quarter, walk-out before five minutes in the third quarter, walk-out after five minutes in the second quarter, walk-out before five minutes in the second quarter, walk-out after five minutes in the first quarter, and walk-out before five minutes in the first quarter; the 12 items are shooting error in a disadvantageous point (over −7) situation, shooting error in an advantageous point (over +7) situation, shooting error in a disadvantageous point seesaw approach (−6~−4) situation, shooting error in a disadvantageous point seesaw approach (+6~+4) situation, shooting error in a disadvantageous point seesaw situation (−1~−3), shooting error in a disadvantageous point seesaw situation (+1~+3), shooting error in a tie situation, tie shooting error in the last attack with several seconds being left before a game ends in a disadvantageous point seesaw situation (−1~−3), reverse point shooting error in the last attack with several seconds being left before a game ends in a tie situation, tie shooting error simultaneously with a game end buzzer in a disadvantageous seesaw situation (−1~−3), reverse point shooting error simultaneously with a game end buzzer in a disadvantageous seesaw situation (−1~−3), and reverse point shooting error simultaneously with a game end buzzer in a tie situation; and the 4 items are an advantageous and disadvantageous situation (over ±7 points), an advantageous and disadvantageous seesaw approach situation (±6~±4 points), an advantageous and disadvantageous seesaw situation (±3~±1 points), and contribution in a tie situation.

Moreover a method of estimating the value of athletes using a game achievement evaluation model, wherein a process of providing the degree of contribution data and transmitting settlement authentication and results comprises the steps:

allowing a user, a baseball player, a baseball-related institute, a basketball ball club, a press (sports) institute, etc. to have access to a web site within a manager server through each terminal; allowing the user, the baseball player, the baseball-related institute, the basketball ball club, the press (sports) institute, etc. to search and select the degree of contribution of the athletes or the player ball clubs; allowing the user, the baseball player, the baseball-related institute, the basketball ball club, the press (sports) institute, etc. to make requests for the degree of contribution data for qualitative evaluation of the athletes or the player ball clubs to the manager server through the terminal; allowing the manager server to input a settlement number (a credit card number, an account number, etc.) to a corresponding terminal or server that request the degree of contribution by the athletes;

allowing athletes, player ball clubs, etc. who request the degree of contribution by the athletes to input the settlement number (a credit card number, an account number, etc.) in a web site within a manager server using a corresponding terminal or server; allowing the manager server to make requests for authentication of a corresponding settlement number that requests the degree of contribution by the athletes to a financial institute/credit card company/mobile communication company-billing server; allowing the financial institute/credit card company/mobile communication company-billing server to compare the requested settlement number and a settlement number stored in a database of a corresponding server, and then to send the authentication result to the manager server; allowing the manager server to make requests for settlement to a settlement system server; allowing the settlement system server to settle accounts to the credit card number, the account number, the mobile phone finance, etc.; allowing the settlement system server to send the settlement contents to the manager server; allowing the manager server to send the settlement contents to a corresponding terminal or server that requests the degree of contribution by the athletes through a communication service company server; and allowing the communication service company server to send the settlement contents to a corresponding terminal or server, and then to send the transmission results to the manager server.

BRIEF DESCRIPTION OF DRAWINGS

Further objects and advantages of the invention can be more fully understood from the following detailed description taken in conjunction with the accompanying drawings in which.

BEST MODE FOR CARRYING OUT THE INVENTION

The present invention will now be described in detail in connection with preferred embodiments with reference to the accompanying drawings.

Figure 1:
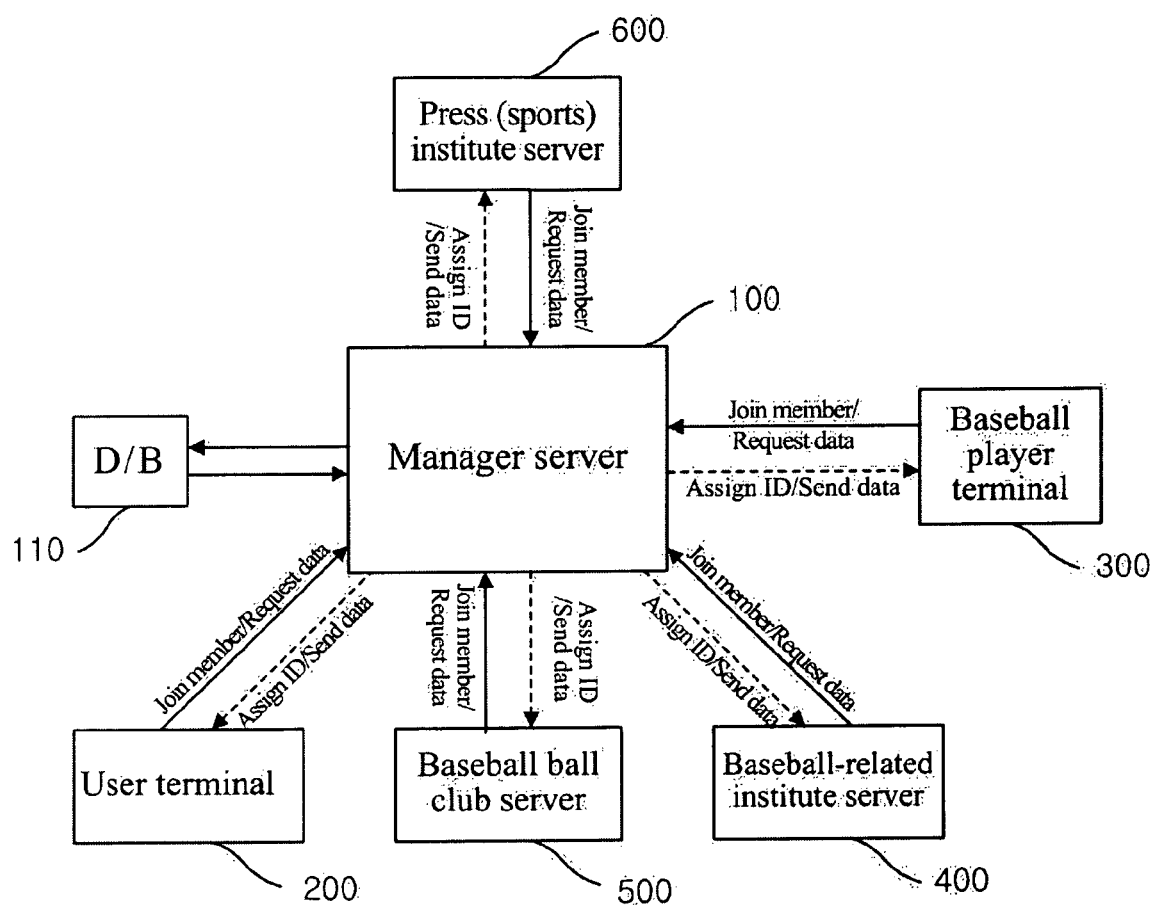
FIG. 1 is a block diagram of a system for estimating the value of athletes using a game achievement evaluation model according to an embodiment of the present invention.
Figure 2:
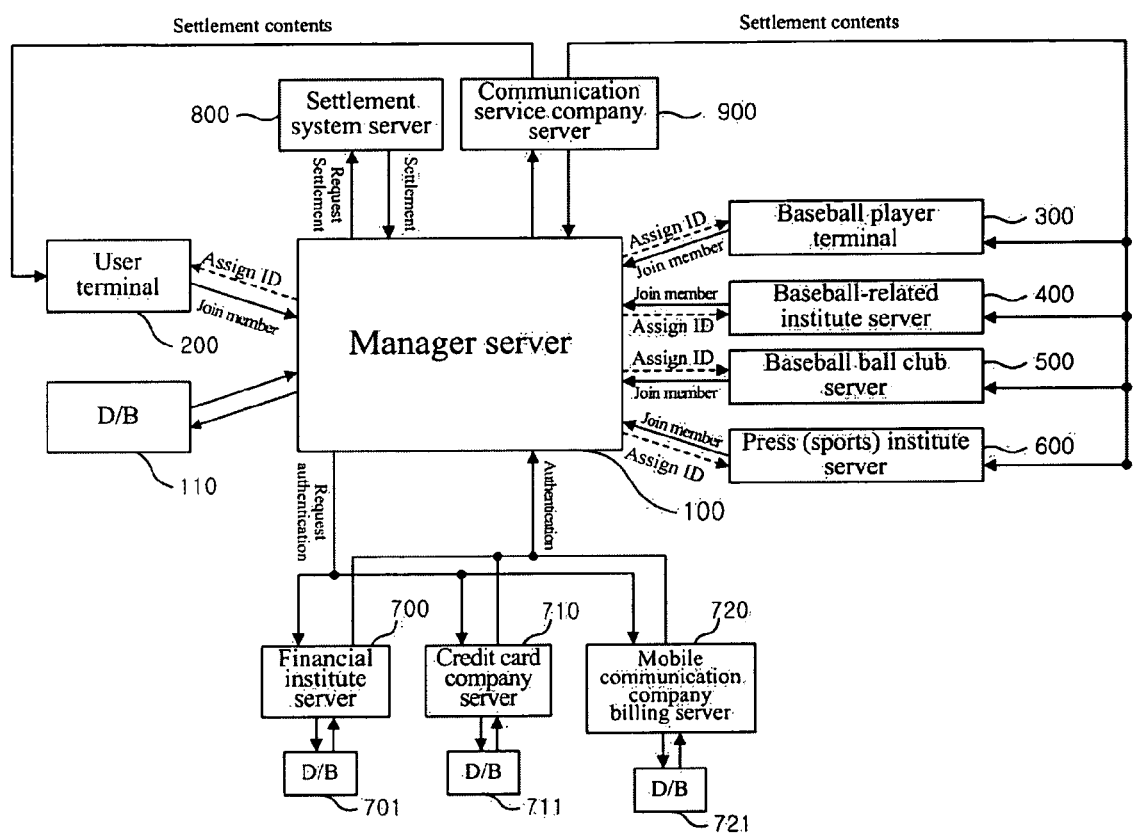
FIG. 2 is a block diagram of a system for estimating the value of athletes using a game achievement evaluation model according to another embodiment of the present invention.

FIG. 1 is a block diagram of a system for estimating the value of athletes using a game achievement evaluation model according to an embodiment of the present invention. FIG. 2 is a block diagram of a system for estimating the value of athletes using a game achievement evaluation model according to another embodiment of the present invention.

Referring to FIGS. 1 and 2, the system for estimating the value of athletes using the game achievement evaluation model according to an embodiment of the present invention includes a manager server 100, a user terminal 200, a baseball player terminal 300, a baseball-related institute server 400, a baseball ball club server 500, a press (sports) institute server 600, a financial institute server 700, a credit card company server 710, a mobile communication company billing server 720, a settlement system server 800, a communication service company server 900, a manager server DB 110, a financial institute server DB 701, a credit card company server DB 711 and a mobile communication company billing server DB 721. Functions of respective technical means will be below described.

The manager server 100 has a function of receiving requests for membership by users, baseball players, baseball-related institutes, baseball ball clubs, press (sports) institutes, etc. who have access to a web site in order to know the degree of contribution for qualitative evaluation of athletes or athlete ball clubs for annual salary calculation of professional athletes, the scout of amateurs, mercenary scout, athlete draft, athlete trade, etc., a function in which members are registered, and are given with IDs, a function in which the members that joined the web site are managed in the manager server DB, and a function in which in a state where the degree of contribution by the athletes is classified into attack addition (contribution), attack subtraction (error), defense addition (contribution) and defense subtraction (error) according to game situations, 129 game factors and game factors are divided into detailed 1277 game situation factors based on the classified factors, the game factors and the game situation factors are numerically valued with them being given with different weights, and if the users, the baseball players, the baseball-related institutes, the basketball ball clubs, the press (sports) institutes, etc. request the quantitative results through servers or terminals, data on the degree of contribution by the athletes are sent to corresponding servers or terminals.

The user terminal 200 has a function of allows a user to have access to the website within the manager server and to make requests for member joining, in order to know annual salary calculation of professional athletes, the scout of amateurs, mercenary scout, athlete draft, athlete trade, and the like, a function of allowing the manager server to assign an ID to the user, and a function of allowing the user to make requests for the degree of quantitative contribution by athletes to the manager server, and to receive the degree of contribution data by the athletes.

The baseball player terminal 300 has a function of allows a baseball player to have access to the website within the manager server and to make requests for member joining, in order to know annual salary calculation of professional athletes, the scout of amateurs, mercenary scout, athlete draft, athlete trade, and the like, a function of allowing the manager server to assign an ID to the baseball player, and a function of allowing the baseball player to make requests for the degree of quantitative contribution by athletes to the manager server, and to receive the degree of contribution data by the athletes.

The baseball-related institute server 400 has a function of allows a baseball-related institute to have access to the website within the manager server and to make requests for member joining, in order to know annual salary calculation of professional athletes, the scout of amateurs, mercenary scout, athlete draft, athlete trade, and the like, a function of allowing the manager server to assign an ID to the baseball-related institute, and a function of allowing the baseball-related institute to make requests for the degree of quantitative contribution by athletes to the manager server, and to receive the degree of contribution data by the athletes.

The baseball ball club server 500 has a function of allows a baseball ball club to have access to the website within the manager server and to make requests for member joining, in order to know annual salary calculation of professional athletes, the scout of amateurs, mercenary scout, athlete draft, athlete trade, and the like, a function of allowing the manager server to assign an ID to the basketball ball club, and a function of allowing the basketball ball club to make requests for the degree of quantitative contribution by athletes to the manager server, and to receive the degree of contribution data by the athletes.

The press (sports) institute server 600 has a function of allows a press (sports) institute to have access to the website within the manager server and to make requests for member joining, in order to know annual salary calculation of professional athletes, the scout of amateurs, mercenary scout, athlete draft, athlete trade, and the like, a function of allowing the manager server to assign an ID to the press (sports) institute, and a function of allowing the press (sports) institute to make requests for the degree of quantitative contribution by athletes to the manager server, and to receive the degree of contribution data by the athletes.

The financial institute/credit card company/mobile communication company billing servers 700, 710 and 720 perform a function of receiving authentication requests for one or more of financial information, card information and mobile communication information being settlement numbers of the user, the baseball player, the baseball-related institute, the basketball ball club and the press (sports) institute from the manager server, a function of comparing the received information with information stored in corresponding databases of the financial institute server, the credit card company server and the mobile communication company billing server after the authentication request, and a function of transmitting the authentication result to the manager server.

The settlement system server 800 has a function of receiving one or more of the settlement numbers of the user, the baseball player, the baseball-related institute, the basketball ball club and the press (sports) institute, which are authorized by the financial institute/credit card company/mobile communication company billing servers, from the manager server, and a function of transmitting the settlement results to the manager server after confirming the settlement numbers.

The communication service company server 900 has a function of, after confirming the settlement from the settlement system server, receiving the degree of contribution information by the athletes and settlement information from the manager server, and a function of transmitting the degree of contribution information by the athletes and settlement information, which are received from the manager server, via e-mail, SMS of a mobile phone, the messenger, etc. to the terminal, the user and the baseball player mobile phones of the user, the baseball player, the baseball-related institute, the basketball ball club and the press (sports) institute.

The manager server DB 110 and the financial institute/credit card company/mobile communication company billing servers DB 701, 711 and 721 perform a function of up-downing and up-loading information on the member, the user, the baseball player, the baseball-related institute, the basketball ball club and the press (sports) institute from and to the manager server and the financial institute/credit card company/mobile communication company billing server.

Figure 3:
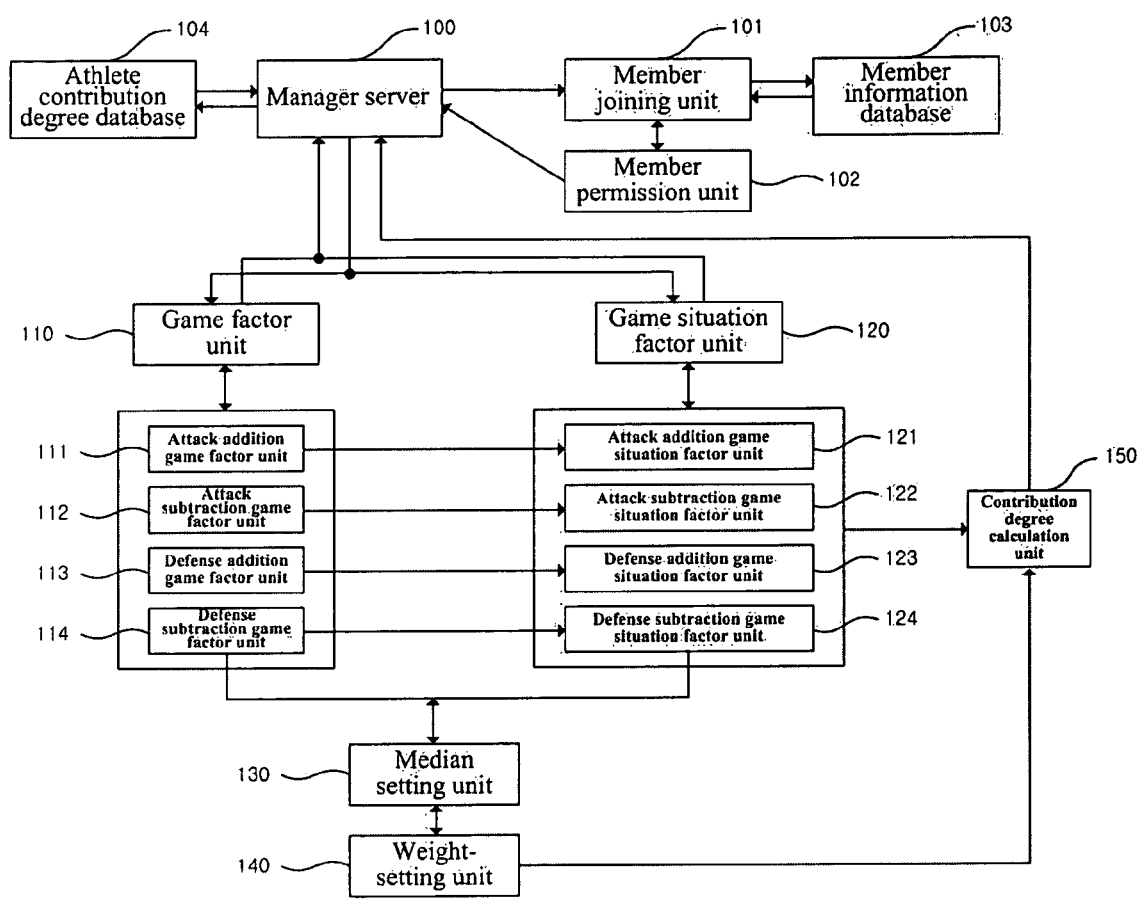
FIG. 3 is a detailed block diagram of the manager server of the system for estimating the value of athletes using the game achievement evaluation model according to another embodiment of the present invention.

FIG. 3 is a detailed block diagram of the manager server of the system for estimating the value of athletes using the game achievement evaluation model according to another embodiment of the present invention.

The detailed block diagram of the manager server will now be described with reference to FIG. 3. The member subscription unit 101 has a function of allowing a user, a baseball player, a baseball-related institute, a baseball ball club, a press (sports) institute, etc. to request member joining through a server or a terminal.

The member permission unit 102 has a function of authorizing the member joining, and then assigning an ID.

The member information database (DB) 103 has a function of storing and managing members.

The athlete contribution degree database (DB) 104 has a function of storing and managing the degree of contribution by athletes.

The game factor unit 110 consists of 129 items. The game factor unit 110 includes an attack addition game factor unit 111 that indicates attack contribution portions such as team morale increase contribution addition generated by a game situation of an athlete, an attack subtraction game factor unit 112 that indicates attack error portions such as point acquisition cancellation error subtraction, a defense addition game factor unit 113 that indicates defense contribution portions such as full possible losing point dissipation contribution addition, and a defense subtraction game factor unit 114 that indicates defense error portions such as full self-blame possible losing point error subtraction.

The game situation factor unit 120 consists of 1277 items, and includes an attack addition game situation factor unit 121 that indicates detailed items of attack addition game factors indicating attack contribution portions generated by a game situation of an athlete, an attack subtraction game situation factor unit 122 that indicates detailed items of attack subtraction game factors indicating attack error portions, a defense addition game situation factor unit 123 that indicates detailed items of defense addition game factors indicating defense contribution portions, and a defense subtraction game situation factor unit 124 that indicates detailed items of defense subtraction game factors indicating defense error portions.

The median setting unit 130 has a function of setting representative values for respective detailed items that constitute the game factor unit and the game situation factor unit.

The weight-setting unit 140 has a function of multiplying the game factor median and the game situation factor median set in the median setting unit.

The contribution degree calculation unit 150 has a function of calculating the degree of contribution by athletes from a difference between addition factors including contribution factors for attack and defense addition to which weights are applied, and subtraction factors including error factors for attack and defense subtraction to which weights are applied.

Hereinafter, the method of estimating the value of athletes using the game achievement evaluation model according to an embodiment of the present invention will be below described in more detailed.

Figure 4:
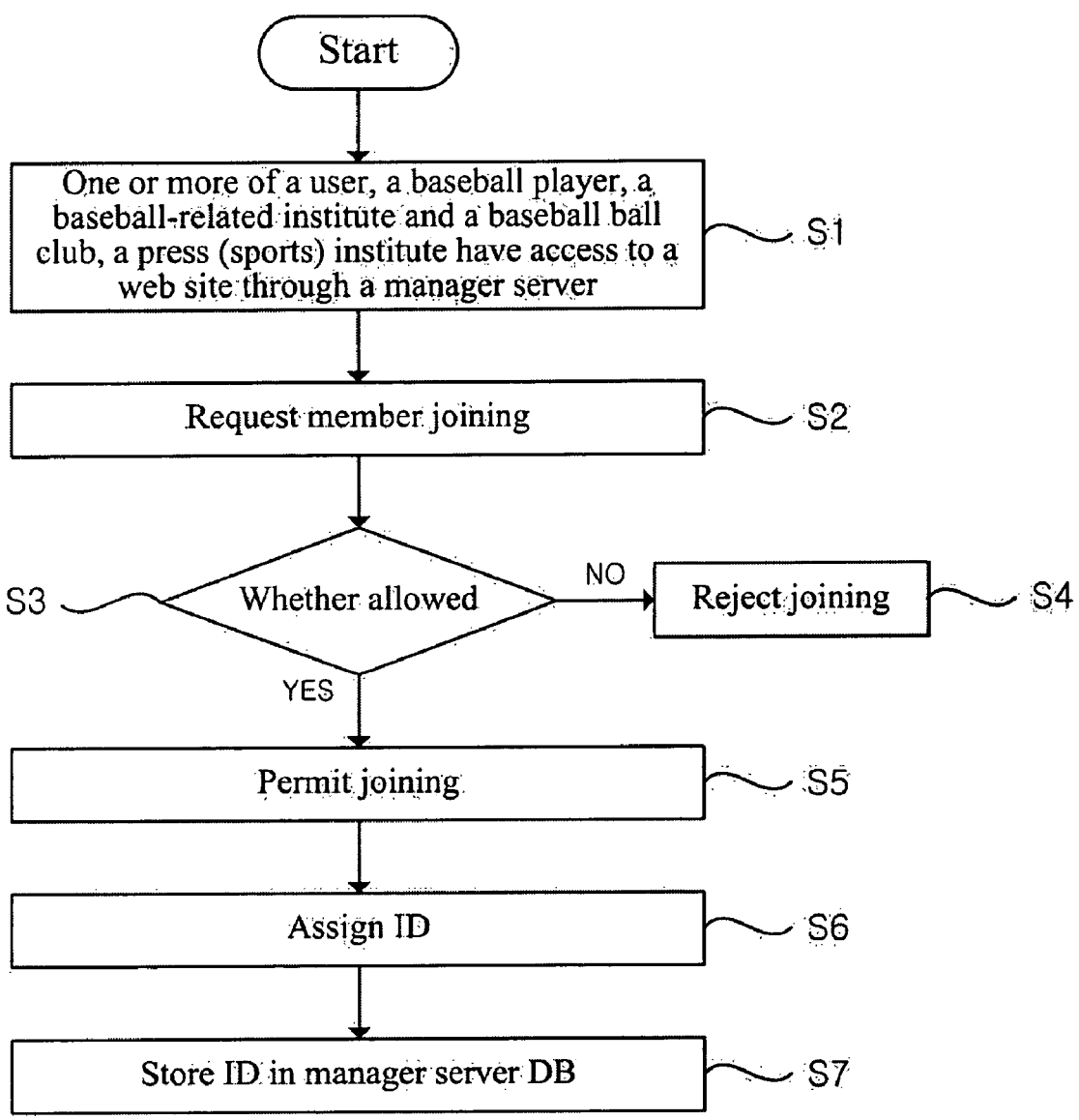
FIG. 4 is a flowchart illustrating a member subscription process in a method of estimating the value of athletes using a game achievement evaluation model according to an embodiment of the present invention.

FIG. 4 is a flowchart illustrating a member subscription process in the method of estimating the value of athletes using the game achievement evaluation model according to an embodiment of the present invention.

Referring to FIG. 4, in step S1, one or more of a user, a baseball player, a baseball-related institute and a baseball ball club, a press (sports) institute has access to a web site through a manager server. In step S2, one or more of the user, the baseball player, the baseball-related institute, the basketball ball club and the press (sports) institute applies member joining to the member-joining unit within the manager server. In step S3, it is determined whether to allow the member joining in the member permission unit within the manager server. In step S3, if it is determined that the member joining is not allowed, the member joining is rejected (Step S4). If it is determined that the member joining is allowed, joining to a member is allowed (Step S5). After the member joining is allowed, the manager server sends IDs to one or more of the terminals or servers among the user, the baseball player, the baseball-related institute, the basketball ball club and the press (sports) institute through the member permission unit (step S6). Then, the Ids are stored in the member information database of the manager server (step S7).

Figure 5:
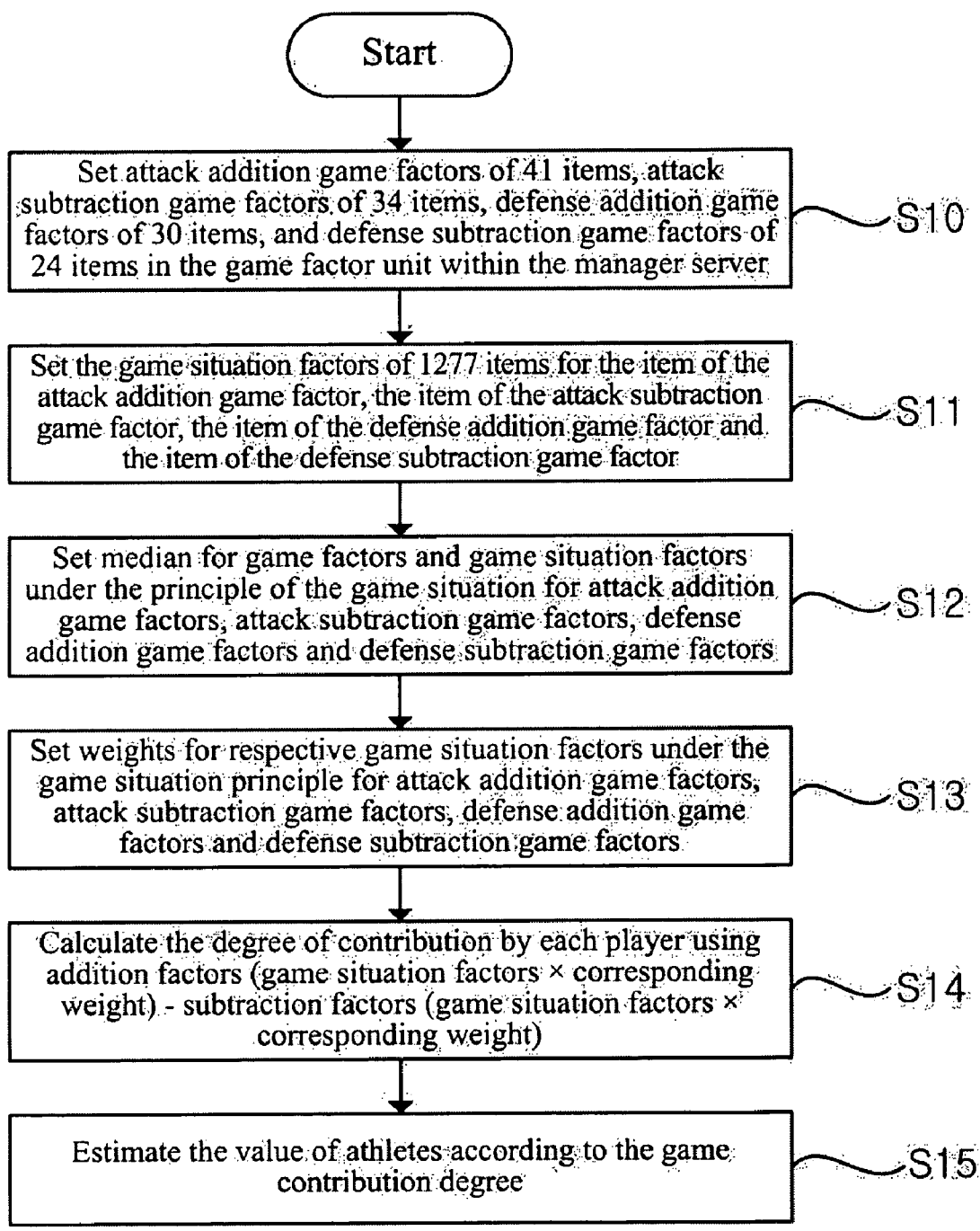
FIG. 5 is a flowchart illustrating an annual salary calculation process in the method of estimating the value of athletes using the game achievement evaluation model according to another embodiment of the present invention.

FIG. 5 is a flowchart illustrating an annual salary calculation process in the method of estimating the value of athletes using the game achievement evaluation model according to another embodiment of the present invention.

As shown in FIG. 5, a manager first sets attack addition game factors of 41 items, attack subtraction game factors of 34 items, defense addition game factors of 30 items, and defense subtraction game factors of 24 items in the game factor unit within the manager server (Step S10).

Detailed items of the attack addition game factor unit include full shooting capture ability contribution addition (situation: 7 items), shooting chance capture ability contribution addition 7, possible losing point removal contribution addition 7, full team morale-inspired contribution addition 13, team morale-inspired contribution addition 7, high degree-skill contribution addition 13, full disadvantage overcome ability contribution addition 13, disadvantage overcome ability contribution addition 13, disadvantage overcome fail contribution addition 7, full point-possible securing contribution addition 13, score-possible providing contribution addition 13, score record cancellation-considered contribution addition 13, full score chance ability loss contribution addition 7, point chance ability loss contribution addition 13, alternate score additional contribution addition 7, lucky score addition contribution addition 7, indirect chance fostering contribution addition 7, direct chance assistance contribution addition 7, indirect chance sacrifice contribution addition 13, direct chance sacrifice contribution addition 13, athlete defense shrinkage contribution addition 7, opponent team defense shrinkage contribution addition 21, attack time re-application contribution addition 21, full point cooperation contribution addition 13, point cooperation contribution addition 7, teamwork completion cooperation contribution addition 7, teamwork cooperation contribution addition 13, positive participation contribution addition 13, shooting chance cooperation contribution addition 13, full shooting chance cooperation contribution addition 21, swift attack cooperation contribution addition 7, full swift attack cooperation contribution addition 13, possession acquisition contribution addition 13, free throw possession ability contribution addition 7, full possession acquisition contribution addition 21, possession acquisition-side contribution addition 7, score record acquisition contribution addition 7, opponent teamwork degeneracy contribution addition 5, opponent team formation obstruction contribution addition 5, opponent defense disturbance contribution addition 9 and right shooting timing contribution addition 9.

Detailed items of the attack subtraction game factor unit include point acquisition cancellation error subtraction (situation: 13 items), direction team-moral degeneracy error subtraction 7, indirect team moral degeneracy error subtraction 7, possession-possible chance removal error subtraction 7, possession loss providing error subtraction 13, indirect possession loss providing error subtraction 7, possession loss-possible providing error subtraction 7, possible losing point providing error subtraction 13, indirect possible losing point providing error subtraction 7, full possible losing point providing error subtraction 13, score-possible removal error subtraction 13, indirect score-possible removal error subtraction 13, full score chance dissipation error subtraction 12, indirect score chance dissipation error subtraction 12, general full score chance dissipation error subtraction 12, general indirect score chance dissipation error subtraction 12, game basic capability lack error subtraction 7, score addition chance dissipation error subtraction 13, victory factor removal error subtraction 13, unreasonable shooting attempt error subtraction 13, right shooting timing lack error subtraction 13, teamwork cooperation lack error subtraction 7, full teamwork cooperation lack error subtraction 7, positive participation lack error subtraction 7, full positive participation lack error subtraction 7, prediction ability lack error subtraction 7, personal defense shrinkage load error subtraction 7, team member personal defense shrinkage load error subtraction 13, team defense shrinkage degeneracy error subtraction 13, teamwork lowering fostering error subtraction 5, teamwork formation obstruction error subtraction 5, instant chance cooperation lack error subtraction 5, opponent swift attack-possible chance assignment error subtraction 9 and opponent free throw-possible assignment error subtraction 9.

Detailed items of the defense addition game factor unit include full possible losing point dissipation contribution addition (situation: 7 items), possible losing point dissipation contribution addition 7, full losing point allowance dissipation contribution addition 7, possession acquisition-possible assignment contribution addition 7, shooting fail factor assignment contribution addition 21, full shooting fail factor assignment contribution addition 21, shooting mental shrinkage contribution addition 9, counter team morale lowering contribution addition 7, direct the other party morale lowering contribution addition 13, possible losing point previous removal contribution addition 4, game rhythm interception contribution addition 4, teamwork stability opponent assignment contribution addition 13, losing point minimum-possible assignment contribution addition 4, optimal defense ability contribution addition 7, full optimal defense ability contribution addition 13, defense positive participation contribution addition 4, full defense positive participation contribution addition 7, teamwork assistance contribution addition 7, error inducing factor assignment contribution addition 7, full error-inducing assignment contribution addition 13, score chance-possible assignment contribution addition 13, full score-possible assignment contribution addition 13, the other party personal defense shrinkage contribution addition 4, opponent team defense shrinkage contribution addition 13, defense confusion recovery contribution addition 13, possession acquisition contribution addition 4, opponent teamwork formation obstruction contribution addition 5, opponent team member formation obstruction contribution addition 5, swift attack-possible chance providing contribution addition 9 and positive sacrifice participation contribution addition 9.

Detailed items of the defense subtraction game factor unit include minimum self-blame losing point assignment error subtraction (situation: 21 items), full self-blame losing point assignment error subtraction 21, full self-blame possible losing point error subtraction 13, maximum self-blame losing point assignment error subtraction 21, countermeasure absence losing point error subtraction 21, countermeasure absence possible losing point error subtraction 13, countermeasure absence-inducing error subtraction 7, assistance self-blame losing point-considered error subtraction 7, assistance self blame-possible losing point-considered error subtraction 7, situation coping ability lack error subtraction 7, assistance coping ability lack error subtraction 7, basic defense ability lack error subtraction 7, indirect opponent team morale-inspired error subtraction 7, direct opponent team morale-inspired error subtraction 7, personal defense shrinkage error subtraction 7, personal defense shrinkage fostering error subtraction 7, team defense shrinkage fostering error subtraction 7, mentality control ability lack error subtraction 13, opponent teamwork consolidation chance providing error subtraction 7, teamwork collapse curse providing error subtraction 5, possible losing point increase-induced error subtraction 5, game flow prevention ability lack error subtraction 5, team-pattern confusion assignment error subtraction 9 and team member formation difficulty providing error subtraction 9.

Furthermore, the attack addition game factors of the 41 items, the attack subtraction game factors of the 34 items, the defense addition game factors of the 30 items, and the defense subtraction game factors of the 24 items can be defined as follows.

Firstly, the principle of member joining to the attack addition factors is as follows.

(1) The full shooting capture (free use) ability contribution addition item includes a case where, upon offense, a shooting change is secured through self-effort or with the help of a co-player, shooting is made, and a point is given to a player, a case where although a shooting change is secured through self-effort or with the help of a co-player and a point is scored through shooting, upon offense, the point vanishes due to error of a co-player, and a point is thus given to a scored player, and a case where a point is given to an player who is successful in one or more free throws in a free throw upon attack.

(2) The shooting chance capture ability contribution addition item includes a case where although a full shooting chance is secured through self-effort or with the help of a co-player upon offense, the chance vanishes since a pass is not give, a case where in a state where shooting (including free throw) was attempted upon offense but failed, a shooter is given with a chance in a no play situation since a co-player commits error, a case where although a point is scored upon offense, the point is canceled due to error of a co-player (basket interfere, goaltending, etc.), a case where although shooting is failed upon offense, a chance is given to a shooter when a co-player or a person concerned secures possession again.

(3) The possible losing point removal contribution addition item includes a case where in a state where a player plays normal play upon offense, the player is given with a chance when error portions exist with possession not being changed, that is, if there is no action of a player while not generating subtraction factors to a team, when a ball is deprived and becomes possession of an opponent team, a cause of the reason is given. When a point (including free throw) is scored, rebound is made, when a ball to which a co-player committed error or a fumbled ball is caught, when a good jump ball or a jump ball of a tapper is caught in a jump ball, when a loose ball foul is obtained, a case where a ball in which a co-player committed error becomes a jump ball, when a shooting ball is intentionally out through touch on an opponent play without being in touch with a ring, etc. Furthermore, it includes a case where a player who obtains a free throw is given with the addition due to various fouls such as foul upon application of a team foul of an opponent team upon attack, a loose ball foul, an intentional foul, a flagrant foul and a punching foul.

(4) The full team morale-inspired contribution addition item includes a case where a related player is given with the addition in core acquisition (including free throw) upon offense. In this case, if free throws of seesaw, tie and reverse point are successful at the same time during attempt of a free throw, they are added. Furthermore, it includes a case where a player who is successful in one free throw upon attack is given.

(5) The team morale-inspired contribution addition item includes a case where since play results of a player upon offense is stimulus to an opponent team (when an opponent player is croqueted through dizzy pass or dribble), mental shrinkage is given to the opponent player, a case where when an offense player fails in shooting (lay-up, under-goal, middle, three points) upon offense, a shooter or a co-player secures possession again, and a case where a shooter or a player who secures possession is given.

(6) The high degree-skill contribution addition item includes a case where a player whop is successful in a three-point shoot in personal action upon attack, dizzy dribble, splendid lay-up, dunk shooting, tip in, dizzy pass (including alley-oop assist), and acquisition of a free throw subsequent to scoring (foul) is given, and a case where a player who performs indirect and direct assist pass in personal action upon offense is given.

(7) The full disadvantage overcome ability contribution addition item includes a case where a player who performs attack rebound (unfairness of BOX OUT) upon offense is given, and a case where a player who tip ins shooting ball by an offense player upon offense is given.

(8) The disadvantage overcome ability contribution addition item includes a case where a player who catches a ball on which error is committed by a co-player in attack rebound upon attack or in an attach situation committed error to gain possession through cooperation with co-player or self-effort is given, and a case where a player who secures possession by intentionally making out a shooting ball through touch on an opponent play without being in touch with a ring, etc. is given.

(9) The disadvantage overcome fail contribution addition item includes a case where when failing to catch a ball to which error is committed by an offense player A upon offense or a fumble ball, an offense player A intentionally throws shooting ball, which is about to be out from the court after bounding the ring or is about to be out from the court due to mistake of a co-player, to the body of a defense player X, but fails, or fails to pass a ball to a co-player.

(10) The full score-possible securing contribution addition item includes a case where an offense player catches a rebound or loose ball within the 3 second limit section or connects immediate shooting, upon offense, is given, a case where an offense player who causes error in an opponent player within the 3 second limit section upon offense, or makes contribution to a team due to scoring while fighting a ball, and a case where a player who gains a free throw due to foul of an opponent team upon offense.

(11) The score-possible providing contribution addition item includes a case where a player catches attack rebound upon offense player or fully secures possession through steal or snatch of a co-player's error ball in a front court is given, a case where a play who catches a ball that is shoot by a shooter but is blocked upon offense shooter, or catches a co-player's error ball to gain possession is given, a case where a player who intentionally touches a ball to an opponent player to gain possession when the shooting ball by a co-player does touch or not touch a ring upon offense, or a ball is erroneously court out due to a co-player during play is given, a case where a player who obtains a loose ball foul (after a ball becomes a live ball, illegal physical contact when no team has possession) upon offense is given, and a case where a player is given when the player gives pass comparable to assist (direct and indirect no-marks) for shooting upon offense, shooting is failed and the pass is not recorded as assist is given.

(12) The score record cancellation-considered contribution addition item includes a case where a player who has score record chance canceled due to error (goaltending, line cross, basket interference, etc.) of a co-player although the goal is reached in a free throw upon attack is given, and a case where a player who has its score record chance canceled due to error (goaltending, line cross, basket interference, etc.) of a co-player although the goal is reached upon offense is given.

(13) The full score chance ability loss contribution addition item includes a case where a player has its free throw canceled due to error (goaltending, line cross, etc.) of a co-player in a state where an offense player obtains a free throw but fails the goal upon offense is given, and a case where a player who cannot attempt a free throw due to a wound although obtained the free throw upon offense is given.

(14) The score chance ability loss contribution addition item includes a case where a player who has its chance vanished due to miss pass although he obtains a shooting chance position of full chance upon offense is given.

(15) The alternate score addition contribution addition item includes a case where a player who obtains a free throw obtained by a co-player due to predetermined selection not self-effort, and reaches the goal upon offense. In this case, it is not included in a personal score record, but is treated as a team score.

(16) The lucky score addition contribution addition item includes a case where the nearest player is given when the other party generates an own goal due to error upon offense. In this case, it is not included in a personal score record, but is treated as a team score.

(17) The indirect chance fostering contribution addition item includes a case where a player who induces the person in question and a co-player defense regardless of a ball in order to give a shooting, pass or catch chance to a co-player upon offense is given.

(18) The direct chance fostering contribution addition item includes a case where a player who acts regardless of a ball in order to give a shooting, pass or catch chance to a co-player upon offense, resulting in pass connection, is given.

(19) The indirect chance sacrifice contribution addition item includes a case where a player who acts for the purpose of a team rather than the person in question through block, screen, etc. upon offense, resulting in a pass, gets a shooting chance, but does not attempt the shooting is given.

(20) The direct chance sacrifice contribution addition item includes a case where a player who plays for the purpose of a team rather than the person in question through block, screen, etc. upon offense, resulting in a pass, and attempts shooting, is given.

(21) The personal defense shrinkage contribution addition item includes a case where a player who induces an opponent player to commit foul upon offense is given.

(22) The opponent team defense shrinkage contribution addition item includes a case where the results when a player induces an opponent player to commit foul upon an offense are included even in team foul.

(23) The attack time re-application contribution addition item includes a case where a player who generates the condition in which if a game is stopped due to foul, etc. and is then resumed upon offense, an attack team is given with 24 seconds upon offense is given.

(24) The full score cooperation contribution (full assist) contribution addition item includes a case where a player who attempts full no-mark assist pass (successful score of a co-player) upon offense is given. In this case, the full no-mark assist pass refers to a case where the shooter is not hindered by the defense player.

(25) The score cooperation contribution (indirect assist) contribution addition item includes a case where a player who attempts indirect no-mark assist pass ( 의 successful score of a co-player) upon offense is given. In this case, the indirect no-mark assist pass refers to a case where the shooter is hindered by the defense player.

(26) The teamwork completion cooperation contribution or team organization maximum contribution addition item includes a case where last three players are given in the case where a pass is connected and score is successful through cooperation, i.e., swift attack, a set play, etc. among co-players upon offense.

(27) The teamwork cooperation contribution addition item includes a case where a player who attempts block, screen or pass in the case where a pass is connected through cooperation among co-players but shooting is failed upon offense is given. In this case, upon attack, in a pass, addition for timing, exactness and flow leading is given.

(28) The positive participation contribution addition item includes a case where a player who is located at the nearest place when a ball is goaled while fighting against an opponent for a ball up on rebound upon attack, when a point is obtained due to error of an opponent, or when contribution is generated in a team is given, a case where a subject player of a jump ball when the jump ball is declared when a balls does not belong to any team or when an error ball by a co-player is fought is given, a case where a player who catches co-player committed error ball or a fumbled ball through cooperation with a co-player or self-effort upon offense is given, a case where a player who intentionally touches a ball to an opponent player to gain possession when the shooting ball by a co-player does touch or not touch a ring upon offense, or a ball is erroneously court out due to a co-player during play is given, a case where a player who acquires a ball through participation in attack rebound upon offense, a player who commits error simultaneously with a defense player, and makes jump-ball in participation of positive rebound, tap (including unintentional tap) of a participation player and no goal in shooting or free throw is given, and a player who plays positively such as double foul during positive in-play, and make contribution to a team is given, and a case where when failing to catch a ball to which error is committed by an offense player A upon offense or a fumble ball, an offense player A intentionally throws shooting ball, which is about to be out from the court after bounding the ring or is about to be out from the court due to mistake of a co-player, to the body of a defense player X, but fails, or fails to pass a ball to a co-player.

(29) The shooting change cooperation contribution or shooting chance providing contribution addition item includes a case where a player who gives a pass (indirect no mark), which is comparable to the assist, to a co-player outside the 3 second limit section upon offense, but shooting is failed, is given although the pass is not recorded as the assist.

(30) The full shooting chance cooperation contribution addition item includes a case where a player who gives a pass (full no mark), which is comparable to the assist, to a co-player outside the 3 second limit section upon offense, but shooting is failed, is given although the pass is not recorded as the assist.

(31) The swift attack cooperation contribution addition item includes a case where a player, an intermediate connection player and a last pass player who give pass simultaneously with rebound, but do not obtain a point upon swift attack are given.

(32) The full swift attack cooperation contribution addition item includes a case where a player, an intermediate connection player and a last pass player who give pass simultaneously with rebound, and get a point upon swift attack are given.

(33) The possession acquisition-possible contribution addition item includes a case where a player who produces a jump ball in a fumble situation (including error of a co player) where ball does not belong to any team upon offense is given, and a case where a player who generates a jump ball in a situation where offense and defense players commit violation at the same time (interfere or goaltending) in free throw upon offense is given.

(34) The free throw possession ability or full score possible contribution addition item includes a case where a player who gets foul of a team foul state, foul of an individual shooting action, technical foul, loose ball foul, etc. in a state where any error is not generated upon offense is given, and a case where a player who obtains free throw upon offense is given.

(35) The full possession securing contribution addition item includes a case where a player who makes contributions of half a role when a tapper and a catcher gets possession of a ball in a jump ball situation upon offense is given, a case where a player who makes contributions of half a role when the player intentionally tap gives a pass to a co-player in a rebound situation upon offense is given, a case where a player who catches a block ball simultaneously with shooting, rebound possession, an error ball by a co-player or a fumble ball upon offense shooting is given, and a case where a player who intentionally touches a ball to an opponent player to gain possession when the shooting ball by a co-player does touch or not touch a ring upon offense, or a ball is erroneously court out due to a co-player during play is given.

(36) The possession securing side contribution addition item includes a case where a player who makes contributions of similar or below half a role when a tapper and a catcher gets possession of a ball in a jump ball situation up on offense is given, a case where a player who makes contributions of similar or below half a role in tap of a tapper and catch of a catcher in rebound upon attack, and catch of a tap catcher in a jump ball is given, and a case where a player who attempts unintentional tap when a co-player catches unintentionally taps ball in rebound upon attack.

(37) The score record acquisition contribution addition item includes case where a player who attempts shooting and gets a point upon attack is given.

(38) The opponent teamwork lowering contribution addition item includes case where a player who makes contribution in making an opponent player left upon attack is given.

(39) The opponent team configuration hindering contribution addition item includes case where a player who makes contribution in making an opponent player left and allowing the player not to participate in one ore more games upon attack is given.

(40) The opponent defense disturbance contribution addition item includes case where a player who gives positive confusion to an opponent defense through pass, dribble, block, screen, swift attack or teamwork upon attack is given.

(41) The right shooting timing contribution addition item is given when a shooter attempts shooting in a shooting timing upon attack. That is, this corresponds to a case where when a score is failed or shooting is failed, a co-player or the person in question gets possession again, or a case where although a shooter attempts shooting in a shooting timing and scores a point upon attack, a co-player commits violation, and the point is cancelled.

Secondly, the principle of writing each of the attack subtraction factors is as follows.

(1) The point acquisition cancellation error subtraction item includes a case where a player who causes the person in question or a co-player commits violation, and a point is cancelled in a situation where a shooter attempts a field goal or a free throw to get a goal upon offense is given, and a case where a player who a shoot commits foul and the point is cancelled in a situation where a shooter attempts a field goal or a free throw to get a goal upon offense is given.

(2) The direction team moral degeneracy error subtraction item includes a case where a player who generates error (fumble of ball possession, pass miss, dribble miss, catch miss, the 3 second limit rule, traveling, double dribble, etc.), causing the possession to be passed over to an opponent team upon offense is given, a case where a player who attempts personal and team play and generate offense foul (intentional, flagrant, punching), causing the possession to be passed over to an opponent team upon offense is given, a case where a player who commits foul and loses the possession in a situation where a shooter attempts a field goal or a free throw to get a goal upon offense is given, a case where a player who loses possession due to five second error by approach defense or five second error by post-up upon offense is given, a case where a player who attempts personal and team play and commits error of line cross to lose possession upon offense is given, a case where a player who attempts personal and team play and commits half line violation as the player goes over from a front court to a back court, or goes over to the back court while passing is given, a case where a player who has his ball stolen while possessing ball-possession and dribble at a front-court high point or has his ball intercepted while passing at that point upon offense is given, a case where a player who attempts three score shooting without an assist pass, but fails in swift attack upon attack is given, a case where a player who passing a ball without shooting in full chance (under-goal, lay-up, etc.), generates error and lose possession in swift attack is given, a case where a player who commit error when a co-player commits foul in a reverse attack of an opponent team in a state where possession is lost due to error upon offense is given, a case where a player who commits error, causing a point to be cancelled in a situation in which a field goal or a free throw is successful upon offense is given, a case where a player who fails in a free throw upon attack, a case where a player who receives the assist pass within the 3 second limit section through a teamwork, attempts a field goal (full no-mark situation), but fails in score (fail) upon attack is given, a case where a player who receives the assist pass within the 3 second limit section through a teamwork, attempts a field goal (full no-mark situation) upon attack, but fails in score (fail) is given, a case where a player who receives the assist pass within the 3 second limit section through a teamwork, attempts a field goal (indirect no-mark situation), but fails in score (fail) upon attack is given, and a case where a player who commits catch miss in a full no-mark chance (under-goal and the 3 second limit section) upon offense.

(3) The indirect team moral degeneracy error subtraction item includes a case where a player who attempts field goal (full no-mark and indirect no-mark situation) through self-effort (the individual skill), but fails in a point upon attack is given, a case where a player who attempts shooting, but a ball does not touch a ring (shooting fail) and is out without touching any player, so that a chance of securing a ball is cancelled, is given, a case where a player who attempts shooting but has his ball blocked by a defense player upon offense is given, a case where a player who attempts shooting (no goal) and does not give a chance of rebound in a state where attack rebound of co-players are absent upon offense is given, a case where a player who generates error (pass miss, catch miss, etc.) among co-players and thus gives possession to an opponent team upon offense, a case where a player who loses possession due to five second error by approach defense, five second error by post-up, 8 second half line error, and attack time 24 second exceeding error, upon offense, is given, a case where a player who causes a jump ball to be declared by a referee when the ball becomes fumble, the ball becomes a held ball, or the ball is out while fighting against a defense player upon offense is given, a case where a player who loses possession while passing a ball from the under-basket to the upper side while attempting pass upon offense is given, and a case where a player who passes a ball but commit error without shooting, but holds possession in a full chance (under-goal, lay-up, etc.) upon swift attack is given.

(4) The possession chance removal error subtraction item includes a case where a player causes a rebound chance of a team co-player to be cancelled when the person in question or a co-player commits violation and a free throw is cancelled in a state where a shooter attempts a free throw but fails in a free throw upon attack, is given, a case where a player who attempts shooting, but a ball does not touch a ring and is out without touching any player, so that a chance of securing a ball (rebound) is cancelled upon offense, is given, a case where a player who commits error and thus loses possession upon a jump ball is given, and a case where a player who commits foul before any player possesses a ball upon attack (in a team foul) is given.

(5) The possession loss providing error subtraction item includes a case where a player who generates error (pass miss, dribble miss, catch miss, the 3 second limit rule, traveling, double dribble, etc.) upon offense, causing an opponent team to get possession, when the responsibility is personal or a half or more is given, a case where a player who attempts shooting, is blocked by an opponent, and does not acquire possession again upon attack is given, a case where a player who attempts shooting, but a ball does not touch a ring (shooting fail) and is out without touching any player, so that a chance of securing a ball is cancelled upon offense, is given, a case where a player who generates offense foul (intentional, flagrant, punching, etc.) while does personal and team play, and gives possession to an opponent team upon offense is given, a case where a player who loses possession due to five second error by approach defense, five second error by post-up, 8 second half line error, and 24 second exceeding error upon offense is given, a case where a player who commits line cross error while doing personal and team play, and thus loses possession upon offense is given, a case where a player who goes from a front court to a back court while doing personal and team play, or goes over to a back court and commits half line violation upon offense is given, and a case where a player who loses possession while passing a ball from the basket to the upper side while attempting a pass, etc. upon offense is given.

(6) The indirect possession loss providing error subtraction item includes a case where a player who generates error, thus giving possession to an opponent team, upon offense, and thus has a half or less responsibility is given, a case where a player who commits foul before any player possesses a ball, upon attack, and thus loses possession is given, and a case where a player who commits foul before any player possesses a ball, in a jump ball, and thus loses possession is given.

(7) The possession loss-possible providing error subtraction item includes a case where a player who attempts a field goal or a free throw (immediate after in-play situation) but fails, upon attack, is given, a case where a player (a shooter) who attempts shooting and is blocked upon offense, but providing a cause of a jump ball since the player is again caught by a co-player or through tact of the person in question or a co-player is given, a case where a player who attempts shooting (no goal in) and thus does not give a chance of rebound in a state where attack rebound of co-players are absent upon offense co-player is given, a case where when a ball becomes a fumble ball while a ball is held, or a ball becomes a held ball upon attack, the person in question or a co-player are out while fighting against a defense player for the ball, and generates a jump ball is given, a case where a player who commits error simultaneously with an opponent player in an in-play situation immediately after the free throw (successful) upon attack, and generates a jump ball is given, and a case where a player who attempt three score shooting without assist pass but fails in swift attack upon attack is given.

(8) The possible losing point providing error subtraction item includes a case where a player has a half or more responsible when causing error (fumble during ball possession, pass miss, dribble miss, catch miss, the 3 second limit rule, traveling, double dribble, etc.) upon offense, and thus giving the possession to an opponent team is given, a case where when a co-player is successful in a field goal or a free throw upon offense, a player who commits error, cancels the score, and gives the possession to an opponent team is given, a case where a player who generates offense foul (intentional, flagrant, punching, etc.) while doing personal and team play upon offense, and gives the possession to an opponent team is given, a case where a player who loses possession due to five second error by approach defense, five second error by post-up, 8 second half line error, and 24 second exceeding error upon offense is given, a case where a player who commits line cross error while doing personal and team play, and thus loses possession upon offense is given, a case where a player who goes from a front court to a back court while doing personal and team play, or goes over to a back court and commits half line violation upon offense is given, and a case where a player who commits error is given in a state the player commits error upon offense and loses possession, and when a co-player in a reverse attack of an opponent team.

(9) The indirect possible losing point providing error subtraction item includes a case where a player who generates error, thus giving possession to an opponent team, upon offense, and thus has a half or less responsibility is given, a case where a player who generates four in a loose ball situation upon offense, and gives possession to an opponent team is given, a case where a player who commits foul before any player possesses a ball, in a jump ball, and thus loses possession is given, a case where a player who attempt three score shooting without assist pass but fails in swift attack upon attack is given, and a case where a player who commits error while passing without shooting in full chance (under-goal and lay-up, etc.) in a swift attack upon attack, but holds the possession is given.

(10) The full possible losing point providing error subtraction item includes a case where a player who personally commits technical foul in a team play situation, and gives an opponent team with a free throw, upon offense, is given, a case where a player who commits a loose ball, intentional, flagrant and punching foul in a team foul-applied situation upon offense, and gives an opponent team with a free throw is given, and a case where a player who has his ball stolen while holding the ball and dribbling the ball at the front court high point upon offense, or has his ball intercepted while passing the ball is given.

(11) The score-possible removal error subtraction item includes a case where a player has a half or more responsible when causing error (fumble during ball possession, pass miss, dribble miss, catch miss, the 3 second limit rule, traveling, double dribble, etc.) upon offense, and thus giving the possession to an opponent team, a case where a player is given when it is personal or has a half or more responsible, a case where a player who generates offense foul (intentional, flagrant, punching, etc.) while doing personal and team play upon offense, and gives the possession to an opponent team is given, a case where a player who loses possession due to five second error by approach defense, five second error by post-up, 8 second half line error, and attack time 24 second exceeding error, upon offense, is given, a case where a player who commits line cross error while doing personal and team play, and thus loses possession upon offense is given, a case where a player who goes from a front court to a back court while doing personal and team play, or goes over to a back court and commits half line violation upon offense is given, a case where a player who loses possession while passing a ball from the basket to the upper side while attempting a pass, etc., upon offense, is given, a case where a player who has his ball stolen while holding the ball and dribbling the ball at the front court high point upon offense, or has his ball intercepted while passing the ball is given, and a case where a player who commits error while passing without shooting in full chance (under-goal and lay-up, etc.) in a swift attack upon attack, but holds the possession is given.

(12) The indirect score-possible removal error subtraction item includes a case where a player who generates error, thus giving possession to an opponent team, upon offense, and thus has a half or less responsibility is given, and a case where a player who has his ball fumbled or pass cut in a situation where he has to pass a ball to a co-player while doing personal and team play upon offense, but does not lose possession through tact of the person in question or the co-player is given.

(13) The full score chance dissipation error subtraction item includes a case where a player who receives an assist pass in a full no-mark situation (distance of about the 3 second limit section), but fails in shooting, upon attack, is given, a case where a player who fails a free throw in the free throw upon attack is given, a case where a player who commits error in an in-play situation while a free throw is being attempted or immediately after the attempt is made upon attack, and thus has the free throw cancelled is given, a case where a player who attempt three score shooting without giving assist pass to a co-player of a full chance (no-mark under-goal) in a swift attack upon attack, but fails is given, and a case where a player who commits error while passing without shooting in full chance (under-goal and lay-up, etc.) in a swift attack upon attack, but holds the possession is given.

(14) The indirect score chance dissipation error subtraction item includes a case where a player who receives an assist pass in a full no-mark situation (distance of about the 3 second limit section), but fails in shooting, upon attack, is given, and a case where a player who does an assist pass in a full no-mark situation (distance of about the 3 second limit section), but commits catch miss, upon attack, is given.

(15) The common full score chance dissipation error subtraction item includes a case where a player who receives an assist pass in a full no-mark situation (distance of about the 3 second limit section), but fails in shooting, upon attack, is given, and a case where a player who attempts a field goal in a full no-mark chance through self-effort (individual skill) upon attack, but fails is given (including all regions).

(16) The general indirect score chance dissipation error subtraction item includes a case where a player who receives an assist pass in an indirect no-mark situation (distance of about the 3 second limit section), but fails in shooting, upon attack, is given, and a case where a player who attempts a field goal in an indirect no-mark chance through self-effort (individual skill) upon attack, but fails in the field goal is given (including all regions).

(17) The game basic ability lack (ball possession miss, pass miss, dribble miss, catch miss, the 3 second limit rule, traveling, double dribble, etc.) error subtraction item includes a case where a player who has a half of the responsibility in which a co-player makes a ball a jump ball or has its possession taken by an opponent team upon offense when a ball is fumbled while holding the ball, when the ball becomes a held ball while holding the ball, when committing pass miss, when committing dribble miss, when committing catch miss, etc., is given, a case where a player who commits error is given in a state the player commits error upon offense and loses possession, and when a co-player in a reverse attack of an opponent team, a case where a player who has his ball fumbled or pass cut in a situation where he has to pass a ball to a co-player while doing personal and team play upon offense, but does not lose possession through tact of the person in question or the co-player is given, a case where a player who fails in shooting in a full no-mark chance (under-goal or 3 second area region) upon offense is given, a case where a player who commits line cross error while doing personal and team play, and thus loses possession upon offense is given, a case where a player who loses possession while passing a ball from the under-basket to the upper side while attempting pass upon offense is given, a case where a player who has his ball stolen while holding the ball and dribbling the ball at the front court high point upon offense, or has his ball intercepted while passing the ball is given, a case where a player who commits error while passing without shooting in full chance (under-goal and lay-up, etc.) in a swift attack upon attack, but holds the possession is given, and a case where a player who commits error while passing without shooting in full chance (under-goal and lay-up, etc.) in a swift attack upon attack, but holds the possession is given.

(18) The score addition chance dissipation error subtraction item includes a case where a player who attempts a free throw but fails in the free throw instead of a player who is court out due to wound during play is given, and a case where a player who attempts a free throw instead of a team due to technical foul from an opponent team, upon attack, but fails in the free throw is given.

(19) The victory factor removal error subtraction item includes a case where a player who commits violation, and causes a point to be canceled in a situation where a co-player attempts a field goal or a free throw to get a goal upon offense is given, a case where a player who commits foul and causes a point to be canceled in a situation where a shooter attempts a field goal or a free throw to get a goal upon offense is given, a case where a player who commits foul to provide a free throw before no player holds a ball upon offense (team foul application) is given, a case where a player who fails a free throw in the free throw upon attack is given, a case where a player who attempt three score shooting without assist pass of a full chance in a swift attack upon attack, but fails, resulting in a failed team score is given, a case where a player who commits error while passing without shooting in full chance (under-goal and lay-up, etc.) and fails in scoring in a swift attack upon attack, but holds the possession is given, and a case where a player who passes a ball without shooting at a full chance (under-goal and lay-up, etc.) in a swift attack upon attack, commits error not to get a point, and also loses possession is given.

(20) The unreasonable shooting attempt error subtraction item includes a case where a player who has his ball blocked while attempting shooting upon offense is given, and a case where a player who attempts shooting (no goal in) and thus does not give a chance of rebound in a state where attack rebound of co-players are absent upon offense co-player is given.

(21) The right shooting timing lack error subtraction item includes a case where a player who attempts shooting (no goal in) and thus does not give a chance of rebound in a state where attack rebound of co-players are absent upon offense co-player is given, a case where a player who is provided with a full shooting change through teamwork, but does not shooting, upon attack, is given, a case where a player who attempt three score shooting without assist pass in swift attack upon attack, but fails is given, a case where a player who passes a ball without attempting shooting at a full chance (under-goal and lay-up, etc.) in a swift attack upon attack, commits error (fail in score chance), but keeps possession is given, and a case where a player who passes a ball without shooting at a full chance (under-goal and lay-up, etc.) in a swift attack upon attack, commits error, and also loses possession is given.

(22) The teamwork cooperation lack error subtraction item includes a case where a player who has less error when possession is lost since miss sign when an out ball is in-play upon attack is given, and a case where a player who does not participate in a situation where possession is lost due to miss sign when an out ball is in-play upon attack is given.

(23) The full teamwork cooperation lack error subtraction item includes a case where a player who has higher or the same error when possession is lost since miss sign when an out ball is in-play upon attack is given, and a case where a player who loses possession due to five second error by approach defense, five second error by post-up, 8 second half line error, and attack time 24 second exceeding error, upon offense, is given.

(24) The positive participation lack error subtraction item includes a case where a player who loses possession due to miss sign when an out ball is in-play upon attack, and does not participate in the situation other than a catcher is given, and a case where a player who loses possession due to five second error by approach defense, five second error by post-up, 8 second half line error, and attack time 24 second exceeding error, upon offense, is given.

(25) The full positive participation lack error subtraction item includes a case where a player who has his ball taken by an opponent although a co-player makes live the ball that is tried to be out into the court through tact is given.

(26) The prediction ability lack error subtraction item includes a case where a player who causes shooting ball to touch or not to touch a ring, go pass by (touch) the hands and goes out, and allows the possession of a ball to be given to an opponent team, and a case where a player who loses possession while passing a ball from the under-basket to the upper side while attempting pass upon offense is given.

(27) The personal defense shrinkage load error subtraction item includes a case where a player who commits four and allows the possession of a ball to be given to an opponent team, upon offense, in a state where the ball does not belong to any team is given, and a case where a player who commits offense foul while doing personal and team play, and loses possession, upon offense is given.

(28) The team member personal defense shrinkage load error subtraction item includes a case where a player who commits error is given in a state the player commits error upon offense and loses possession, and when a co-player in a reverse attack of an opponent team.

(29) The team defense shrinkage degeneracy error subtraction item includes a case where a player who commits foul in a state where a ball does not belong to any team upon offense, and allows the possession of the ball to belong to an opponent team, is given, a case where a player who commits four and allows the possession of a ball to be given to an opponent team, upon offense, in a state where the ball does not belong to any team, a case where a player who generates offense foul (intentional, flagrant, punching, etc.) while doing personal and team play upon offense, and loses the possession is given, and a case where a player who commits error is given in a state the player commits error upon offense and loses possession, and when a co-player in a reverse attack of an opponent team.

(30) The teamwork lowering fostering error subtraction item includes a case where a player who commits flagrant foul while doing personal and team play upon offense, and is thus made walk out is given, and a case where a player who attempts three-point shooting in a situation in which 2-point possibility is sure if giving assist pass in a swift attack upon attack, but fails in the three-point shooting is given.

(31) The teamwork formation obstruction error subtraction item includes a case where a player who commits flagrant foul while doing personal and team play upon offense, and is thus made walk out is given, and a case where a player who commits punching foul, etc., while doing personal and team play upon offense, and is thus ordered to walk out and not to attend one or more plays, is given.

(32) The instant chance co operation lack error subtraction item includes a case where a player who has his ball fumbled or pass cut in a situation where he has to pass a ball to a co-player while doing personal and team play upon offense, but does not lose possession through tact of the person in question or the co-player is given.

(33) The opponent swift attack-possible chance assignment error subtraction item includes a case where a player who commits error to generate a swift attack upon offense error is given, and a case where a player who has his ball stolen while holding the ball and dribbling the ball at the front court high point upon offense, or has his ball intercepted while passing the ball is given.

(34) The opponent free throw-possible assignment error subtraction item includes a case where a player who generates error upon offense and thus loses possession, and in this state, a co-player commits foul and a free throw is given in a reverse attack (swift attack) of an opponent team, is given.

Thirdly, the principle of writing each of the defense addition factors is as follows.

(1) The full possible losing point dissipation contribution addition item includes a case where a player who is given with the shooting (within 3 second limit section) but fails in scoring in a situation in which the player defends an offense player through positive and negative defense, upon defense, is given, a case where a player who does not allow shooting with tack in a situation of a swift attack and no-mark, upon defense, thereby causing error to occur and not allowing a point, but does not secure possession or in this situation, secures even possession is given, a case where a player who positively defends a single lay-up chance of an offense player, upon defense, and not allows a losing point is given, a case where a player who attempts block shooting within the 3 second limit section and a player who produces a jump ball common possession (held ball) of a ball immediately after stop when attempting a dunk and a field goal within the 3 second limit section, upon defense, are given, and a case where a player who defends an assist (within the 3 second limit section) of an offense player with good defense and also gets possession, or a player who does not get possession in the same situation, upon defense, is given.

(2) The possible losing point (factor) dissipation contribution addition item includes a case where a player who is given with the shooting (outside the 3 second limit section) but fails in scoring in a situation in which the player defends an offense player through positive and negative defense, upon defense, is given, a case where a player who allows shooting in a situation of a switch mark among defense players, but does not allow a losing point, upon defense, is given, a case where a player who commits offense foul (intentional, flagrant, punching, etc.) while doing personal and team play upon defense, and gets possession is given, a case where a player who snatches a ball with the help of co-players (good defense) upon defense is given, a case where a player who commits violation (jump ball) simultaneously with an opponent player in an in-play situation immediately after the free throw upon defense, and cancels the free throw is given, a case where a player who commits foul that does not allow a free throw when the number of defense players is smaller than that of attack players due to error of a co-player upon defense is given, a case where a player who has foul by an offense player, while participating rebound to catch an air ball or a loose ball, upon defense, and thus gets possession is given, a case where a player who attempts block shooting outside the 3 second limit section, upon defense, is given, a case where a player who commits violation (the basket interfere, goaltending, etc.) simultaneously with an offense player upon defense in a situation in which shooting of an offense player is no goal, and thus produces a jump ball, is given, a case where a player who defends an assist (within the 3 second limit section) of an offense player and also gets possession, or a player who does not get possession in the same situation, upon defense, is given, a case where a player who has a higher or similar degree of contribution than or as a co-player when allowing the co player to catch a shooting ball by an offense player through a tap pass during defense, or a player who has a higher or similar degree of contribution than or as a tapper in the same situation, is given, and a case where a player who throws a ball, which is shoot or played by an offense player and is then about to be out after touching the hands or the body of a defense player, to the body of the offense player, or hits the body of the offense player, upon defense, so that the ball is sent to a co-player, resulting in getting possession, is given.

(3) The full losing point allowance dissipation contribution addition item includes a case where a player who commits violation (basket interfere, goaltending, etc.) simultaneously with an offense player, upon defense, in a situation in which shooting of an offense player is a goal, and makes the goal no point and a jump ball, is given.

(4) The possession acquisition-possible assignment contribution addition item includes a case where a player who is given with the shooting, but fails in scoring in a situation in which the player defends an offense player through positive and negative defense, upon defense, is given (defense rebound), a case where a player who allows shooting in a situation of a switch mark among defense players, but does not allow a losing point, upon defense, is given, a case where a player who positively defends a single lay-up chance of an offense player, upon defense, and not allows a losing point is given, a case where a player who causes fumble of an offense player to produce a chance of a jump ball, upon defense, is given, a case where a player who commits violation (basket interfere, goaltending, etc.) simultaneously with an offense player, upon defense, in a situation in which shooting of an offense player is a goal, and makes the goal no point and a jump ball, is given, a player who produces a jump ball in a no goal situation is given, a case where a player who causes a held ball from an offense player with self-effort, and attempts a jump ball, upon defense, is given, a case where a player who attempts a jump ball when committing violation simultaneously with an offense player in an in-play situation immediately after a free throw, upon defense, is given, a case where a layer who helps a co-player to steal or snatch a ball, upon defense, or a player who allows a co-player to catch a ball by attempting the same situation, is given, a case where a layer who causes error of an offense player, upon defense, but does not get possession, is given, a case where a layer who protects a pass road when an offense player does slow in, helping five second error to occur, upon defense, is given, a case where a layer who strikes a ball of an offense player so that a co-player can catch the ball, upon defense, or a player who intentionally strikes a fumbled ball so that the co-player can catch the ball, is given, a case where a player who attempts block shooting within the 3 second limit section and a player who produces a jump ball common possession (held ball) of a ball immediately after stop when attempting a dunk and a field goal within the 3 second limit section, upon defense, are given, a case where a player helps a co-player to catch a shooting ball by an offense player through tap pass, upon defense, although it is little or great, is given, and a case where a player who attempts box out in order to catch a ball immediately after shooting of an opponent player, unprepared touch of a ball, assist of a co-player's rebound, etc., upon defense, is given.

(5) The shooting fail factor assignment contribution addition item includes a case where a player who allows shooting to an offense player due to negative behavior, upon defense, but does not allow the shooting to be a point, is given, and a case where a player who allows shooting in a switch mark situation among defense players, but does not allow a losing point, upon defense, is given.

(6) The full shooting fail factor assignment contribution addition item includes a case where a player who allows shooting to an offense player in positive behavior (defense such as alley-oop and no mark lay-up), upon defense, but does not allow the shooting to be a point, is given, a case where a player who positively defends a single lay-up chance of an offense player, upon defense, and not allows a losing point is given, and a case where a player who attempts block shooting within the 3 second limit section and a player who produces a jump ball common possession (held ball) of a ball immediately after stop when attempting a dunk and a field goal within the 3 second limit section, upon defense, are given.

(7) The shooting mental shrinkage contribution addition item includes a case where a player who attempts block shooting within and outside the 3 second limit section and a player who produces a jump ball common possession (held ball) of a ball immediately after stop when attempting a dunk and a field goal within and outside the 3 second limit section, upon defense, are given.

(8) The counter team morale lowering contribution addition item includes a case where a player who allows an offense player to shooting, but does not allow the shooting to a point, upon defense, is given, a case where a player who allows shooting in a situation of a switch mark among defense players, but does not allow a losing point, upon defense, is given, a case where a layer who causes error of an offense player with tact in a swift attack and no-mark situation, upon defense, but does not get possession, is given, a case where a player who causes fumble of an offense player to produce a chance of a jump ball, upon defense, is given, a case where a player who causes a held ball from an offense player with self-effort, and attempts a jump ball, upon defense, is given, a case where a layer who helps a co-player to steal or snatch a ball, upon defense, is given, or a player who allows a co-player to catch a ball by attempting the same situation, is given, a case where a layer who protects a pass road when an offense player does slow in, helping five second error to occur, upon defense, is given, a case where a player who positively defends a single lay-up chance of an offense player, upon defense, and not allows a losing point is given, a case where a player who has foul by an offense player while participating rebound to catch an air ball or a loose ball upon defense, and thus gets possession is given, a case where a layer who strikes a ball of an offense player so that a co-player can catch the ball, or a player who intentionally strikes a fumbled ball so that the co-player can catch the ball, upon defense, is given, a case where a layer who defends an assist of an offense player with good defense, upon defense, but does not secure possession, is given, and a case where a player who has a lower degree of contribution than that of a co-player when allowing a co-player to catch a shooting ball of an offense player through tap pass during defense, is given.

(9) The direct other party morale lowering contribution addition item includes a case where a player who does not allow shooting with tack in a swift attack and no-mark situation, causes error to occur, not allows shooting, and secures possession, upon defense, is given, a case where a player who commits offense foul (intentional, flagrant, punching, etc.) while doing personal and team play upon defense, and gets possession is given, a case where a player who snatches a ball with the help of co-players (good defense) upon defense is given, a case where a player who induces five second error through approach defense, and directly helps to obtain possession, upon defense, is given, a case where a player who snatches a pass ball in a situation in which a co-player induces error, upon defense, is given, a case where a player who catches a fumbled ball by a co-player is given, a case where a player who causes error of an offense player with good defense, and thus independently acquires (steal) possession, upon defense, is given, a case where a player who attempts block shooting within and outside the 3 second limit section and a player who produces a jump ball common possession (held ball) of a ball immediately after stop when attempting a dunk and a field goal within and outside the 3 second limit section, upon defense, are given, a case where a player who commits violation (basket interfere, goaltending, etc.) simultaneously with an offense player, upon defense, in a situation in which shooting of an offense player is a goal, and makes the goal no point and a jump ball, is given, a case where a player who defends an assist (within the 3 second limit section) of an offense player and also gets possession, a case where a player who has a higher or similar degree of contribution than or as a co-player when allowing the co-player to catch a shooting ball by an offense player through a tap pass during defense, or a player who has a higher or similar degree of contribution than or as a tapper in the same situation, is given, and a case where a player who throws a ball, which is shoot or played by an offense player and is then about to be out after touching the hands or the body of a defense player, to the body of the offense player, or hits the body of the offense player, upon defense, so that the ball is sent to a co-player, resulting in getting possession, is given.

(10) The possible losing point prevention contribution addition item includes a case where a player who commits foul, while assisting the defense of offense of a co-player, upon defense, and thus causes a game to stop, is given, a case where a player who commits foul that does not allow a free throw when the number of defense players is smaller than that of attack players due to error of a co-player upon defense, a case where a layer who does not allow shooting with tact in a swift attack and no-mark situation, upon defense, causes error, but does not secure possession, is given, a case where a player who does not allow shooting with tack in a swift attack and no-mark situation, causes error to occur, not allows shooting, and secures possession, upon defense, is given, a case where a player who snatches a ball with the help of co-players (good defense) or a player who snatches a pass ball in a situation in which a co-player induces error, upon defense, is given, a case where a player who induces five second error through approach defense, and directly helps to obtain possession, upon defense, is given, a case where a player who has foul by an offense player while participating rebound to catch an air ball or a loose ball upon defense, and thus gets possession is given, a case where a player who catches rebound to acquire possession, upon defense, is given, a case where a player who causes error of an offense player with good defense, and thus independently acquires (steal) possession, upon defense, is given, a case where a layer who strikes a ball of an offense player so that a co-player can catch the ball, or a player who intentionally strikes a fumbled ball so that the co-player can catch the ball, upon defense, is given, and a case where a player who defends an assist (within the 3 second limit section) of an offense player with good defense and also gets possession, or a player who does not get possession in the same situation, upon defense, is given.

(11) The game rhythm interception contribution addition item includes a case where a player who commits foul while assisting offense of a co-player, upon defense, is given, a case where a player who commits foul that does not allow a free throw or foul that allows a free throw, when the number of defense players is smaller than that of attack players due to error of a co-player, is given, a case where a player who commits foul while assisting defense of offense of a co-player when practicing a team foul, during defense, and thus allows two free throws is given, a case where a player who commits foul that does not allow a free throw when the number of defense players is smaller than that of attack players due to error of a co-player upon defense, a case where a layer who does not allow shooting with tact in a swift attack and no-mark situation, upon defense, causes error, but does not secure possession, is given, a case where a player who does not allow shooting with tack in a swift attack and no-mark situation, causes error to occur, not allows shooting, and secures possession, upon defense, is given, a case where a player who breaks the flow of a game by temporarily intercepting a ball of an attack player (kicking, pass interception touch out, foul induction, etc.) upon defense, is given, a case where a player who causes fumble of an offense player to produce a chance of a jump ball, upon defense, is given, a case where a player who causes a held ball from an offense player with self-effort, and attempts a jump ball, upon defense, is given, a case where a layer who helps a co-player to steal or snatch a ball, upon defense, is given, or a player who allows a co-player to catch a ball by attempting the same situation, is given, a case where a layer who causes error of an offense player, upon defense, but does not get possession, is given, a case where a layer who protects a pass road when an offense player does slow in, helping five second error to occur, upon defense, is given, a case where a player who commits violation (basket interfere, goaltending, etc.) simultaneously with an offense player, upon defense, in a situation in which shooting of an offense player is a goal, and makes the goal no point and a jump ball, is given, a case where a player who defends an assist (within and outside the 3 second limit section) of an offense player with good defense and also gets possession, or a player who does not get possession in the same situation, upon defense, is given.

(12) The teamwork stability opponent assignment contribution addition item includes a case where a player who commits foul while assisting offense of a co-player, upon defense, is given, a case where a player who commits foul that does not allow a free throw or foul that allows a free throw, when the number of defense players is smaller than that of attack players due to error of a co-player, is given, a case where a player who commits foul, while assisting defense of offense of a co-player when a team foul is practiced, during defense, and allows a free throw, is given, a case where a player who allows shooting while assisting defense of offense of a co-player when a team foul is practiced, during defense, but not allows a losing point is given, a case where a player who allows shooting in a situation of a switch mark among defense players, but does not allow a losing point, upon defense, is given, a case where a player who commits offense foul (intentional, flagrant, punching, etc.) while doing personal and team play upon defense, and gets possession is given, a case where a player who causes fumble of an offense player to produce a chance of a jump ball, upon defense, is given, a case where a player who snatches a ball with the help of co-players (good defense) upon defense is given, a case where a player who snatches a pass ball in a situation in which a co-player induces error, upon defense, is given, a case where a player who positively defends an offense player who breaks through a co-player, upon defense, and thus contributes to formation of a normal defense shape, is given, a case where a player who induces five second error through approach defense, and directly helps to obtain possession, upon defense, is given, a case where a player who catches rebound to acquire possession, upon defense, is given, a case where a player who causes error of an offense player with good defense, and thus independently acquires (steal) possession, upon defense, is given, a case where a layer who strikes a ball of an offense player so that a co-player can catch the ball, or a player who intentionally strikes a fumbled ball so that the co-player can catch the ball, upon defense, is given, a case where a player who commits violation (basket interfere, goaltending, etc.) simultaneously with an offense player, upon defense, in a situation in which shooting of an offense player is a goal, and makes the goal no point and a jump ball, is given, a case where a player who defends an assist (within and outside the 3 second limit section) of an offense player and also gets possession, or a player who does not get possession in the same situation, upon defense, is given, a case where a player who helps a co-player to catch a shooting ball of an offense player through a tap pass, or directly catches the shooting ball by the offense player, during defense, is given, and a case where a player who throws a ball, which is shoot or played by an offense player and is then about to be out after touching the hands or the body of a defense player, to the body of the offense player, or hits the body of the offense player, upon defense, so that the ball is sent to a co-player, resulting in getting possession, is given.

(13) The losing point minimum-possible assignment contribution addition item includes a case where a player who commits foul while assisting defense of offense of a co-player when practicing a team foul, during defense, and thus allows two free throws is given, a case where a player who intentionally commits foul, and thus allows a free throw, upon defense, in a situation in which an attack right (a team foul is applied) is needed to obtain, and a case where a player who commits foul that does not allow a free throw or foul that allows a free throw, when the number of defense players is smaller than that of attack players due to error of a co-player, is given.

(14) The optimal defense ability contribution addition item includes a case where a player who allows shooting in a positive action situation, but does not allow a losing point, upon defense, is given, a case where a player who allows shooting in a situation of a switch mark among defense players, but does not allow a losing point, upon defense, is given, a case where a player who commits foul that does not allow a free throw when the number of defense players is smaller than that of attack players due to error of a co-player upon defense, a case where a layer who does not allow shooting with tact in a swift attack and no-mark situation, upon defense, causes error, but does not secure possession, is given, a case where a player who causes fumble of an offense player to produce a chance of a jump ball, upon defense, is given, a case where a player who causes a held ball from an offense player with self-effort, and attempts a jump ball, upon defense, is given, a case where a player who intentionally commits foul, and thus allows a free throw, upon defense, in a situation in which an attack right (a team foul is applied) is needed to obtain, a case where a player who positively defends a single lay-up chance of an offense player, upon defense, and not allows a losing point is given, a case where a player who commits violation (basket interfere, goaltending, etc.) simultaneously with an offense player, upon defense, in a situation in which shooting of an offense player is a goal, and makes the goal no point and a jump ball, is given, a case where a player who defends an assist (within and outside the 3 second limit section) of an offense player, but does not get possession, is given, a case where a player who has a smaller degree of contribution than that of a co-player when helping the co-player to catch a shooting ball of an offense player through tap pass, during defense, or has a smaller degree of contribution than that of a tapper in the same situation, and a case where a player who throws a ball, which is shoot or played by an offense player and is then about to be out after touching the hands or the body of a defense player, to the body of the offense player, or hits the body of the offense player, upon defense, so that the ball is sent to a co-player, resulting in getting possession, is given.

(15) The full optimal defense ability contribution addition item includes a case where a player who allows shooting while assisting defense of offense of a co-player when a team foul is practiced, during defense, but not allows a losing point is given, a case where a player who does not allow shooting with tack in a swift attack and no-mark situation, causes error to occur, not allows shooting, and secures possession, upon defense, is given, a case where a player who causes offense-foul (intentional, flagrant, etc.) to occur, and thus obtains possession, upon defense, is given, a case where a player who snatches a ball with the help of co-players (good defense) upon defense is given, a case where a player who snatches a pass ball in a situation in which a co-player induces error, upon defense, is given, a case where a player who catches a fumbled ball is given, a case where a player who induces five second error through approach defense, and directly helps to obtain possession, upon defense, is given, a case where a player who catches rebound to acquire possession, upon defense, is given, a case where a player who causes error of an offense player with good defense, and thus independently acquires (steal) possession, upon defense, is given, a case where a layer who strikes a ball of an offense player so that a co-player can catch the ball, or a player who intentionally strikes a fumbled ball so that the co-player can catch the ball, upon defense, is given, a case where a player who attempts block shooting within and outside the 3 second limit section and a player who produces a jump ball common possession (held ball) of a ball immediately after stop when attempting a dunk and a field goal within and outside the 3 second limit section, upon defense, are given, a case where a player who commits violation (basket interfere, goaltending, etc.) simultaneously with an offense player, upon defense, in a situation in which shooting of an offense player is a goal, and makes the goal no point and a jump ball, is given, a case where a player who defends an assist (within and outside the 3 second limit section) of an offense player and also gets possession, is given, a case where a player who has a higher or similar degree of contribution than or as a co-player when allowing the co-player to catch a shooting ball by an offense player through a tap pass during defense, or a player who has a higher or similar degree of contribution than or as a tapper in the same situation, is given, and a case where a player who throws a ball, which is shoot or played by an offense player and is then about to be out after touching the hands or the body of a defense player, to the body of the offense player, or hits the body of the offense player, upon defense, so that the ball is sent to a co-player, resulting in getting possession, is given.

(16) The defense positive participation contribution addition item includes a case where a player who allows an attempt of shooting, but does not allow a point through positive defense, when an opponent player attempts shooting of alley-oop, no-mark lay-up, etc., upon defense, is given, a case where a player who takes positive assistance defense since a co-player is broken through, upon defense, but allows shooting to a co-player offense, and allows a losing point, is given, a case where a player who breaks the flow of a game by temporarily intercepting a ball of an attack player, is given, a case where a layer who helps a co-player to steal or snatch a ball, upon defense, is given, or a player who allows a co-player to catch a ball by attempting the same situation, is given, a case where a player who positively defends an offense player who breaks through a co-player, upon defense, and thus contributes to formation of a normal defense shape, is given, a case where a layer who causes error of an offense player, upon defense, but does not get possession, is given, a case where a layer who protects a pass road when an offense player does slow in, helping five second error to occur, upon defense, is given, a case where a layer who strikes a ball of an offense player so that a co-player can catch the ball, or a player who intentionally strikes a fumbled ball so that the co-player can catch the ball, upon defense, is given, a case where a player who causes a held ball from an offense player with self-effort, and attempts a jump ball, upon defense, is given, a case where a player who commits violation (basket interfere, goaltending, etc.) simultaneously with an offense player, upon defense, in a situation in which shooting of an offense player is a goal, and makes the goal no point and a jump ball, is given, a case where a player who defends an assist (within and outside the 3 second limit section) of an offense player, but does not get possession, is given, a case where a player who has a smaller degree of contribution than that of a co-player when helping the co-player to catch a shooting ball of an offense player through tap pass, during defense, or has a smaller degree of contribution than that of a tapper in the same situation, a case where a player who attempts box out in order to catch a ball immediately after shooting of an opponent player, unprepared touch of a ball, assist of a co-player's rebound, etc., upon defense, is given, and a case where a player who throws a ball, which is shoot or played by an offense player and is then about to be out after touching the hands or the body of a defense player, to the body of the offense player, or hits the body of the offense player, upon defense, so that the ball is sent to a co-player, resulting in failing in possession, is given.

(17) The full defense positive participation contribution addition item includes a case where a player allows shooting to a co-player offense, but not allows a losing point, in a situation where the player takes positive assistance defense since a co-player is broken through, upon defense, is given, a case where a player who snatches a ball with the help of co-players (good defense) upon defense is given, a case where a player who snatches a pass ball in a situation in which a co-player induces error, upon defense, is given, a case where a player who catches a fumbled ball is given, a case where a player who induces five second error through approach defense, and directly helps to obtain possession, upon defense, is given, a case where a player who has foul by an offense player while participating rebound to catch an air ball or a loose ball upon defense, and thus gets possession is given, a case where a player who catches rebound to acquire possession, upon defense, is given, a case where a player who causes error of an offense player with good defense, and thus independently acquires (steal) possession, upon defense, is given, a case where a player who attempts block shooting within and outside the 3 second limit section and a player who produces a jump ball common possession (held ball) of a ball immediately after stop when attempting a dunk and a field goal within and outside the 3 second limit section, upon defense, are given, a case where a player who commits violation (basket interfere, goaltending, etc.) simultaneously with an offense player, upon defense, in a situation in which shooting of an offense player is a goal, and makes the goal no point and a jump ball, is given, a case where a player who defends an assist (within and outside the 3 second limit section) of an offense player and also gets possession, is given, a case where a player who has a higher or similar degree of contribution than or as a co-player when allowing the co-player to catch a shooting ball by an offense player through a tap pass during defense, or a player who has a higher or similar degree of contribution than or as a tapper in the same situation, is given, and a case where a player who throws a ball, which is shoot or played by an offense player and is then about to be out after touching the hands or the body of a defense player, to the body of the offense player, or hits the body of the offense player, upon defense, so that the ball is sent to a co-player, resulting in getting possession, is given.

(18) The teamwork assistance contribution addition item includes a case where a player who takes positive assistance defense since a co-player is broken through, upon defense, but allows shooting to a co-player offense, and allows a losing point, is given, a case where a player who allows shooting in a situation of a switch mark among defense players, but does not allow a losing point, upon defense, is given, a case where a layer who helps a co-player to steal or snatch a ball, upon defense, is given, or a player who allows a co-player to catch a ball by attempting the same situation, is given, a case where a player who positively defends an offense player who breaks through a co-player, upon defense, and thus contributes to formation of a normal defense shape, is given, a case where a player who intentionally commits foul, and thus allows a free throw, upon defense, in a situation in which an attack right (a team foul is applied) is needed to obtain, a case where a layer who protects a pass road when an offense player does slow in, helping five second error to occur, upon defense, is given, a case where a layer who strikes a ball of an offense player so that a co-player can catch the ball, or a player who intentionally strikes a fumbled ball so that the co-player can catch the ball, upon defense, is given, a case where a layer who helps a co-player to catch a shooting ball of an offense player through tap pass, or a player who directly catches the shooting ball in the same situation, upon defense, is given, a case where a player who attempts box out in order to catch a ball immediately after shooting of an opponent player, unprepared touch of a ball, assist of a co-player's rebound, etc., upon defense, is given, and a case where a player who throws a ball, which is shoot or played by an offense player and is then about to be out after touching the hands or the body of a defense player, to the body of the offense player, or hits the body of the offense player, upon defense, so that the ball is sent to a co-player, resulting in failing in possession, is given.

(19) The error inducing factor assignment contribution addition item includes a case where a layer who causes error of an offense player without allowing shooting with tact in a swift attack and no-mark situation, upon defense, but does not get possession, is given, a case where a layer who causes error of an offense player, upon defense, but does not get possession, is given, a case where a layer who helps a co-player to steal or snatch a ball, upon defense, is given, a case where a player who causes fumble of an offense player to produce a chance of a jump ball, upon defense, is given, a case where a player who causes a held ball from an offense player with self-effort, and attempts a jump ball, upon defense, is given, a case where a layer who protects a pass road when an offense player does slow in, helping five second error to occur, upon defense, is given, a case where a player who attempts block shooting within and outside the 3 second limit section and a player who produces a jump ball common possession (held ball) of a ball immediately after stop when attempting a dunk and a field goal within and outside the 3 second limit section, upon defense, are given, and a case where a player who commits violation (basket interfere, goaltending, etc.) simultaneously with an offense player, upon defense, in a situation in which shooting of an offense player is no goal, and makes the goal no point and a jump ball, is given.

(20) The full error-inducing assignment contribution addition item includes a case where a player who does not allow shooting with tact in a swift attack and no-mark situation, causes error not to allow a point, and obtains possession, upon defense, is given, a case where a player who causes offense-foul (intentional, flagrant, etc.) to occur, and thus obtains possession, upon defense, is given, a case where a player who helps a co-player to catch a fumbled ball in an attempt of steal or snatch, upon defense, is given, a case where a layer who strikes a ball of an offense player so that a co-player can catch the ball, or a player who intentionally strikes a fumbled ball so that the co-player can catch the ball, upon defense, is given, a case where a player who commits violation (basket interfere, goaltending, etc.) simultaneously with an offense player, upon defense, in a situation in which shooting of an offense player is no goal, and makes the goal no point and a jump ball, is given.

(21) The score chance-possible assignment contribution addition item includes a case where a player who does not allow shooting with tack in a swift attack and no-mark situation, causes error to occur, not allows shooting, and secures possession, upon defense, is given, a case where a player who causes offense-foul (intentional, flagrant, punching, loose ball, etc.) to occur, and thus obtains possession, upon defense, is given, a case where a player who induces five second error through approach defense, and directly helps to obtain possession, upon defense, is given, a case where a player who snatches a pass ball in a situation in which a co-player induces error, upon defense, is given, a case where a player who catches a fumbled ball is given, a case where a player who catches rebound to acquire possession, upon defense, is given, a case where a player who causes error of an offense player with good defense, and thus independently acquires (steal) possession, upon defense, is given, a case where a player who defends an assist (within and outside the 3 second limit section) of an offense player and also gets possession, is given, a case where a player who has a higher or similar degree of contribution than or as a co-player when allowing the co-player to catch a shooting ball by an offense player through a tap pass during defense, or a player who has a higher or similar degree of contribution than or as a tapper in the same situation, is given, and a case where a player who throws a ball, which is shoot or played by an offense player and is then about to be out after touching the hands or the body of a defense player, to the body of the offense player, or hits the body of the offense player, upon defense, so that the ball is sent to a co-player, resulting in getting in possession, is given.

(22) The full score-possible assignment contribution addition item includes a case where a player who causes offense-foul (intentional, flagrant, punching, etc.) to occur, upon defense, and thus obtains a chance of a free throw and possession, is given.

(23) The other party personal defense shrinkage contribution addition item includes a case where a player who induces offense foul (personal, intentional, flagrant, punching, the loose ball, etc.) upon defense, is given.

(24) The opponent team defense shrinkage contribution addition item includes a case where a player who induces offense foul (personal, intentional, flagrant, punching or loose ball), upon defense, is given.

(25) The defense confusion recovery contribution addition item includes a case where a player who positively defends an offense player who breaks through a co-player, upon defense, and thus contributes to formation of a normal defense shape, is given, and a case where a player who commits foul that does not allow a free throw or foul that allows a free throw, when the number of defense players is smaller than that of attack players due to error of a co-player, is given.

(26) The possession acquisition contribution addition item includes a case where a player who induces five second error through approach defense, and directly helps to obtain possession, upon defense, is given, a case where a player who commits offense foul (intentional, flagrant, punching, etc.) and thus obtains possession, upon defense, is given, a case where a player who snatches a ball with the help of co-players (good defense) upon defense is given, a case where a player who snatches a pass ball in a situation in which a co-player induces error, upon defense, is given, a case where a player who catches a fumbled ball is given, a case where a player who does not allow shooting with tack in a swift attack and no-mark situation, causes error to occur, not allows shooting, and secures possession, upon defense, is given, a case where a player who has foul by an offense player while participating rebound to catch an air ball or a loose ball upon defense, and thus gets possession is given, a case where a player who catches rebound to acquire possession, upon defense, is given, a case where a player who causes error of an offense player with good defense, and thus independently acquires (steal) possession, upon defense, is given, a case where a player who defends an assist (within and outside the 3 second limit section) of an offense player and also gets possession, is given, a case where a player who has a higher or similar degree of contribution than or as a co-player when allowing the co-player to catch a shooting ball by an offense player through a tap pass during defense, or a player who has a higher or similar degree of contribution than or as a tapper in the same situation, is given, and a case where a player who throws a ball, which is shoot or played by an offense player and is then about to be out after touching the hands or the body of a defense player, to the body of the offense player, or hits the body of the offense player, upon defense, so that the ball is sent to a co-player, resulting in getting possession, is given.

(27) The opponent teamwork formation hindering contribution addition item includes a case where a player who commits flagrant foul while doing personal and team play upon defense, and is thus made walk out is given.

(28) The opponent team member formation obstruction contribution addition item includes a case where a player who causes a subject player to commit offense foul (flagrant, punching, etc.), upon defense, thus walking out and not attending one game, is given, a case where a player who commits flagrant foul while doing personal and team play upon offense, and is thus made walk out is given, a case where a player who commits punching foul, etc., while doing personal and team play upon offense, and is thus ordered to walk out and not to attend one or more plays, is given.

(29) The swift attack-possible chance providing contribution addition item includes a case where a player who causes error of an offense player with good defense, and thus independently acquires (steal) possession, upon defense, is given, a case where a player who snatches a ball with good defense, and thus acquires possession, upon defense, is given, and a case where a layer who strikes a ball of an offense player so that a co-player can catch the ball, a player who intentionally strikes a fumbled ball so that the co-player can catch the ball, upon defense, or a player who catches the fumbled ball, is given.

(30) The positive sacrifice participation contribution addition item includes a case where a player who commits foul while assisting offense of a co-player, upon defense, is given, a case where a player who commits foul that does not allow a free throw or foul that allows a free throw, when the number of defense players is smaller than that of attack players due to error of a co-player, is given, a case where a player who commits intentional foul and thus allows a free throw (for three points before game ends), in a situation in which an attack right needs to be obtained in defense (a team foul is applied), is given, a case where a player who tries to secure possession through a pass to a co-player, but fails in possession is given, a case where a player who throws a ball, which is shoot or played by an offense player and is then about to be out after touching the hands or the body of a defense player, to the body of the offense player so that the ball is out, or passes the ball to the co-player, but fails to obtain possession, is given.

Fourthly, the principle of writing each of the defense subtraction factors is as follows.

(1) The minimum self-blame losing point assignment error subtraction item includes a case where a player who takes an positive action (follow) in a shooting action when allowing shooting or field shooting comparable to under-goal as the player is broken through by an offense player and thus giving a losing point, upon defense, is given, a case where a player who has less responsibility of error, upon defense, when allowing a losing point while playing a switch mark among defense players when defending a pattern play by block and screen of an opponent, is given, a case where a player who commits foul under a shooting action of offense players when a team foul is applied, upon defense, making shooting failed, but allows a goal under a free throw situation, thus losing a point, is given, and a case where a player who commits foul under a shooting action of offense players (before and after a team foul is applied), upon defense, thus making shooting failed, but gives both the results of a losing point and a non-losing point under a free throw situation, is given.

(2) The full self-blame losing point assignment error subtraction item includes a case where a player who does not take a positive action (follow, etc.) in a shooting action when allowing shooting or field shooting comparable to under-goal as the player is broken through by an offense player and thus giving a losing point, upon defense, is given, a case where a player who has similar or great responsibility of error, upon defense, when allowing a losing point while playing a switch mark among defense players when defending a pattern play by block and screen of an opponent, a case where a player who commits foul (foul during a shooting action, a loose ball foul after a shooting action, etc.) upon defense, allows a free throw, and loses a point, is given, a case where a player who provides a free throw and loses a point, under a situation in which the player commits loose ball foul or foul during a shooting action after an offense player throws shooting, upon defense, and a case where a player who commits foul to a co-player offense of a shooter, thus providing a free throw and also losing a point, when an offense player throws shooting and a ball progress toward a basket, upon defense, is given.

(3) The full self-blame possible losing point error subtraction item includes a case where a player who commits foul a when a team foul is applied upon defense, and allows a free throw, is given, a case where a player who commits foul to allow a free throw while defending single lay-up shooting by break-through of an offense player before a team foul is applied, upon defense, is given, a case where a player who commits foul against an offense player who is slow in before the offense player is slow in a line out upon defense when a team foul is applied, and thus allows a free throw, is given, a case where a player who commits foul (losing a point) upon defense, while defending an offense player in a swift attack of an opponent team before a team foul is applied, and allows a free throw, is given, a case where a player who takes away a ball before the ball touches a ring or a back board in an in-play situation immediately after a free throw attempt of an opponent player, upon defense, thus losing a point, and commits error when one additional free throw is given, is given, a case where a player who commits violation simultaneously with a free throw fail of an offense player, upon defense, gets a re-free throw, but fails in the re-free throw, is given, a case where a player who commits foul under a shooting action of offense players before and after a team foul is applied, makes shooting failed, does not allow a goal under a free throw situation, and thus does not lose a point, is given, a case where a player who commits foul under a shooting action of offense players before and after a team foul is applied, making shooting failed, upon defense, but gives both the results of a losing point and a non-losing point under a free throw situation, is given, a case where a player who commits foul under a shooting action of offense players before and after a team foul is applied, allowing shooting to be a losing point or a non-losing point, upon defense, but allows a free throw, is given, a case where a player who commits a meaningless foul when an opponent team goes this way and that without finding a way out of an attack after a team foul is applied, upon defense, is given, a case where a player who commits a loose ball foul after an offense player throws shooting, upon defense, and provides a free throw, and a case where a player who commits foul to a co-player offense of a shooter, thus providing a free throw and also losing a point, when an offense player throws shooting and a ball progress toward a basket, upon defense, is given.

(4) The maximum self-blame losing point assignment error subtraction item includes a case where a player who does not take a minimum action (no-defense situation) when allowing shooting or field shooting comparable to under-goal as the player is broken through by an offense player and thus giving a losing point, upon defense, is given, a case where a player who commits foul while defending an offense player in a swift attack (necessary to preclude rhythm) of an opponent team before a team foul is applied, upon defense, loses a point, and also allows a free throw, is given, a case where a player who commits foul related to a point in a situation in which an attack time of an opponent team remains a little (within five seconds) upon defense before a team foul is applied, and thus allows a losing point (including free throw) is given, a case where a defense-miss player who receives assistance defense of a co-player since he misses an offense player, upon defense, but loses a points, is given, a case where a player who commits violation (line-cross, goaltending, basket interfere, etc.) in a no goal situation upon a free throw, and thus allows a re-free throw to be a goal, or a player who takes away a ball before the ball touches a ring or a back board in an in-play situation immediately after a free throw attempt of an opponent player, and thus allows a losing point, and also makes error when one additional free throw is given, is given, a case where a player who commits foul under a shooting action of offense players before a team foul is applied, upon defense, making shooting failed, but allows a goal under a free throw situation, thus losing a point, is given, and a case where a player who allows shooting to be a goal in, thus losing a point and also providing a free throw, upon defense, under a situation in which the player commits loose ball foul after an offense player throws shooting.

(5) The countermeasure absence losing point error subtraction item includes a case where a player who commits foul (during shooting action) while allowing a losing point to an offense player, upon defense, allows a free through, and thus loses a point, is given, a case where a player who commits technical or intentional foul upon defense, allows a free throw, and loses a point, is given, a case where a player who commits violation (basket interfere, goaltending, etc.) in a basket no goal situation of an offense player, upon defense, and thus provides an own team with a losing point, is given, a case where a player who allows shooting to be a goal in, thus losing a point and also providing a free throw, upon defense, under a situation in which the player commits loose ball foul after an offense player throws shooting, a case where a player who mistakenly puts a ball in own basket while playing a seesaw game with an offense player around the under-goal, upon defense, thus losing a point, is given, a case where a player who commits foul to a co-player offense of a shooter, thus providing a free throw and also losing a point, when an offense player throws shooting and a ball progress toward a basket, upon defense, is given, a case where a player who makes mistakes while attempting steal and snatch during a defense process when a team foul is applied, gets a free throw since a co-player makes alternate personal foul in a situation in which the number of defense players is smaller than that of attack players, but fails in the free throw, is given, a case where a player who makes mistakes while attempting steal and snatch upon defense, when a co-player included in the number of defense player, which is smaller than that of attack players, commits foul (shooting action) that allows a free throw, and thus does a free throw losing point, is given, and a case where a player who provides a cause of a losing point by making mistakes while attempting steal and snatch in a defense process when a co-player allows the losing point while doing the alternate defense in a situation in which the number of defense player is smaller than that of attack players, is given.

(6) The countermeasure absence possible losing point error subtraction item includes a case where a player who commits foul (during shooting action) while allowing a losing point to an offense player, upon defense, allows a free through, and thus loses a point, is given, a case where a player who commits 3 second violation, upon defense, is given with one free throw, and resets an attack time is given, a case where a player who commits technical, intentional, shoot attempt, flagrant of losing point, the fourth quarter or personal (violation having no relation to a ball) before slow in becomes in a defense situation within 2 minutes of an extension period end, or away foul, and thus allows one free throw, is given, a case where a player who commits flagrant, punching or elbow foul, and thus allows two free throws, is given, a case where a player who commits intentional foul (giving two free throws, in goal in (possession acquisition) or one free throw 1, re provision of attack right of a ball) within 2 minutes before the fourth quarter or extension period end upon defense (a state where a team foul is applied if not having relation to team foul) is given, a case where a player who commits foul against an offense player who is slow in before the player is slow in a line out upon defense when a team foul is applied, and thus allows a free throw, is given, a case where a player who allows shooting to be a goal in, thus losing a point and also providing a free throw, upon defense, under a situation in which the player commits loose ball foul after an offense player throws shooting, a case where a player who makes mistakes while attempting steal and snatch during a defense process when a team foul is applied, gets a free throw since a co-player makes alternate personal foul in a situation in which the number of defense players is smaller than that of attack players, but fails in the free throw, is given, a case where an attempt error player who makes mistakes while attempting steal and the snatch upon defense when a co-player, who is included in the number of defense players, which is smaller than that of attack players, commits foul (shooting action) that allows a free throw, and a free throw is given, is given, and a case where a player who receives help from a co-player since he is broken through during defense upon defense before and after a team foul is applied, when the co-player gets a losing point (including free throw by foul) to the person in question offense is given.

(7) The countermeasure absence-inducing error subtraction item includes a case where a player who does not participate in rebound or does not give minimum help to a team although it is not a swift attack situation upon defense rebound, a player who does not box out an offense player around him and causes a co-player to have his possession taken out by the offense player, and a player who lose possession due to heedlessness in a situation in which the layer can sufficiently secure rebound, are given, a case where a player who commits a meaningless foul when an opponent team goes this way and that without finding a way out of an attack before and after a team foul is applied, upon defense, is given, a case where a player who commits violation (basket interfere, goaltending, etc.) in a basket no goal situation of an offense player, upon defense, and thus provides an own team with a losing point, is given, a case where a player who commits 3 second violation upon defense, gives one free throw, and resets an attack time is given, a case where a player who commits flagrant foul (two free throws, one free throw of shoot attempt and losing point, re-provision of the attack right, walkout of a foul player, etc.), upon defense, is given, a case where a player who commits elbow foul (two free throw and play time reset) in a state where an attack team holds a ball within 2 minutes of the fourth quarter or extension period end, upon defense, is given, a case where a player who commits personal foul (having no relation to a ball) or away foul (the rule on which the victory is not changed due to foul) before a ball slows in in a situation in which an attack team holds a ball within 2 minutes of the fourth quarter or extension period end (one free throw, an attack time reset), upon defense, is given, a case where a player who commits punching foul (two free throws, a team foul, walk-out, one game suspension <depending upon a decision of Financial Committee>) upon defense (dead ball and game proceeding situation) is given, a case where a player who commits intentional foul (giving two free throws, in goal in (possession acquisition) or one free throw 1, re-provision of attack right of a ball) within 2 minutes before the fourth quarter or extension period end upon defense (a state where a team foul is applied if not having relation to team foul) is given, a case where a player who commits foul to another player who slows in before an offense player slows in at the line out upon defense before a team foul is applied (giving a free throw), is given, a case where a player who commits foul, in a situation in which an attack time of an offense player exceeds 20 seconds (the remaining time is within four seconds) before and after a team foul is applied upon defense, and thus provides an re-attack time, is given, a case where a player who commits foul while defending an offense player in a swift attack (necessary to preclude rhythm) of an opponent team (before a team foul is applied), upon defense, loses a point, and also allows a free throw, is given, a case where a player who makes mistakes while attempting steal and snatch during a defense process (when a team foul is applied), and gives a free throw due to alternate personal foul of a co-player in a situation in which the number of defense players is smaller than that of attack players, is given, a case where a player who makes mistakes while attempting steal and snatch during a defense process (before a team foul is applied), and provides a cause of the foul when the co-player commits alternate personal foul in a situation in which the number of defense players is smaller than that of attack players, is given, a case where a player who receives help from a co-player since he is broken through during defense upon defense before and after a team foul is applied, when the co-player gets a losing point (including free throw by foul) to the person in question offense is given, a case where a player who does not lose a point when the player makes mistakes while attempting steal and snatch, upon defense, which a co-player, who is included in the number of defense players, which is smaller than that of defense players, commits foul (shooting action) that allows a free throw, when losing a free throw, when does not lose a point, and when a losing point and a non-losing point coexist, is given, a case where a player who receives help from a co-player since he is broken through during defense upon defense before and after a team foul is applied, when the co-player gets a losing point (including free throw by foul) to the person in question offense is given, and a case where a player who commits foul related to a point in a situation in which an attack time of an opponent team remains a little (within five seconds) upon defense before a team foul is applied, and thus allows a losing point (including free throw) is given.

(8) The assist self-blame losing point-considered error subtraction item includes a case where a player who allows a losing point to an offense player of the person in question while defending centered on assistance defense in a situation considering point offense, upon defense, or a player who allows a point to the person in question offense while doing assistance defense in order to defend an offense player of a co-player, is given, a case where a player who allows a losing point to an offense player of a co-player while doing alternate assistance defense since the co-player is broken through, upon defense, is given, a case where a player who commits alternate foul and loses a point by a free throw when a co-player makes mistakes while attempting steal and snatch upon defense (when a team foul is applied) and commits alternate personal foul in a situation in which the number of defense players is smaller than that of attack players, so that a free throw is given, is given, a case where a player who makes mistakes while attempting steal and snatch upon defense and does a free throw losing point when a co-player, who is included in the number of defense players, which is smaller than that of attack players, commits foul (shooting action) that allows a free throw, is given, and a case where a player who makes mistakes while attempting steal and snatch in a defense process (when a team foul is applied), and loses a point when the co-player allows while doing alternate defense is given.

(9) The assistance self-blame-possible losing point-considered error subtraction item includes a case where a player who commits foul while doing alternate assistance defense since a co-player is broken through, upon defense, and allows a free throw, is given, a case where a player who commits foul in a shooting action while doing alternate assistance defense since a co-player is broken through by an offense player, upon defense, and allows a free throw, is given, and a case where a player who commits alternate foul, gives a free throw, but does not lose a point, when a co-player makes mistakes while attempting steal and snatch when a team foul is applied upon defense and commits alternate personal foul in a situation in which the number of defense players is smaller than that of attack players, and thus gives a free throw, is given.

(10) The situation countermeasure ability lack error subtraction item includes a case where a player who allows a losing point since he does not predict the possibility, upon defense, is given, a case where a player who commits violation (basket interfere, goaltending, etc.) in a basket no goal situation of an offense player, upon defense, and thus provides an own team with a losing point, is given, a case where a player who commits intentional foul (giving two free throws, in goal in (possession acquisition) or one free throw 1, re-provision of attack right of a ball) within 2 minutes before the fourth quarter or extension period end upon defense (a state where a team foul is applied if not having relation to team foul) is given, a case where a player who provides a cause of foul, a free throw and a losing point when a co-player commits alternate personal foul and provides a free throw, while attempting steal and snatch (when a team foul is applied) upon defense in a situation in which the number of defense players is smaller than that of attack players, is given, a case where a player who allows shooting to be a goal in, thus losing a point and also providing a free throw, upon defense, under a situation in which the player commits loose ball foul after an offense player throws shooting, a case where a player who commits foul when a team foul is applied during play, and thus allows a free throw, is given, a case where a player who commits foul while defending an offense player in a swift attack (necessary to preclude rhythm) of an opponent team, upon defense, loses a point, and also allows a free throw, is given, a case where a defense-miss player who receives assistance defense of a co-player since he misses an offense player, upon defense, but loses a points, is given, a case where a defense miss player is given when the player commits foul in the same situation, a case where a player (error player) who provides a cause of foul when a co-player commits alternate personal foul and provides a free throw, while attempting steal and snatch (before a team foul is applied) upon defense in a situation in which the number of defense players is smaller than that of attack players, is given, a case where a player who provides a cause of a losing point a co-player commits alternate personal foul and allows the losing point, while attempting steal and snatch (when a team foul is applied) upon defense in a situation in which the number of defense players is smaller than that of attack players, is given, a case where a player who makes mistakes while attempting steal and snatch upon defense and does a free throw losing point when a co-player, who is included in the number of defense players, which is smaller than that of attack players, commits foul (shooting action) that allows a free throw, is given, a case where players who allow a losing point while playing a switch mark among defense players, upon defense, when defending a pattern play by block and screen of an opponent, are given, a case where a player who mistakenly puts a ball in own basket while playing a seesaw game with an offense player around the under-goal, upon defense, thus losing a point, is given, a case where a player who obstructs an shooting action of an offense player through foul upon defense (before a team foul is applied) or obstructs single lay-up shooting of an offense player by break-through through foul (not loses a point in shooting and free throw) is given (responsibility on the foul in the shooting action), a case where a player who receives help from a co-player since he is broken through during defense upon defense (before and after a team foul is applied), when the co-player gets a losing point (including free throw by foul) to the person in question offense is given, a case where a player who commits foul under a shooting action of an offense player (before a team foul is applied) upon defense, making the shooting failed, but allows a free throw, thus giving both the results of a losing point and a non-losing point is given, a case where a player who commits foul under a shooting action of offense players (before and after a team foul is applied) upon defense, making shooting failed, but allows a goal under a free throw situation, thus losing a point, is given, a case where a player who commits a meaningless foul when an opponent team goes this way and that without finding a way out of an attack (before and after a team foul is applied), upon defense, is given, a case where a player who commits foul to a co-player offense of a shooter, thus providing a free throw and also losing a point, when an offense player throws shooting and a ball progress toward a basket, upon defense, is given, a case where a player who commits foul, in a situation in which an attack time of an offense player exceeds 20 seconds (the remaining time is within four seconds) be fore and after a team foul is applied upon defense, and thus provides an re-attack time, is given, a case where a player who commits foul related to a point in a situation in which an attack time of an opponent team remains a little (within five seconds) upon defense (before a team foul is applied), and thus allows a losing point (including free throw) is given, and a case where a player who does not participate in rebound or does not give minimum help to a team although it is not a swift attack situation upon defense rebound, a player who does not box out an offense player around him and causes a co-player to have his possession taken out by the offense player, and a player who lose possession due to heedlessness in a situation in which the layer can sufficiently secure rebound, are given.

(11) The assist countermeasure ability lack error subtraction item includes a case where a player who provides a cause of foul when a co-player commits alternate personal foul while attempting steal and snatch (before a team foul is applied) upon defense in a situation in which the number of defense players is smaller than that of attack players, is given, a case where a player who commits alternate foul when a co-player makes mistakes while attempting steal and snatch (when a team foul is applied) upon defense in a situation in which the number of defense players is smaller than that of attack players, is given, a case where a player who makes mistakes while attempting steal and snatch upon defense and does a free throw losing point when a co-player, who is included in the number of defense players, which is smaller than that of attack players, commits foul (shooting action) that allows a free throw, is given, a case where a player who loses a point when a co-player makes mistakes while attempting steal and snatch (when a team foul is applied) upon defense and loses a point while doing alternate defense in a situation in which the number of defense players is smaller than that of attack players, is given, a case where a player who allows a point to the person in question offense while doing assistance defense in order to defend an offense player of a co-player upon defense (before or after a team foul is applied), is given, a case where a player commits foul to the person in question offense while doing assistance defense of self-effort in order to defend an offense player of a co-player, upon defense, is given, a case where a player who commits foul while doing alternate assistance defense since a co-player is broken through, when a team foul is applied, upon defense, and allows a free throw, is given, a case where a player who allows a losing point (including provision of a free throw) while doing alternate defense of an offense player who is missed by a co-player, upon defense, is given, a case where a player who commits foul while doing alternate defense by missing an offense player, upon defense, is given, and a case where a player who commits alternate personal foul is given.

(12) The basic defense ability lack error subtraction item includes a case where a player who commits foul due to a mistake of the person in question, upon defense, and provides an attack time reset to an opponent team, is given, a case where a player who commits 3 second violation upon defense, gives one free throw, and resets an attack time is given, a case where a player who commits flagrant foul (two free throws, one score option two free throw, maintaining of the attack right, walkout of a foul player, etc.), upon defense, is given, a case where a player who commits personal foul (having no relation to a ball) or away foul (the rule on which the victory is not changed due to foul) before a ball slows in in a situation in which an attach team holds a ball within 2 minutes of the fourth quarter or extension period end (one free throw, an attack time reset), upon defense, is given, a case where a player who commits elbow foul (two free throw and play time reset) in a state where an attack team holds a ball within 2 minutes of the fourth quarter or extension period end, upon defense, is given, a case where a player who commits punching foul (two free throws, a team foul, walk-out, one game suspension) upon defense (a dead ball and game proceeding situation), is given, a case where a player who does not follow a shooting action of an offense player, or allows full shooting, upon defense, is given, a case where a player who commits foul (during shooting action) while allowing a losing point to an offense player, upon defense, allows a free through, and thus loses a point, is given, a case where a player who allows shooting to be a goal in, thus losing a point and also providing a free throw, upon defense, under a situation in which the player commits loose ball foul after an offense player throws shooting, a case where a player who commits foul against an offense player who is slow in before the offense player is slow in a line out upon defense (before and when a team foul is applied), and thus allows a free throw, is given, a case where a player who commits technical foul, intentional foul, etc. upon defense, allows a free throw, and loses a point, is given, a case where a defense-miss player who receives assistance defense of a co-player since he misses an offense player, upon defense, but loses a points, is given, a case where a player who commits foul in the same situation, a case where a player who mistakenly puts a ball in own basket while playing a seesaw game with an offense player around the under-goal, upon defense, thus losing a point, is given, a case where a player who commits violation (line cross, goaltending, basket interfere, etc.) in a situation in which a free throw of an opponent team is no goal upon defense, so that a re-free throw becomes a goal, is given, a case where a player who takes away a ball before the ball touches a ring or a back board in an in-play situation immediately after a free throw attempt of an opponent player, upon defense, thus allowing a losing point, and also makes error when one additional free throw is given, is given, a case where a player who commits violation simultaneously with fails in a free throw of an offense player, upon defense, and thus gets a re-free throw is given, a case where a player who commits foul under a shooting action of offense players (before and after a team foul is applied) upon defense, making shooting failed, but allows a goal under a free throw situation, thus losing a point, is given, a case where a player who commits foul under a shooting action of offense players (before a team foul is applied) upon defense, making shooting failed, but allows a free throw, thus giving both the results of a losing point and a non-losing point, is given, a case where a player who commits a meaningless foul when an opponent team goes this way and that without finding a way out of an attack (before and after a team foul is applied), upon defense, is given, a case where a player who commits foul to a co-player offense of a shooter, thus providing a free throw and also losing a point, when an offense player throws shooting and a ball progress toward a basket, upon defense, is given, a case where a player who commits foul, in a situation in which an attack time of an offense player exceeds 20 seconds (the remaining time is within four seconds) before and after a team foul is applied upon defense, and thus provides an re-attack time, is given, a case where a player who commits foul related to a point in a situation in which an attack time of an opponent team remains a little (within five seconds) upon defense (before a team foul is applied), and thus allows a losing point (including free throw) is given, a case where a player who allows a point to the person in question offense while doing assistance defense in order to defend an offense player of a co-player upon defense (before or after a team foul is applied), is given, a case where a player who commits foul while defending an offense player in a swift attack (necessary to preclude rhythm) of an opponent team before a team foul is applied, upon defense, loses a point, and also allows a free throw, is given, and a case where a player who does not participate in rebound or does not give minimum help to a team although it is not a swift attack situation upon defense rebound, a player who does not box out an offense player around him and causes a co-player to have his possession taken out by the offense player, and a player who lose possession due to heedlessness in a situation in which the layer can sufficiently secure rebound, are given.

(13) The indirect opponent team morale-inspired error subtraction item includes a case where a layer who allows a generate losing point to an opponent team due to negative and positive or order to a team, upon defense, is given, a case where a player who commits foul when a team foul is applied during play, and thus allows a free throw, is given, a case where a player who provides a cause of foul, free throw and a losing point when a co-player makes mistakes while attempting steal and snatch (when a team foul is applied), upon defense, and thus commits alternate personal foul in a situation in which the number of defense players is smaller than that of attack players and thus provides a free throw, is given, a case where a player who commits foul against an offense player who is slow in before the offense player is slow in a line out upon defense (before and after a team foul is applied), and thus allows a free throw, is given, a case where a player who allows a point to the person in question offense while doing assistance defense in order to defend an offense player of a co-player upon defense (before or after a team foul is applied), is given, a case where a player who makes mistakes while attempting steal and snatch upon defense and does a free throw losing point when a co-player, who is included in the number of defense players, which is smaller than that of attack players, commits foul (shooting action) that allows a free throw, is given, a case where a player who commits foul under a shooting action of offense players (when a team foul is applied) upon defense, making shooting failed, but allows a goal under a free throw situation, thus losing a point, is given, a case where a player who has less responsibility of error, upon defense, when allowing a losing point while playing a switch mark among defense players when defending a pattern play by block and screen of an opponent, is given, a case where a player who commits violation (line cross, goaltending, basket interfere, etc.) in a situation in which a free throw of an opponent team is no goal upon defense, resulting in a re-free throw, is given, a case where a player who commits foul under a shooting action of an offense player (before a team foul is applied) upon defense, making the shooting failed, but allows a free throw, thus giving both the results of a losing point and a non-losing point is given, and a case where a player who commits foul to a co-player offense of a shooter, thus providing a free throw and also losing a point, when an offense player throws shooting and a ball progress toward a basket, upon defense, is given.

(14) The direct opponent team morale-inspired error subtraction item includes a case where a layer who allows a losing point (alley-oop, dunk, dizzy lay-up, etc.) that becomes a condition to inspire morale of an opponent team, upon defense, is given, a case where a player who commits violation (basket interfere, goaltending, etc.) in a basket no goal situation of an offense player, upon defense, and thus provides an own team with a losing point, is given, a case where a player who commits flagrant foul (two free throws, one free throw of shoot attempt and losing point, re-provision of the attack right, walkout of a foul player, etc.), upon defense, is given, a case where a player who commits elbow foul (two free throw and play time reset) in a state where an attack team holds a ball within 2 minutes of the fourth quarter or extension period end, upon defense, is given, a case where a player who commits punching foul (two free throws, a team foul, walk-out, one game suspension <depending upon a decision of Financial Committee>) upon defense (dead ball and game proceeding situation) is given, a case where a player who commits intentional foul (giving two free throws, in goal in (possession acquisition) or one free throw 1, re-provision of attack right of a ball) within 2 minutes before the fourth quarter or extension period end upon defense (a state where a team foul is applied if not having relation to team foul) is given, a case where a player who does not take a minimum action when allowing shooting or field shooting comparable to under-goal as the player is broken through by an offense player and thus giving a losing point, upon defense, is given, a case where a player who commits foul (during shooting action) while allowing a losing point to an offense player, upon defense, allows a free through, and thus loses a point, is given, a case where a player who commits personal foul (having no relation to a ball) or away foul (the rule on which the victory is not changed due to foul) before a ball slows in in a situation in which an attach team holds a ball within 2 minutes of the fourth quarter or extension period end (one free throw, an attack time reset), upon defense, is given, a case where a layer who provides a losing point and a free throw in a situation an offense player throws shooting and commits a loose ball foul, upon defense, is given, a case where a player who commits technical foul, intentional foul, etc. upon defense, and thus allows one free throw, is given, a case where a defense-miss player who receives assistance defense of a co-player since he misses an offense player, upon defense, but loses a points, is given, a case where a player who has greater or similar responsibility of error, upon defense, when allowing a losing point while playing a switch mark among defense players when defending a pattern play by block and screen of an opponent, is given, a case where a player who mistakenly puts a ball in own basket while playing a seesaw game with an offense player around the under-goal, upon defense, thus losing a point, is given, a case where a player who takes away a ball before the ball touches a ring or a back board in an in-play situation immediately after a free throw attempt of an opponent player, upon defense, thus allowing a losing point, and also makes error when one additional free throw is given, is given, a case where a player commits foul under a shooting action of an offense player upon defense (before and after a team foul is applied), making the shooting failed, allows a free throw, resulting in all goals, and loses a point is given, a case where a player who commits foul to a co-player offense of a shooter, thus providing a free throw and also losing a point, when an offense player throws shooting and a ball progress toward a basket, upon defense, is given, a case where a player who provides a cause of a losing point when the player makes mistakes while attempting steal and snatch (when a team foul is applied), upon defense, and thus allows the losing point in a situation in which the number of defense players is smaller than that of attack players, is given, a case where a player who commits foul related to a point in a situation in which an attack time of an opponent team remains a little (within five seconds) upon defense (before a team foul is applied), and thus allows a losing point (including free throw) is given, and a case where a player who commits foul while defending an offense player in a swift attack (necessary to preclude rhythm) of an opponent team before a team foul is applied, upon defense, loses a point, and also allows a free throw, is given.

(15) The personal defense shrinkage error subtraction item includes a case where a player who commits double fouls simultaneously with personal foul (a loose ball, etc.) or offense before and after a team foul is applied upon defense is given, a case where a player who commits technical foul, intentional foul, loose ball foul, etc. (providing a free throw to an opponent team), upon defense, is given, and a case where a player who makes mistakes while attempting steal and snatch (when a team foul is applied), upon defense, and commits alternate personal foul in a situation in which the number of defense players is smaller than that of attack players, is given.

(16) The personal defense shrinkage fostering error subtraction item includes a case where a player who is broken through by an offense player when committing foul while doing alternate assistance defense before and after a team foul is applied (including free throw) upon defense, is given, includes a case where a player who provides a cause of alternate personal foul when a co-player commits the alternate personal foul while attempting steal and snatch in a situation in which the number of defense players is smaller than that of offense players, and a free throw is given, upon defense (when a team foul is applied), is given, a case where an attempt error player, who belongs to the number of defense players, which is smaller than that of attack players, and who commits foul (shooting action) that allows a free throw while attempting steal and the snatch upon defense, and allows a free throw losing point, is given, and a case where a player who receives help from a co-player since he is broken through during defense upon defense, when the co-player gets a losing point (including free throw by foul) to the person in question offense is given.

(17) The team defense shrinkage fostering error subtraction item includes a case where a player who commits personal foul before and after a team foul is applied, upon defense, and gives load to the team foul, is given, i.e., a player who commits intentional, loose ball foul, etc., and thus allows one free throw, a player who commits flagrant foul (two free throws, one score option, two free throws, maintaining of the attack right, walkout of a foul player, etc.), a player who commits foul against an offense player who is slow in before the offense player is slow in a line out, and thus allows a free throw, is given, a player who commits away foul (the rule on which the victory is not changed due to foul) before two minutes of 4 and extension period end (one free throw and attack time reset), a player who commits elbow foul (two free throw and play time reset) in a state where an attack team holds a ball within 2 minutes of the fourth quarter or extension period end, upon defense, and a player who commits punching foul (two free throws, a team foul, walk-out, one game suspension), a case where a player who commits intentional foul (giving two free throws, in goal in (possession acquisition) or one free throw 1, re-provision of attack right of a ball) within 2 minutes before the fourth quarter or extension period end upon defense (a state where a team foul is applied if not having relation to team foul) is given, a player who commits foul related to a point in a situation in which an attack time of an opponent team remains a little (within five seconds), and thus allows a losing point (including free throw), a player who commits foul to a co-player offense of a shooter when an offense player throws shooting and makes the ball alive, and thus provides a free throw, a player who provides a cause (error player) of foul while attempting defense miss player, steal and snatch when a co-player commits foul while doing alternate defense as the player misses an offense player, and thus commits alternate personal foul in a situation in which the number of defense players is smaller than that of attack players, a attempt error player who makes mistakes while attempting steal and snatch, and does a free throw losing point when a co-player, who belongs to the number of defense players, which is smaller than that of offense players, commits foul (shooting action) that allows a free throw, a player who commits foul under shooting action of an offense player, making the shooting failed, but allows all goal in a free throw, thus losing a point, a layer who commits foul under a shooting action of an offense player, making the shooting failed, but assigns the results of a losing point and a non-losing point in a situation in which a free throw is allowed, and a player who commits a meaningless foul when an opponent team goes this way and that without finding a way out of an attack, and the like, are given.

(18) The mentality control ability lack error subtraction item includes a case where a player who commits ungentlemanly foul upon defense is given, a case where a player who commits technical foul, intentional foul, etc. upon defense (allowing one free throw), is given, a case where a player who commits flagrant foul (two free throws, one score option, two free throws, maintaining of the attack right, walkout of a foul player, etc.) is given, a case where a player who commits elbow foul (two free throw and play time reset) in a state where an attack team holds a ball within 2 minutes of the fourth quarter or extension period end, upon defense, is given, a case where a player who commits punching foul (two free throws, a team foul, walk-out, one game suspension) upon defense (a dead ball and game proceeding situation), is given, a case where a player who commits intentional foul (giving two free throws, in goal in (possession acquisition) or one free throw 1, re-provision of attack right of a ball) within 2 minutes before the fourth quarter or extension period end upon defense (a state where a team foul is applied if not having relation to team foul) is given.

(19) The opponent teamwork consolidation chance providing error subtraction item includes a case where a player who commits 3 second violation upon defense, gives one free throw, and resets an attack time is given, a case where a player who commits alternate personal foul exclusion, personal foul, double foul, technical foul, intentional foul, flagrant, punching, or personal (having no relation to a ball), away or elbow foul before slow in within two minutes of the fourth quarter or extension period end (a state where team foul is applied even without having relation to a team foul), upon defense, and providing an attack time reset (24 seconds) to an opponent team, is given, a case where a player who commits kicking violation in a situation in which the remaining attack time of an offense team is within five seconds upon defense, and thus provides a re-attack time is given, a case where a player who commits foul, in a situation in which an attack time of an offense player exceeds 20 seconds (the remaining time is within four seconds) before and after a team foul is applied upon defense, and thus provides an re-attack time, is given, a case where a player commits foul while doing alternate defense since missing an offense player, upon defense, (an attack time reset), is given, a case where a defense miss player is given, a case where a player who provides a cause (error player) of foul when a co-player commits alternate personal foul while attempting steal and snatch upon defense (before a team foul is applied) in a situation in which the number of defense players is smaller than that of attack players, is given, and a player who commits a meaningless foul when an opponent team goes this way and that without finding a way out of an attack (before a team foul is applied), upon defense, are given.

(20) The teamwork collapse curse providing error subtraction item includes a case where a player who is broken through by an offense player to allow shooting comparable to under-goal or field shoot, upon defense, but does not follow a shooting action, is given, a case where a player who commits flagrant foul (two free throws, one score option, two free throws, maintaining of the attack right, walkout of a foul player, etc.) is given, a case where a player who commits elbow foul (two free throw and play time reset) in a state where an attack team holds a ball within 2 minutes of the fourth quarter or extension period end, upon defense, is given, a case where a player who commits punching foul (two free throws, a team foul, walk-out, one game suspension) upon defense (a dead ball and game proceeding situation), is given, a case where a player who commits intentional foul (giving two free throws, in goal in (possession acquisition) or one free throw 1, re-provision of attack right of a ball) within 2 minutes before the fourth quarter or extension period end upon defense (a state where a team foul is applied if not having relation to team foul) is given, a case where a player who commits personal foul (having no relation to a ball) or away foul (the rule on which the victory is not changed due to foul) before a ball slows in in a situation in which an attach team holds a ball within 2 minutes of the fourth quarter or extension period end (one free throw, an attack time reset), upon defense, is given, a case where a player who is broken through by an offense player to allow shooting comparable to under-goal or field shoot, upon defense, but does not take a minimum measure, is given, a case where a player who provides a cause of foul, free throw and a losing point when a co-player commits alternate personal foul while attempting steal and snatch upon defense (before a team foul is applied) in a situation in which the number of defense players is smaller than that of attack players, is given, a case where a player who makes mistakes while attempting steal and snatch upon defense and does a free throw losing point when a co-player, who is included in the number of defense players, which is smaller than that of attack players, commits foul (shooting action) that allows a free throw, is given, a case where all players who allow a losing point while playing a switch mark among defense players, upon defense, when defending a pattern play by block and screen of an opponent, are given, a case where a player who mistakenly puts a ball in own basket while playing a see saw game with an offense player around the under-goal, upon defense, thus losing a point, is given, a case where a player who commits foul against an offense player who is slow in before and when the offense player is slow in a line out upon defense (before a team foul is applied), and thus allows a free throw, is given, a case where a player who commits violation (line cross, goaltending, basket interfere, etc.) in a situation in which a free throw of an opponent team is no goal upon defense, resulting in a re-free throw, is given, a case where a player who takes away a ball before the ball touches a ring or a back board in an in-play situation immediately after a free throw attempt of an opponent player, upon defense, thus allowing a losing point, and also makes error when one additional free throw is given, is given, a case where a player who commits foul under the shooting action of an offense player upon defense (before and after a team foul is applied), thus making the shooting failed, but allows a free throw to be all goal, thus losing points, is given, a case where a player who commits foul under a shooting action of an offense player (before a team foul is applied) upon defense, making the shooting failed, but allows a free throw, thus giving both the results of a losing point and a non-losing point is given, a case where a player who commits a meaningless foul when an opponent team goes this way and that without finding a way out of an attack (before and after a team foul is applied), upon defense, is given, a case where a player who commits foul, in a situation in which an attack time of an offense player exceeds 20 seconds (the remaining time is within five seconds) (before and after a team foul is applied) during play, and thus provides an re-attack time and a free throw, is given, a case where a player (error player) who provides a cause of a losing point when a co-player commits alternate personal foul and provides a free throw, while attempting steal and snatch when a team foul is applied upon defense in a situation in which the number of defense players is smaller than that of attack players, is given, a case where a player who receives help from a co-player since he is broken through during defense upon defense before and after a team foul is applied, when the co-player gets a losing point (including free throw by foul) to the person in question offense is given, a case where a player who commits foul related to a point in a situation in which an attack time of an opponent team remains a little (within five seconds) upon defense (before a team foul is applied), and thus allows a losing point (including free throw) is given, a case where a player who commits foul while defending an offense player in a swift attack (necessary to preclude rhythm) of an opponent team before a team foul is applied, upon defense, loses a point, and also allows a free throw, is given, a case where a player who commits violation (basket interfere, goaltending, etc.) in a basket no goal situation of an offense player, upon defense, and thus provides an own team with a losing point, is given, and a case where a player who does not participate in rebound or does not give minimum help to a team although it is not a swift attack situation upon defense rebound, a player who does not box out an offense player around him and causes a co-player to have his possession taken out by the offense player, and a player who lose possession due to heedlessness in a situation in which the layer can sufficiently secure rebound, are given.

(21) The possible losing point increase-causing (assignment) error subtraction item includes a case where a player who commits a meaningless foul when an opponent team goes this way and that without finding a way out of an attack (before a team foul is applied), upon defense, is given, a case where a player who commits foul, in a situation in which an attack time of an offense player exceeds 20 seconds (the remaining time is within four seconds) before and after a team foul is applied upon defense, and thus provides an re-attack time, is given, a case where a player who commits foul such as intentional, technical, elbow, punching and flagrant within two minutes of the fourth quarter or extension period end, upon defense, is given, a case where a player who does not participate in rebound or does not give minimum help to a team although it is not a swift attack situation upon defense rebound, a player who does not box out an offense player around him and causes a co-player to have his possession taken out by the offense player, and a player who lose possession due to heedlessness in a situation in which the layer can sufficiently secure rebound, are given, and a case where a player commits 3 second violation, and allows one free throw and an attack time reset, upon defense, is given.

(22) The game flow interception ability lack error subtraction item includes a case where a player who commits foul while defending (2 or more) offense players in a swift attack (necessary to preclude rhythm) of an opponent team before a team foul is applied, upon defense, loses a point, and also allows a free throw, is given, and a case where a player who commits foul that loses a point and also allows a free throw, while defending an offense player who is arbitrarily assigned to the person in question in a defense situation for an 1:1 swift attack (need to preclude rhythm) of an opponent team, upon defense before a team foul is applied, is given.

(23) The team-pattern confusion assignment error subtraction item includes a case where a player who commits flagrant foul (two free throws, one score option, two free throws, maintaining of the attack right, walkout of a foul player, etc.), upon defense, is given.

(24) The team member formation difficulty providing error subtraction item includes a case where a player who commits punching foul (two free throws, a team foul, walkout, one game suspension <depending upon a decision of Financial Committee>) upon defense (dead ball and game proceeding situation) is given.

Next, in step S11, the game situation factor unit within the manager server sets the game situation factors of 1277 items for the item of the attack addition game factor, the item of the attack subtraction game factor, the item of the defense addition game factor and the item of the defense subtraction game factor.

The game situation factors for the item of the attack addition game factor, the item of the attack subtraction game factor, the item of the defense addition the game factor, and the item of the defense subtraction game factor are respectively classified into 7 items, 13 items, 21 items, 5 items, 9 items, 12 items and 4 items. The items will be described.

the 7 items are contribution in disadvantageous point (over −7) situation, contribution in advantageous point (over +7) situation, contribution in disadvantageous point seesaw approach (−6~−4) situation, contribution in advantageous point seesaw approach (+6~+4) situation, contribution in disadvantageous point seesaw (−1~−3) situation, contribution in advantageous point seesaw (+1~+3) situation and contribution in tie situation;

the 13 items are contribution in disadvantageous point (over −7) situation, contribution in advantageous (over +7) situation, disadvantageous point seesaw approach (−6~−4) entry possible contribution in an advantageous point situation (over −7), disadvantageous point situation (over +7) entry-possible contribution in a disadvantageous point seesaw approach situation (+6~+4), contribution within disadvantageous point seesaw approach (−6~−4) in disadvantageous point seesaw approach (−6~−4) situation, possible contribution within disadvantageous point seesaw approach (+6~+4) in a seesaw approach (+6~+4) situation, disadvantageous point seesaw situation (−1~−3) entry-possible contribution in an advantageous point seesaw approach situation (−6~−4), disadvantageous point seesaw approach situation (+6~+4) entry-possible contribution in a disadvantageous point seesaw situation (+1~+3), possible contribution within a disadvantageous point seesaw situation (−1~−3) in a disadvantageous point seesaw situation (−1~−3), possible contribution within a disadvantageous point seesaw situation (+1~+3) in a disadvantageous point seesaw situation (+1~+3), tie situation entry-possible contribution in a disadvantageous point seesaw situation (−1~−3), disadvantageous point seesaw situation (+1~+3) entry-possible contribution in a tie situation, and disadvantageous point seesaw situation (+1~+3) entry-possible contribution in a disadvantageous point seesaw situation (−1~−3);

the 21 items are Point in disadvantageous point (over −7) situation, Point in advantageous (over +7) situation, a disadvantageous point seesaw approach (−6~−4) entry point in an advantageous point situation (over −7), a disadvantageous point situation (over +7) point in a disadvantageous point seesaw approach (+6~+4) situation, a point within a disadvantageous point seesaw approach (−6~−4) in an advantageous point seesaw approach (−6~−4) situation, a point within a disadvantageous point seesaw approach (+6~+4) in a disadvantageous point seesaw approach (+6~+4) situation, a disadvantageous point seesaw situation (−1~−3) point in a disadvantageous point seesaw approach (−6~−4) situation, a disadvantageous point seesaw approach situation (+6~+4) point in a disadvantageous point seesaw situation (+1~+3), a point within a disadvantageous point seesaw situation (−1~−3) in a disadvantageous point seesaw situation (−1~−3), a point within a disadvantageous point seesaw situation (+1~+3) in a disadvantageous point seesaw situation (+1~+3), a tie situation point in a disadvantageous point seesaw situation (−1~−3), a disadvantageous point seesaw situation (+1~+3) point in a tie situation, a disadvantageous point seesaw situation (+1~+3) point in a disadvantageous point seesaw situation (−1~−3), a tie point simultaneously with attack time end or quarter end in a disadvantageous seesaw situation (−1~−3), a reverse point simultaneously with attack time end or quarter end in a disadvantageous seesaw situation (−1~−3), a reverse point simultaneously with attack time end or quarter end in tie situation, a tie point in last attack with game end time being left several seconds in a disadvantageous seesaw situation (−1~−3), a reverse point in last attack with game end time being left several seconds in a tie situation, a tie point simultaneously with game end buzzer in a disadvantageous seesaw situation (−1~−3), a reverse point simultaneously with game end buzzer in a disadvantageous seesaw situation (−1~−3) and a reverse point simultaneously with game end buzzer in tie situation;

the 5 items are one foul record, a second foul record, a third foul record, a fourth foul record and a walkout foul record;

the 9 items are walk-out in extra game and one or more participation stops, walk-out after five minutes in the fourth quarter, walk-out before five minutes in the fourth quarter, walk-out after five minutes in the third quarter, walk-out before five minutes in the third quarter, walk-out after five minutes in the second quarter, walk-out before five minutes in the second quarter, walk-out after five minutes in the first quarter, and walk-out before five minutes in the first quarter;

the 12 items are shooting error in a disadvantageous point (over −7) situation, shooting error in an advantageous point (over +7) situation, shooting error in a disadvantageous point seesaw approach (−6~−4) situation, shooting error in a disadvantageous point seesaw approach (+6~+4) situation, shooting error in a disadvantageous point seesaw situation (−1~−3), shooting error in a disadvantageous point seesaw situation (+1~+3), shooting error in a tie situation, tie shooting error in the last attack with several seconds being left before a game ends in a disadvantageous point seesaw situation (−1~−3), reverse point shooting error in the last attack with several seconds being left before a game ends in a tie situation, tie shooting error simultaneously with a game end buzzer in a disadvantageous seesaw situation (−1~−3), reverse point shooting error simultaneously with a game end buzzer in a disadvantageous seesaw situation (−1~−3), and reverse point shooting error simultaneously with a game end buzzer in a tie situation; and the 4 items are an advantageous and disadvantageous situation (over ±7 points), an advantageous and disadvantageous seesaw approach situation (±6~±4 points), an advantageous and disadvantageous seesaw situation (±3~±1 points), and contribution in a tie situation.

In step S12, the median setting unit within the manager server sets the median for the game factors and the game situation factors under the principle of the game situation for the attack addition game factors, the attack subtraction game factors, the defense addition game factors and the defense subtraction game factors. In order to facilitate understanding of the median and the weight for the game factors and the game situation factors, Table 1 and Table 2 are presented.

TABLE 1

Symbol table depending upon each game factor and game situation factor

| | Game Factor | Game Situation Factor |
|---|---|---|
| Attack addition factor | A1, A2, A3, ... | A1__1, A1__2, ... |
| Attack subtraction factor | B1, B2, B3, ... | B1__1, B1__2, ... |
| Defense addition factor | C1, C2, C3, ... | C1__1, C1__2, ... |
| Defense subtraction factor | D1, D2, D3, ... | D1__1, D1__1, ... |

TABLE 2

Utilization example of symbol tables depending upon each game factor and game situation factor

| Game Factor | Game Situation Factor |
|---|---|
| A1: Full shooting capture (driving) ability | A1__1: Contribution in disadvantageous point (over −7) situation<br>A1__2: Contribution in advantageous point (over +7) situation<br>A1__3: Contribution in disadvantageous point seesaw approach (−6~−4) situation<br>A1__4: Contribution in advantageous point seesaw approach (+6~+4) situation<br>A1__5: Contribution in advantageous point seesaw (−1~−3) situation<br>A1__6: Contribution in advantageous point seesaw (+1~+3) situation<br>A1__7: Contribution in tie situation |

Furthermore, the median for each of the game factors and each of the game situation factors under the principle of the game situation for the attack addition game factors, the attack subtraction game factors, the defense addition game factors, and the defense subtraction game factors is as follows in below

TABLE 3

Median under situation principle for attack addition factors

| Game factor | Game Situation factor | | | | | | |
|---|---|---|---|---|---|---|---|
| A1 | A1__1 | A1__2 | A1__3 | A1__4 | A1__5 | A1__6 | A1__7 |
| 80 | 5.00 | 4.00 | 5.00 | 5.00 | 8.00 | 8.00 | 9.50 |
| A2 | A2__1 | A2__2 | A2__3 | A2__4 | A2__5 | A2__6 | A2__7 |
| 70 | 6.00 | 4.00 | 5.00 | 5.00 | 8.00 | 8.00 | 9.00 |
| A3 | A3__1 | A3__2 | A3__3 | A3__4 | A3__5 | A3__6 | A3__7 |
| 70 | 5.00 | 5.00 | 7.00 | 5.00 | 8.00 | 8.00 | 10.00 |
| A4 | A4__1 | A4__2 | A4__3 | A4__4 | A4__5 | A4__6 | A4__7 |
| 70 | 5.00 | 5.00 | 6.00 | 4.00 | 5.50 | 4.00 | 7.00 |
| | A4__8 | A4__9 | A4__10 | A4__11 | A4__12 | A4__13 | |
| | 5.50 | 8.00 | 7.00 | 8.00 | 9.00 | 9.50 | |
| A5 | A5__1 | A5__2 | A5__3 | A5__4 | A5__5 | A5__6 | A5__7 |
| 60 | 4.00 | 4.00 | 5.00 | 5.00 | 8.00 | 8.00 | 9.00 |
| A6 | A6__1 | A6__2 | A6__3 | A6__4 | A6__5 | A6__6 | A6__7 |
| 80 | 4.00 | 3.00 | 5.00 | 4.00 | 5.00 | 4.00 | 6.00 |
| | A6__8 | A6__9 | A6__10 | A6__11 | A6__12 | A6__13 | |
| | 5.00 | 7.00 | 6.00 | 8.00 | 9.00 | 9.50 | |
| A7 | A7__1 | A7__2 | A7__3 | A7__4 | A7__5 | A7__6 | A7__7 |
| 70 | 3.00 | 3.00 | 5.00 | 4.00 | 5.50 | 5.00 | 4.00 |
| | A7__8 | A7__9 | A7__10 | A7__11 | A7__12 | A7__13 | |
| | 4.00 | 6.00 | 6.00 | 7.00 | 9.00 | 10.00 | |

TABLE 3-continued

Median under situation principle for attack addition factors

| Game factor | Game Situation factor | | | | | | |
|---|---|---|---|---|---|---|---|
| A8 70 | A8_1 3.00 | A8_2 2.00 | A8_3 4.00 | A8_4 4.00 | A8_5 6.00 | A8_6 6.00 | A8_7 6.00 |
| | A8_8 5.00 | A8_9 6.00 | A8_10 7.00 | A8_11 9.00 | A8_12 8.00 | A8_13 9.50 | |
| A9 50 | A9_1 3.00 | A9_2 4.00 | A9_3 5.00 | A9_4 6.00 | A9_5 8.00 | A9_6 7.00 | A9_7 9.00 |
| A10 80 | A10_1 3.00 | A10_2 3.00 | A10_3 4.00 | A10_4 3.00 | A10_5 4.00 | A10_6 3.50 | A10_7 5.00 |
| | A10_8 5.00 | A10_9 5.50 | A10_10 6.00 | A10_11 8.00 | A10_12 8.50 | A10_13 9.50 | |
| A11 70 | A11_1 3.00 | A11_2 3.00 | A11_3 3.00 | A11_4 4.00 | A11_5 4.00 | A11_6 4.00 | A11_7 5.00 |
| | A11_8 5.00 | A11_9 7.00 | A11_10 7.00 | A11_11 8.50 | A11_12 9.00 | A11_13 10.00 | |
| A12 70 | A12_1 4.00 | A12_2 2.00 | A12_3 4.00 | A12_4 3.00 | A12_5 5.00 | A12_6 5.00 | A12_7 5.00 |
| | A12_8 6.50 | A12_9 6.00 | A12_10 6.00 | A12_11 7.00 | A12_12 9.00 | A12_13 9.00 | |
| A13 70 | A13_1 2.00 | A13_2 3.00 | A13_3 4.00 | A13_4 5.00 | A13_5 8.00 | A13_6 7.00 | A13_7 9.00 |
| A14 60 | A14_1 3.00 | A14_2 3.00 | A14_3 4.00 | A14_4 4.00 | A14_5 5.00 | A14_6 4.00 | A14_7 6.00 |
| | A14_8 5.00 | A14_9 7.00 | A14_10 7.00 | A14_11 9.00 | A14_12 9.00 | A14_13 9.00 | |
| A15 40 | A15_1 2.00 | A15_2 2.00 | A15_3 7.00 | A15_4 6.00 | A15_5 9.00 | A15_6 8.00 | A15_7 10.00 |
| A16 40 | A16_1 2.00 | A16_2 2.00 | A16_3 5.00 | A16_4 5.00 | A16_5 7.00 | A16_6 8.00 | A16_7 9.00 |
| A17 38 | A17_1 2.00 | A17_2 3.00 | A17_3 6.00 | A17_4 5.00 | A17_5 9.50 | A17_6 8.00 | A17_7 9.00 |
| A18 70 | A18_1 4.00 | A18_2 3.00 | A18_3 6.00 | A18_4 5.00 | A18_5 9.00 | A18_6 8.00 | A18_7 9.00 |
| A19 50 | A19_1 3.00 | A19_2 3.00 | A19_3 4.00 | A19_4 3.50 | A19_5 4.00 | A19_6 4.00 | A19_7 5.00 |
| | A19_8 5.00 | A19_9 8.00 | A19_10 7.00 | A19_11 9.00 | A19_12 9.00 | A19_13 10.00 | |
| A20 70 | A20_1 3.00 | A20_2 3.00 | A20_3 5.00 | A20_4 5.00 | A20_5 6.00 | A20_6 5.00 | A20_7 7.00 |
| | A20_8 6.00 | A20_9 8.00 | A20_10 8.00 | A20_11 9.00 | A20_12 9.50 | A20_13 10.00 | |
| A21 40 | A21_1 3.00 | A21_2 4.00 | A21_3 6.00 | A21_4 6.00 | A21_5 7.00 | A21_6 9.00 | A21_7 9.00 |
| A22 90 | A22_1 2.00 | A22_2 2.00 | A22_3 4.00 | A22_4 4.00 | A22_5 4.50 | A22_6 4.00 | A22_7 5.50 |
| | A22_8 5.00 | A22_9 6.00 | A22_10 7.00 | A22_11 7.00 | A22_12 7.00 | A22_13 7.00 | A22_14 8.00 |
| | A22_15 9.00 | A22_16 8.00 | A22_17 8.00 | A22_18 8.50 | A22_19 9.00 | A22_20 10.00 | A22_21 10.00 |
| A23 80 | A23_1 2.00 | A23_2 2.00 | A23_3 3.00 | A23_4 3.00 | A23_5 4.00 | A23_6 4.00 | A23_7 5.00 |
| | A23_8 5.00 | A23_9 6.00 | A23_10 6.00 | A23_11 6.00 | A23_12 6.50 | A23_13 7.00 | A23_14 8.00 |
| | A23_15 8.00 | A23_16 8.00 | A23_17 9.00 | A23_18 9.00 | A23_19 9.00 | A23_20 9.50 | A23_21 10.00 |
| A24 80 | A24_1 3.00 | A24_2 4.00 | A24_3 4.50 | A24_4 5.00 | A24_5 5.00 | A24_6 5.00 | A24_7 6.00 |
| | A24_8 6.00 | A24_9 8.00 | A24_10 8.00 | A24_11 9.00 | A24_12 9.00 | A24_13 10.00 | |
| A25 50 | A25_1 4.00 | A25_2 2.00 | A25_3 6.00 | A25_4 5.00 | A25_5 9.50 | A25_6 9.00 | A25_7 9.00 |
| A26 60 | A26_1 2.00 | A26_2 2.50 | A26_3 6.00 | A26_4 6.00 | A26_5 8.00 | A26_6 7.00 | A26_7 10.00 |
| A27 50 | A27_1 2.50 | A27_2 4.00 | A27_3 5.00 | A27_4 5.50 | A27_5 6.00 | A27_6 6.50 | A27_7 6.25 |
| | A27_8 7.00 | A27_9 6.75 | A27_10 6.50 | A27_11 6.50 | A27_12 7.50 | A27_13 8.00 | |
| A28 80 | A28_1 3.00 | A28_2 4.00 | A28_3 4.00 | A28_4 4.00 | A28_5 5.00 | A28_6 5.00 | A28_7 6.00 |
| | A28_8 6.00 | A28_9 8.00 | A28_10 7.00 | A28_11 9.00 | A28_12 9.00 | A28_13 10.00 | |
| A29 60 | A29_1 3.00 | A29_2 3.00 | A29_3 4.00 | A29_4 3.00 | A29_5 5.00 | A29_6 5.00 | A29_7 5.00 |
| | A29_8 6.00 | A29_9 6.00 | A29_10 7.50 | A29_11 9.00 | A29_12 9.00 | A29_13 10.00 | |

TABLE 3-continued

Median under situation principle for attack addition factors

| Game factor | Game Situation factor | | | | | | |
|---|---|---|---|---|---|---|---|
| A30 88 | A30__1 2.00 | A30__2 2.00 | A30__3 4.00 | A30__4 3.00 | A30__5 5.00 | A30__6 5.00 | A30__7 5.00 |
| | A30__8 5.00 | A30__9 6.00 | A30__10 6.00 | A30__11 8.00 | A30__12 7.00 | A30__13 7.00 | A30__14 7.00 |
| | A30__15 7.50 | A30__16 7.50 | A30__17 8.50 | A30__18 9.00 | A30__19 9.00 | A30__20 10.00 | A30__21 10.00 |
| A31 50 | A31__1 4.00 | A31__2 2.00 | A31__3 6.00 | A31__4 6.00 | A31__5 9.00 | A31__6 8.00 | A31__7 10.00 |
| A32 89 | A32__1 2.50 | A32__2 2.00 | A32__3 3.50 | A32__4 3.00 | A32__5 4.00 | A32__6 4.00 | A32__7 7.75 |
| | A32__8 7.00 | A32__9 8.25 | A32__10 8.00 | A32__11 9.00 | A32__12 8.00 | A32__13 10.00 | |
| A33 50 | A33__1 3.00 | A33__2 3.00 | A33__3 4.00 | A33__4 4.00 | A33__5 5.00 | A33__6 4.00 | A33__7 6.50 |
| | A33__8 5.00 | A33__9 7.50 | A33__10 6.00 | A33__11 9.00 | A33__12 9.00 | A33__13 10.00 | |
| A34 40 | A34__1 3.00 | A34__2 4.00 | A34__3 6.00 | A34__4 6.00 | A34__5 8.00 | A34__6 8.00 | A34__7 10.00 |
| A35 100 | A35__1 2.00 | A35__2 2.00 | A35__3 3.00 | A35__4 3.00 | A35__5 4.00 | A35__6 4.00 | A35__7 4.50 |
| | A35__8 5.00 | A35__9 6.00 | A35__10 6.00 | A35__11 7.00 | A35__12 6.50 | A35__13 7.00 | A35__14 8.00 |
| | A35__15 8.00 | A35__16 8.00 | A35__17 9.00 | A35__18 9.00 | A35__19 9.50 | A35__20 10.00 | A35__21 9.50 |
| A36 60 | A36__1 3.00 | A36__2 4.00 | A36__3 7.00 | A36__4 6.00 | A36__5 10.00 | A36__6 8.00 | A36__7 9.80 |
| A37 60 | A37__1 2.00 | A37__2 3.00 | A37__3 6.00 | A37__4 6.00 | A37__5 8.80 | A37__6 8.00 | A37__7 10.00 |
| A38 45 | A38__1 2.00 | A38__2 5.00 | A38__3 7.00 | A38__4 9.00 | A38__5 10.00 | | |
| A39 40 | A39__1 2.00 | A39__2 4.00 | A39__3 6.00 | A39__4 9.00 | A39__5 10.00 | | |
| A40 65 | A40__1 9.50 | A40__2 4.00 | A40__3 3.75 | A40__4 5.00 | A40__5 5.00 | A40__6 6.00 | A40__7 7.00 |
| | A40__8 8.00 | A40__9 9.00 | | | | | |
| A41 58 | A41__1 10.00 | A41__2 4.50 | A41__3 4.80 | A41__4 5.00 | A41__5 5.00 | A41__6 6.00 | A41__7 7.00 |
| | A41__8 9.00 | A41__9 9.00 | | | | | |

TABLE 4

Median under situation principle for attack subtraction factors

| Game factor | Game Situation factor | | | | | | |
|---|---|---|---|---|---|---|---|
| B1 80.00 | B1__1 2.00 | B1__2 3.00 | B1__3 5.00 | B1__4 4.00 | B1__5 5.00 | B1__6 5.00 | B1__7 6.00 |
| | B1__8 6.00 | B1__9 7.00 | B1__10 8.00 | B1__11 9.50 | B1__12 9.00 | B1__13 10.00 | |
| B2 90.00 | B2__1 3.00 | B2__2 2.00 | B2__3 5.00 | B2__4 5.00 | B2__5 9.00 | B2__6 8.00 | B2__7 10.00 |
| B3 60.00 | B3__1 2.00 | B3__2 2.00 | B3__3 5.00 | B3__4 5.00 | B3__5 9.00 | B3__6 9.00 | B3__7 9.50 |
| B4 60.00 | B4__1 2.00 | B4__2 2.00 | B4__3 5.00 | B4__4 5.00 | B4__5 9.00 | B4__6 9.00 | B4__7 9.00 |
| B5 81.00 | B5__1 2.00 | B5__2 2.00 | B5__3 4.00 | B5__4 4.00 | B5__5 5.00 | B5__6 5.00 | B5__7 7.00 |
| | B5__8 7.00 | B5__9 8.00 | B5__10 8.00 | B5__11 9.00 | B5__12 9.00 | B5__13 10.00 | |
| B6 60.00 | B6__1 3.00 | B6__2 3.00 | B6__3 7.00 | B6__4 6.00 | B6__5 9.50 | B6__6 8.00 | B6__7 10.00 |
| B7 50.00 | B7__1 3.00 | B7__2 3.00 | B7__3 6.00 | B7__4 6.00 | B7__5 9.50 | B7__6 8.00 | B7__7 10.00 |
| B8 80.00 | B8__1 2.00 | B8__2 2.00 | B8__3 3.00 | B8__4 3.00 | B8__5 4.00 | B8__6 4.00 | B8__7 5.00 |
| | B8__8 5.00 | B8__9 7.50 | B8__10 7.00 | B8__11 9.50 | B8__12 8.00 | B8__13 10.00 | |

TABLE 4-continued

Median under situation principle for attack subtraction factors

| Game factor | Game Situation factor | | | | | | |
|---|---|---|---|---|---|---|---|
| B9 50.00 | B9_1 2.50 | B9_2 2.00 | B9_3 5.50 | B9_4 5.00 | B9_5 9.50 | B9_6 8.00 | B9_7 10.00 |
| B10 80.00 | B10_1 2.00 | B10_2 2.00 | B10_3 3.00 | B10_4 3.00 | B10_5 4.00 | B10_6 4.00 | B10_7 6.00 |
| | B10_8 6.50 | B10_9 8.00 | B10_10 8.00 | B10_11 9.00 | B10_12 9.00 | B10_13 10.00 | |
| B11 80.00 | B11_1 2.00 | B11_2 1.00 | B11_3 3.00 | B11_4 4.00 | B11_5 5.00 | B11_6 5.00 | B11_7 6.00 |
| | B11_8 7.00 | B11_9 8.50 | B11_10 8.00 | B11_11 9.50 | B11_12 9.00 | B11_13 10.00 | |
| B12 50.00 | B12_1 2.00 | B12_2 2.00 | B12_3 4.00 | B12_4 3.50 | B12_5 5.00 | B12_6 5.00 | B12_7 6.00 |
| | B12_8 6.00 | B12_9 7.50 | B12_10 7.50 | B12_11 9.00 | B12_12 9.00 | B12_13 10.00 | |
| B13 95.00 | B13_1 2.00 | B13_2 2.00 | B13_3 4.50 | B13_4 5.00 | B13_5 6.00 | B13_6 6.50 | B13_7 8.00 |
| | B13_8 8.00 | B13_9 9.00 | B13_10 9.00 | B13_11 9.50 | B13_12 9.00 | | |
| B14 85.00 | B14_1 2.00 | B14_2 2.00 | B14_3 5.00 | B14_4 5.00 | B14_5 7.00 | B14_6 7.00 | B14_7 9.00 |
| | B14_8 8.00 | B14_9 8.50 | B14_10 9.00 | B14_11 9.50 | B14_12 9.00 | | |
| B15 90.00 | B15_1 2.00 | B15_2 2.00 | B15_3 5.00 | B15_4 5.00 | B15_5 6.00 | B15_6 5.50 | B15_7 8.00 |
| | B15_8 8.00 | B15_9 9.00 | B15_10 9.00 | B15_11 9.50 | B15_12 10.00 | | |
| B16 60.00 | B16_1 2.00 | B16_2 3.00 | B16_3 5.00 | B16_4 5.00 | B16_5 6.50 | B16_6 7.00 | B16_7 9.00 |
| | B16_8 8.50 | B16_9 8.00 | B16_10 9.00 | B16_11 9.50 | B16_12 10.00 | | |
| B17 84.00 | B17_1 3.00 | B17_2 3.00 | B17_3 6.00 | B17_4 6.00 | B17_5 9.50 | B17_6 8.00 | B17_7 9.00 |
| B18 75.00 | B18_1 2.00 | B18_2 2.00 | B18_3 4.00 | B18_4 3.50 | B18_5 5.00 | B18_6 5.00 | B18_7 7.00 |
| | B18_8 7.00 | B18_9 8.00 | B18_10 8.00 | B18_11 9.50 | B18_12 9.00 | B18_13 10.00 | |
| B19 80.00 | B19_1 2.00 | B19_2 2.00 | B19_3 5.00 | B19_4 4.00 | B19_5 5.00 | B19_6 5.00 | B19_7 7.00 |
| | B19_8 7.00 | B19_9 8.00 | B19_10 8.00 | B19_11 9.50 | B19_12 9.00 | B19_13 10.00 | |
| B20 80.00 | B20_1 2.00 | B20_2 2.00 | B20_3 4.00 | B20_4 4.00 | B20_5 5.00 | B20_6 5.00 | B20_7 6.50 |
| | B20_8 7.00 | B20_9 8.00 | B20_10 8.00 | B20_11 9.50 | B20_12 9.50 | B20_13 10.00 | |
| B21 70.00 | B21_1 2.00 | B21_2 2.00 | B21_3 4.50 | B21_4 4.00 | B21_5 5.50 | B21_6 5.00 | B21_7 6.50 |
| | B21_8 7.00 | B21_9 8.00 | B21_10 8.00 | B21_11 9.50 | B21_12 9.00 | B21_13 10.00 | |
| B22 45.00 | B22_1 3.00 | B22_2 3.00 | B22_3 5.00 | B22_4 5.00 | B22_5 9.50 | B22_6 8.00 | B22_7 10.00 |
| B23 55.00 | B23_1 3.00 | B23_2 3.00 | B23_3 5.00 | B23_4 5.00 | B23_5 9.50 | B23_6 8.00 | B23_7 10.00 |
| B24 50.00 | B24_1 2.50 | B24_2 2.00 | B24_3 6.50 | B24_4 6.00 | B24_5 9.50 | B24_6 9.00 | B24_7 10.00 |
| B25 70.00 | B25_1 2.00 | B25_2 2.00 | B25_3 6.00 | B25_4 6.00 | B25_5 9.50 | B25_6 8.00 | B25_7 10.00 |
| B26 40.00 | B26_1 3.00 | B26_2 4.00 | B26_3 5.50 | B26_4 6.00 | B26_5 9.00 | B26_6 8.00 | B26_7 10.00 |
| B27 40.00 | B27_1 2.00 | B27_2 2.00 | B27_3 5.50 | B27_4 5.00 | B27_5 9.50 | B27_6 8.00 | B27_7 10.00 |
| B28 80.00 | B28_1 2.00 | B28_2 2.00 | B28_3 5.00 | B28_4 5.00 | B28_5 6.00 | B28_6 6.00 | B28_7 7.00 |
| | B28_8 6.00 | B28_9 8.00 | B28_10 8.00 | B28_11 9.50 | B28_12 9.00 | B28_13 10.00 | |
| B29 70.00 | B29_1 2.00 | B29_2 2.00 | B29_3 3.00 | B29_4 4.00 | B29_5 5.00 | B29_6 5.00 | B29_7 7.00 |
| | B29_8 6.00 | B29_9 8.00 | B29_10 7.00 | B29_11 9.50 | B29_12 9.00 | B29_13 10.00 | |
| B30 50.00 | B30_1 1.50 | B30_2 2.75 | B30_3 5.00 | B30_4 8.00 | B30_5 10.00 | | |
| B31 55.00 | B31_1 1.50 | B31_2 2.00 | B31_3 5.00 | B31_4 8.00 | B31_5 10.00 | | |
| B32 70.00 | B32_1 1.50 | B32_2 4.00 | B32_3 6.00 | B32_4 8.00 | B32_5 10.00 | | |

TABLE 4-continued

Median under situation principle for attack subtraction factors

| Game factor | Game Situation factor | | | | | | |
|---|---|---|---|---|---|---|---|
| B33 80.00 | B33_1 8.00 | B33_2 7.00 | B33_3 6.00 | B33_4 6.00 | B33_5 6.00 | B33_6 6.00 | B33_7 8.00 |
| | B33_8 9.00 | B33_9 10.00 | | | | | |
| B34 70.00 | B34_1 8.00 | B34_2 6.00 | B34_3 6.00 | B34_4 6.00 | B34_5 6.00 | B34_6 6.00 | B34_7 6.00 |
| | B34_8 8.00 | B34_9 10.00 | | | | | |

TABLE 5

Median under situation principle for defense addition factors

| Game factor | Game Situation factor | | | | | | |
|---|---|---|---|---|---|---|---|
| C1 90.00 | C1_1 3.00 | C1_2 3.00 | C1_3 6.00 | C1_4 7.00 | C1_5 9.00 | C1_6 9.50 | C1_7 10.00 |
| C2 85.00 | C2_1 4.00 | C2_2 4.00 | C2_3 6.00 | C2_4 6.50 | C2_5 8.00 | C2_6 10.00 | C2_7 9.00 |
| C3 80.00 | C3_1 4.00 | C3_2 4.00 | C3_3 6.00 | C3_4 6.00 | C3_5 8.00 | C3_6 9.50 | C3_7 9.00 |
| C4 70.00 | C4_1 2.00 | C4_2 2.00 | C4_3 6.00 | C4_4 6.00 | C4_5 9.00 | C4_6 9.50 | C4_7 10.00 |
| C5 50.00 | C5_1 2.00 | C5_2 2.00 | C5_3 2.50 | C5_4 3.00 | C5_5 4.00 | C5_6 4.00 | C5_7 4.50 |
| | C5_8 4.00 | C5_9 5.50 | C5_10 5.00 | C5_11 7.00 | C5_12 6.00 | C5_13 7.50 | C5_14 7.50 |
| | C5_15 7.50 | C5_16 8.50 | C5_17 8.50 | C5_18 9.00 | C5_19 8.50 | C5_20 9.50 | C5_21 10.00 |
| C6 85.00 | C6_1 2.00 | C6_2 2.00 | C6_3 3.00 | C6_4 3.00 | C6_5 4.00 | C6_6 4.00 | C6_7 4.00 |
| | C6_8 5.00 | C6_9 6.50 | C6_10 6.50 | C6_11 6.00 | C6_12 6.00 | C6_13 7.50 | C6_14 6.50 |
| | C6_15 6.00 | C6_16 7.00 | C6_17 8.00 | C6_18 9.00 | C6_19 9.00 | C6_20 9.50 | C6_21 10.00 |
| C7 60.00 | C7_1 10.00 | C7_2 9.00 | C7_3 8.00 | C7_4 6.00 | C7_5 6.00 | C7_6 5.00 | C7_7 4.00 |
| | C7_8 3.00 | C7_9 3.00 | | | | | |
| C8 60.00 | C8_1 2.00 | C8_2 2.00 | C8_3 4.00 | C8_4 4.00 | C8_5 7.00 | C8_6 8.00 | C8_7 10.00 |
| C9 80.00 | C9_1 2.00 | C9_2 2.00 | C9_3 3.00 | C9_4 3.00 | C9_5 4.00 | C9_6 6.00 | C9_7 6.00 |
| | C9_8 7.00 | C9_9 8.00 | C9_10 8.00 | C9_11 9.00 | C9_12 9.50 | C9_13 10.00 | |
| C10 50.00 | C10_1 3.00 | C10_2 6.00 | C10_3 8.00 | C10_4 10.00 | | | |
| C11 60.00 | C11_1 2.00 | C11_2 5.00 | C11_3 8.00 | C11_4 9.00 | | | |
| C12 50.00 | C12_1 3.00 | C12_2 3.00 | C12_3 3.50 | C12_4 4.00 | C12_5 5.00 | C12_6 6.00 | C12_7 5.00 |
| | C12_8 5.50 | C12_9 8.50 | C12_10 7.00 | C12_11 9.50 | C12_12 9.00 | C12_13 9.00 | |
| C13 70.00 | C13_1 3.00 | C13_2 6.00 | C13_3 10.00 | C13_4 9.00 | | | |
| C14 50.00 | C14_1 2.00 | C14_2 2.00 | C14_3 5.00 | C14_4 6.00 | C14_5 8.00 | C14_6 9.50 | C14_7 8.00 |
| C15 80.00 | C15_1 2.00 | C15_2 2.00 | C15_3 3.50 | C15_4 4.00 | C15_5 4.50 | C15_6 5.00 | C15_7 7.50 |
| | C15_8 7.00 | C15_9 8.50 | C15_10 8.00 | C15_11 9.00 | C15_12 9.00 | C15_13 9.00 | |
| C16 70.00 | C16_1 3.00 | C16_2 6.00 | C16_3 9.00 | C16_4 10.00 | | | |
| C17 90.00 | C17_1 4.00 | C17_2 4.00 | C17_3 6.00 | C17_4 6.00 | C17_5 8.00 | C17_6 9.50 | C17_7 9.00 |
| C18 50.00 | C18_1 2.00 | C18_2 2.00 | C18_3 4.00 | C18_4 5.00 | C18_5 8.00 | C18_6 9.00 | C18_7 10.00 |
| C19 5.00 | C19_1 2.00 | C19_2 3.00 | C19_3 5.00 | C19_4 6.00 | C19_5 7.00 | C19_6 9.00 | C19_7 9.00 |

TABLE 5-continued

Median under situation principle for defense addition factors

| Game factor | Game Situation factor | | | | | | |
|---|---|---|---|---|---|---|---|
| C20 85.00 | C20_1 2.00 | C20_2 2.00 | C20_3 3.50 | C20_4 4.00 | C20_5 5.00 | C20_6 5.00 | C20_7 6.00 |
| | C20_8 7.00 | C20_9 8.50 | C20_10 8.00 | C20_11 9.50 | C20_12 9.00 | C20_13 9.00 | |
| C21 90.00 | C21_1 2.00 | C21_2 2.00 | C21_3 3.50 | C21_4 4.00 | C21_5 5.00 | C21_6 5.00 | C21_7 6.50 |
| | C21_8 6.00 | C21_9 8.50 | C21_10 8.00 | C21_11 10.00 | C21_12 8.00 | C21_13 8.50 | |
| C22 90.00 | C22_1 2.00 | C22_2 2.00 | C22_3 3.50 | C22_4 3.50 | C22_5 4.00 | C22_6 4.00 | C22_7 7.00 |
| | C22_8 6.00 | C22_9 8.50 | C22_10 7.50 | C22_11 9.00 | C22_12 9.00 | C22_13 10.00 | |
| C23 50.00 | C23_1 4.00 | C23_2 5.00 | C23_3 8.00 | C23_4 10.00 | | | |
| C24 80.00 | C24_1 2.00 | C24_2 2.00 | C24_3 4.00 | C24_4 4.00 | C24_5 5.00 | C24_6 5.00 | C24_7 6.50 |
| | C24_8 6.00 | C24_9 8.00 | C24_10 7.50 | C24_11 9.00 | C24_12 9.00 | C24_13 9.00 | |
| C25 95.00 | C25_1 8.00 | C25_2 5.00 | C25_3 4.00 | C25_4 5.00 | C25_5 5.00 | C25_6 5.50 | C25_7 6.00 |
| | C25_8 7.50 | C25_9 6.00 | C25_10 6.00 | C25_11 8.00 | C25_12 9.00 | C25_13 8.00 | |
| C26 50.00 | C26_1 3.00 | C26_2 5.00 | C26_3 9.00 | C26_4 9.00 | | | |
| C27 70.00 | C27_1 2.00 | C27_2 4.00 | C27_3 5.00 | C27_4 9.00 | C27_5 10.00 | | |
| C28 70.00 | C28_1 2.00 | C28_2 4.00 | C28_3 6.00 | C28_4 9.00 | C28_5 10.00 | | |
| C29 70.00 | C29_1 8.00 | C29_2 7.00 | C29_3 5.00 | C29_4 5.00 | C29_5 6.00 | C29_6 6.00 | C29_7 5.00 |
| | C29_8 8.00 | C29_9 10.00 | | | | | |
| C30 80.00 | C30_1 7.00 | C30_2 6.50 | C30_3 5.50 | C30_4 6.00 | C30_5 6.00 | C30_6 7.00 | C30_7 8.00 |
| | C30_8 9.00 | C30_9 10.00 | | | | | |

TABLE 6

Median under situation principle for defense subtraction factors

| Game factor | Game Situation factor | | | | | | |
|---|---|---|---|---|---|---|---|
| C1 90.00 | C1_1 3.00 | C1_2 3.00 | C1_3 6.00 | C1_4 7.00 | C1_5 9.00 | C1_6 9.50 | C1_7 10.00 |
| C2 85.00 | C2_1 4.00 | C2_2 4.00 | C2_3 6.00 | C2_4 6.50 | C2_5 8.00 | C2_6 10.00 | C2_7 9.00 |
| C3 80.00 | C3_1 4.00 | C3_2 4.00 | C3_3 6.00 | C3_4 6.00 | C3_5 8.00 | C3_6 9.50 | C3_7 9.00 |
| C4 70.00 | C4_1 2.00 | C4_2 2.00 | C4_3 6.00 | C4_4 6.00 | C4_5 9.00 | C4_6 9.50 | C4_7 10.00 |
| C5 50.00 | C5_1 2.00 | C5_2 2.00 | C5_3 2.50 | C5_4 3.00 | C5_5 4.00 | C5_6 4.00 | C5_7 4.50 |
| | C5_8 4.00 | C5_9 5.50 | C5_10 5.00 | C5_11 7.00 | C5_12 6.00 | C5_13 7.50 | C5_14 7.50 |
| | C5_15 7.50 | C5_16 8.50 | C5_17 8.50 | C5_18 9.00 | C5_19 8.50 | C5_20 9.50 | C5_21 10.00 |
| C6 85.00 | C6_1 2.00 | C6_2 2.00 | C6_3 3.00 | C6_4 3.00 | C6_5 4.00 | C6_6 4.00 | C6_7 4.00 |
| | C6_8 5.00 | C6_9 6.50 | C6_10 6.50 | C6_11 6.00 | C6_12 6.00 | C6_13 7.50 | C6_14 6.50 |
| | C6_15 6.00 | C6_16 7.00 | C6_17 8.00 | C6_18 9.00 | C6_19 9.00 | C6_20 9.50 | C6_21 10.00 |
| C7 60.00 | C7_1 10.00 | C7_2 9.00 | C7_3 8.00 | C7_4 6.00 | C7_5 6.00 | C7_6 5.00 | C7_7 4.00 |
| | C7_8 3.00 | C7_9 3.00 | | | | | |

TABLE 6-continued

Median under situation principle for defense subtraction factors

| Game factor | Game Situation factor | | | | | | |
|---|---|---|---|---|---|---|---|
| C8 | C8_1 | C8_2 | C8_3 | C8_4 | C8_5 | C8_6 | C8_7 |
| 60.00 | 2.00 | 2.00 | 4.00 | 4.00 | 7.00 | 8.00 | 10.00 |
| C9 | C9_1 | C9_2 | C9_3 | C9_4 | C9_5 | C9_6 | C9_7 |
| 80.00 | 2.00 | 2.00 | 3.00 | 3.00 | 4.00 | 6.00 | 6.00 |
|  | C9_8 | C9_9 | C9_10 | C9_11 | C9_12 | C9_13 |  |
|  | 7.00 | 8.00 | 8.00 | 9.00 | 9.50 | 10.00 |  |
| C10 | C10_1 | C10_2 | C10_3 | C10_4 |  |  |  |
| 50.00 | 3.00 | 6.00 | 8.00 | 10.00 |  |  |  |
| C11 | C11_1 | C11_2 | C11_3 | C11_4 |  |  |  |
| 60.00 | 2.00 | 5.00 | 8.00 | 9.00 |  |  |  |
| C12 | C12_1 | C12_2 | C12_3 | C12_4 | C12_5 | C12_6 | C12_7 |
| 50.00 | 3.00 | 3.00 | 3.50 | 4.00 | 5.00 | 6.00 | 5.00 |
|  | C12_8 | C12_9 | C12_10 | C12_11 | C12_12 | C12_13 |  |
|  | 5.50 | 8.50 | 7.00 | 9.50 | 9.00 | 9.00 |  |
| C13 | C13_1 | C13_2 | C13_3 | C13_4 |  |  |  |
| 70.00 | 3.00 | 6.00 | 10.00 | 9.00 |  |  |  |
| C14 | C14_1 | C14_2 | C14_3 | C14_4 | C14_5 | C14_6 | C14_7 |
| 50.00 | 2.00 | 2.00 | 5.00 | 6.00 | 8.00 | 9.50 | 8.00 |
| C15 | C15_1 | C15_2 | C15_3 | C15_4 | C15_5 | C15_6 | C15_7 |
| 80.00 | 2.00 | 2.00 | 3.50 | 4.00 | 4.50 | 5.00 | 7.50 |
|  | C15_8 | C15_9 | C15_10 | C15_11 | C15_12 | C15_13 |  |
|  | 7.00 | 8.50 | 8.00 | 9.00 | 9.00 | 9.00 |  |
| C16 | C16_1 | C16_2 | C16_3 | C16_4 |  |  |  |
| 70.00 | 3.00 | 6.00 | 9.00 | 10.00 |  |  |  |
| C17 | C17_1 | C17_2 | C17_3 | C17_4 | C17_5 | C17_6 | C17_7 |
| 90.00 | 4.00 | 4.00 | 6.00 | 6.00 | 8.00 | 9.50 | 9.00 |
| C18 | C18_1 | C18_2 | C18_3 | C18_4 | C18_5 | C18_6 | C18_7 |
| 50.00 | 2.00 | 2.00 | 4.00 | 5.00 | 8.00 | 9.00 | 10.00 |
| C19 | C19_1 | C19_2 | C19_3 | C19_4 | C19_5 | C19_6 | C19_7 |
| 5.00 | 2.00 | 3.00 | 5.00 | 6.00 | 7.00 | 9.00 | 9.00 |
| C20 | C20_1 | C20_2 | C20_3 | C20_4 | C20_5 | C20_6 | C20_7 |
| 85.00 | 2.00 | 2.00 | 3.50 | 4.00 | 5.00 | 5.00 | 6.00 |
|  | C20_8 | C20_9 | C20_10 | C20_11 | C20_12 | C20_13 |  |
|  | 7.00 | 8.50 | 8.00 | 9.50 | 9.00 | 9.00 |  |
| C21 | C21_1 | C21_2 | C21_3 | C21_4 | C21_5 | C21_6 | C21_7 |
| 90.00 | 2.00 | 2.00 | 3.50 | 4.00 | 5.00 | 5.00 | 6.50 |
|  | C21_8 | C21_9 | C21_10 | C21_11 | C21_12 | C21_13 |  |
|  | 6.00 | 8.50 | 8.00 | 10.00 | 8.00 | 8.50 |  |
| C22 | C22_1 | C22_2 | C22_3 | C22_4 | C22_5 | C22_6 | C22_7 |
| 90.00 | 2.00 | 2.00 | 3.50 | 3.50 | 4.00 | 4.00 | 7.00 |
|  | C22_8 | C22_9 | C22_10 | C22_11 | C22_12 | C22_13 |  |
|  | 6.00 | 8.50 | 7.50 | 9.00 | 9.00 | 10.00 |  |
| C23 | C23_1 | C23_2 | C23_3 | C23_4 |  |  |  |
| 50.00 | 4.00 | 5.00 | 8.00 | 10.00 |  |  |  |
| C24 | C24_1 | C24_2 | C24_3 | C24_4 | C24_5 | C24_6 | C24_7 |
| 80.00 | 2.00 | 2.00 | 4.00 | 4.00 | 5.00 | 5.00 | 6.50 |
|  | C24_8 | C24_9 | C24_10 | C24_11 | C24_12 | C24_13 |  |
|  | 6.00 | 8.00 | 7.50 | 9.00 | 9.00 | 9.00 |  |
| C25 | C25_1 | C25_2 | C25_3 | C25_4 | C25_5 | C25_6 | C25_7 |
| 95.00 | 8.00 | 5.00 | 4.00 | 5.00 | 5.00 | 5.50 | 6.00 |
|  | C25_8 | C25_9 | C25_10 | C25_11 | C25_12 | C25_13 |  |
|  | 7.50 | 6.00 | 6.00 | 8.00 | 9.00 | 8.00 |  |
| C26 | C26_1 | C26_2 | C26_3 | C26_4 |  |  |  |
| 50.00 | 3.00 | 5.00 | 9.00 | 9.00 |  |  |  |
| C27 | C27_1 | C27_2 | C27_3 | C27_4 | C27_5 |  |  |
| 70.00 | 2.00 | 4.00 | 5.00 | 9.00 | 10.00 |  |  |
| C28 | C28_1 | C28_2 | C28_3 | C28_4 | C28_5 |  |  |
| 70.00 | 2.00 | 4.00 | 6.00 | 9.00 | 10.00 |  |  |
| C29 | C29_1 | C29_2 | C29_3 | C29_4 | C29_5 | C29_6 | C29_7 |
| 70.00 | 8.00 | 7.00 | 5.00 | 5.00 | 6.00 | 6.00 | 5.00 |
|  | C29_8 | C29_9 |  |  |  |  |  |
|  | 8.00 | 10.00 |  |  |  |  |  |
| C30 | C30_1 | C30_2 | C30_3 | C30_4 | C30_5 | C30_6 | C30_7 |
| 80.00 | 7.00 | 6.50 | 5.50 | 6.00 | 6.00 | 7.00 | 8.00 |
|  | C30_8 | C30_9 |  |  |  |  |  |
|  | 9.00 | 10.00 |  |  |  |  |  |

In step S13, the weight setting unit within the manager server sets weights for the respective game situation factors under the game situation principle for the attack addition game factors, the attack subtraction game factors, the defense addition game factors and the defense subtraction game factors.

The weights for the game factors and the game situation factors under the game situation principle for the attack addition game factors, the attack subtraction game factors, the defense addition game factors and the defense subtraction game factors are as follows in below Table 7-Table 10.

TABLE 7

Weight under situation principle for attack addition factors

| Game factor | Game Situation factor | | | | | | |
|---|---|---|---|---|---|---|---|
| A1 | A1_1 | A1_2 | A1_3 | A1_4 | A1_5 | A1_6 | A1_7 |
|  | 1.00 | 0.80 | 1.00 | 0.80 | 1.60 | 1.60 | 1.90 |
| A2 | A2_1 | A2_2 | A2_3 | A2_4 | A2_5 | A2_6 | A2_7 |
|  | 1.05 | 0.70 | 0.88 | 0.88 | 1.40 | 1.40 | 1.58 |
| A3 | A3_1 | A3_2 | A3_3 | A3_4 | A3_5 | A3_6 | A3_7 |
|  | 0.88 | 0.88 | 1.23 | 0.88 | 1.40 | 1.40 | 1.75 |
| A4 | A4_1 | A4_2 | A4_3 | A4_4 | A4_5 | A4_6 | A4_7 |
|  | 0.88 | 0.88 | 1.05 | 0.70 | 0.96 | 0.70 | 1.23 |
|  | A4_8 | A4_9 | A4_10 | A4_11 | A4_12 | A4_13 |  |
|  | 0.96 | 1.40 | 1.23 | 1.40 | 1.58 | 1.66 |  |
| A5 | A5_1 | A5_2 | A5_3 | A5_4 | A5_5 | A5_6 | A5_7 |
|  | 0.60 | 0.60 | 0.75 | 0.75 | 1.20 | 1.20 | 1.35 |
| A6 | A6_1 | A6_2 | A6_3 | A6_4 | A6_5 | A6_6 | A6_7 |
|  | 0.80 | 0.60 | 1.00 | 0.80 | 1.00 | 0.80 | 1.20 |
|  | A6_8 | A6_9 | A6_10 | A6_11 | A6_12 | A6_13 |  |
|  | 1.00 | 1.40 | 1.20 | 1.60 | 1.80 | 1.90 |  |
| A7 | A7_1 | A7_2 | A7_3 | A7_4 | A7_5 | A7_6 | A7_7 |
|  | 0.53 | 0.53 | 0.88 | 0.70 | 0.96 | 0.88 | 0.70 |
|  | A7_8 | A7_9 | A7_10 | A7_11 | A7_12 | A7_13 |  |
|  | 0.70 | 1.05 | 1.05 | 1.23 | 1.58 | 1.75 |  |
| A8 | A8_1 | A8_2 | A8_3 | A8_4 | A8_5 | A8_6 | A8_7 |
|  | 0.53 | 0.35 | 0.70 | 0.70 | 1.05 | 1.05 | 1.05 |
|  | A8_8 | A8_9 | A8_10 | A8_11 | A8_12 | A8_13 |  |
|  | 0.88 | 1.05 | 1.23 | 1.58 | 1.40 | 1.66 |  |
| A9 | A9_1 | A9_2 | A9_3 | A9_4 | A9_5 | A9_6 | A9_7 |
|  | 0.38 | 0.50 | 0.63 | 0.75 | 1.00 | 0.88 | 1.13 |
| A10 | A10_1 | A10_2 | A10_3 | A10_4 | A10_5 | A10_6 | A10_7 |
|  | 0.60 | 0.60 | 0.80 | 0.60 | 0.80 | 0.70 | 1.00 |
|  | A10_8 | A10_9 | A10_10 | A10_11 | A10_12 | A10_13 |  |
|  | 1.00 | 1.10 | 1.20 | 1.60 | 1.70 | 1.90 |  |
| A11 | A11_1 | A11_2 | A11_3 | A11_4 | A11_5 | A11_6 | A11_7 |
|  | 0.53 | 0.53 | 0.53 | 0.70 | 0.70 | 0.70 | 0.88 |
|  | A11_8 | A11_9 | A11_10 | A11_11 | A11_12 | A11_13 |  |
|  | 0.88 | 1.23 | 1.23 | 1.49 | 1.58 | 1.75 |  |
| A12 | A12_1 | A12_2 | A12_3 | A12_4 | A12_5 | A12_6 | A12_7 |
|  | 0.70 | 0.35 | 0.70 | 0.53 | 0.88 | 0.88 | 0.88 |
|  | A12_8 | A12_9 | A12_10 | A12_11 | A12_12 | A12_13 |  |
|  | 1.14 | 1.05 | 1.05 | 1.23 | 1.58 | 1.58 |  |
| A13 | A13_1 | A13_2 | A13_3 | A13_4 | A13_5 | A13_6 | A13_7 |
|  | 0.35 | 0.53 | 0.70 | 0.88 | 1.40 | 1.23 | 1.58 |
| A14 | A14_1 | A14_2 | A14_3 | A14_4 | A14_5 | A14_6 | A14_7 |
|  | 0.45 | 0.45 | 0.60 | 0.60 | 0.75 | 0.60 | 0.90 |
|  | A14_8 | A14_9 | A14_10 | A14_11 | A14_12 | A14_13 |  |
|  | 0.75 | 1.05 | 1.05 | 1.35 | 1.35 | 1.35 |  |
| A15 | A15_1 | A15_2 | A15_3 | A15_4 | A15_5 | A15_6 | A15_7 |
|  | 0.20 | 0.20 | 0.70 | 0.60 | 0.90 | 0.80 | 1.00 |
| A16 | A16_1 | A16_2 | A16_3 | A16_4 | A16_5 | A16_6 | A16_7 |
|  | 0.20 | 0.20 | 0.50 | 0.50 | 0.70 | 0.80 | 0.90 |
| A17 | A17_1 | A17_2 | A17_3 | A17_4 | A17_5 | A17_6 | A17_7 |
|  | 0.19 | 0.29 | 0.57 | 0.48 | 0.90 | 0.76 | 0.86 |
| A18 | A18_1 | A18_2 | A18_3 | A18_4 | A18_5 | A18_6 | A18_7 |
|  | 0.70 | 0.53 | 1.05 | 0.88 | 1.58 | 1.40 | 1.58 |
| A19 | A19_1 | A19_2 | A19_3 | A19_4 | A19_5 | A19_6 | A19_7 |
|  | 0.38 | 0.38 | 0.50 | 0.44 | 0.50 | 0.50 | 0.63 |
|  | A19_8 | A19_9 | A19_10 | A19_11 | A19_12 | A19_13 |  |
|  | 0.63 | 1.00 | 0.88 | 1.13 | 1.13 | 1.25 |  |
| A20 | A20_1 | A20_2 | A20_3 | A20_4 | A20_5 | A20_6 | A20_7 |
|  | 0.53 | 0.53 | 0.88 | 0.88 | 1.05 | 0.88 | 1.23 |
|  | A20_8 | A20_9 | A20_10 | A20_11 | A20_12 | A20_13 |  |
|  | 1.05 | 1.40 | 1.40 | 1.58 | 1.66 | 1.75 |  |
| A21 | A21_1 | A21_2 | A21_3 | A21_4 | A21_5 | A21_6 | A21_7 |
|  | 0.30 | 0.40 | 0.60 | 0.60 | 0.70 | 0.90 | 0.90 |

TABLE 7-continued

Weight under situation principle for attack addition factors

| Game factor | Game Situation factor | | | | | | |
|---|---|---|---|---|---|---|---|
| A22 | A22_1<br>0.45 | A22_2<br>0.45 | A22_3<br>0.90 | A22_4<br>0.90 | A22_5<br>1.01 | A22_6<br>0.90 | A22_7<br>1.24 |
| | A22_8<br>1.13 | A22_9<br>1.35 | A22_10<br>1.58 | A22_11<br>1.58 | A22_12<br>1.58 | A22_13<br>1.58 | A22_14<br>1.80 |
| | A22_15<br>2.03 | A22_16<br>1.80 | A22_17<br>1.80 | A22_18<br>1.91 | A22_19<br>2.03 | A22_20<br>2.25 | A22_21<br>2.25 |
| A23 | A23_1<br>0.40 | A23_2<br>0.40 | A23_3<br>0.60 | A23_4<br>0.60 | A23_5<br>0.80 | A23_6<br>0.80 | A23_7<br>1.00 |
| | A23_8<br>1.00 | A23_9<br>1.20 | A23_10<br>1.20 | A23_11<br>1.20 | A23_12<br>1.30 | A23_13<br>1.40 | A23_14<br>1.60 |
| | A23_15<br>1.60 | A23_16<br>1.60 | A23_17<br>1.80 | A23_18<br>1.80 | A23_19<br>1.80 | A23_20<br>1.90 | A23_21<br>2.00 |
| A24 | A24_1<br>0.60 | A24_2<br>0.80 | A24_3<br>0.90 | A24_4<br>1.00 | A24_5<br>1.00 | A24_6<br>1.00 | A24_7<br>1.20 |
| | A24_8<br>1.20 | A24_9<br>1.60 | A24_10<br>1.60 | A24_11<br>1.80 | A24_12<br>1.80 | A24_13<br>2.00 | |
| A25 | A25_1<br>0.50 | A25_2<br>0.25 | A25_3<br>0.75 | A25_4<br>0.63 | A25_5<br>1.19 | A25_6<br>1.13 | A25_7<br>1.13 |
| A26 | A26_1<br>0.30 | A26_2<br>0.38 | A26_3<br>0.90 | A26_4<br>0.90 | A26_5<br>1.20 | A26_6<br>1.05 | A26_7<br>6.00 |
| A27 | A27_1<br>0.31 | A27_2<br>0.50 | A27_3<br>0.63 | A27_4<br>0.69 | A27_5<br>0.75 | A27_6<br>0.81 | A27_7<br>0.78 |
| | A27_8<br>0.88 | A27_9<br>0.84 | A27_10<br>0.81 | A27_11<br>0.81 | A27_12<br>0.94 | A27_13<br>1.00 | |
| A28 | A28_1<br>0.60 | A28_2<br>0.80 | A28_3<br>0.80 | A28_4<br>0.80 | A28_5<br>1.00 | A28_6<br>1.00 | A28_7<br>1.20 |
| | A28_8<br>1.20 | A28_9<br>1.60 | A28_10<br>1.40 | A28_11<br>1.80 | A28_12<br>1.80 | A28_13<br>2.00 | |
| A29 | A29_1<br>0.45 | A29_2<br>0.45 | A29_3<br>0.60 | A29_4<br>0.45 | A29_5<br>0.75 | A29_6<br>0.75 | A29_7<br>3.00 |
| | A29_8<br>0.90 | A29_9<br>0.90 | A29_10<br>1.13 | A29_11<br>1.35 | A29_12<br>1.35 | A29_13<br>1.50 | |
| A30 | A30_1<br>0.44 | A30_2<br>0.44 | A30_3<br>0.88 | A30_4<br>0.66 | A30_5<br>1.10 | A30_6<br>1.10 | A30_7<br>1.10 |
| | A30_8<br>1.10 | A30_9<br>1.32 | A30_10<br>1.32 | A30_11<br>1.76 | A30_12<br>1.54 | A30_13<br>1.54 | A30_14<br>1.54 |
| | A30_15<br>1.65 | A30_16<br>1.65 | A30_17<br>1.87 | A30_18<br>1.98 | A30_19<br>1.98 | A30_20<br>2.20 | A30_21<br>2.20 |
| A31 | A31_1<br>0.50 | A31_2<br>0.25 | A31_3<br>0.75 | A31_4<br>0.75 | A31_5<br>1.13 | A31_6<br>1.00 | A31_7<br>1.25 |
| A32 | A32_1<br>0.56 | A32_2<br>0.45 | A32_3<br>0.78 | A32_4<br>0.67 | A32_5<br>0.89 | A32_6<br>0.89 | A32_7<br>1.72 |
| | A32_8<br>1.56 | A32_9<br>1.84 | A32_10<br>1.78 | A32_11<br>2.00 | A32_12<br>1.78 | A32_13<br>2.23 | |
| A33 | A33_1<br>0.38 | A33_2<br>0.38 | A33_3<br>0.50 | A33_4<br>0.50 | A33_5<br>0.63 | A33_6<br>0.50 | A33_7<br>0.81 |
| | A33_8<br>0.63 | A33_9<br>0.94 | A33_10<br>0.75 | A33_11<br>1.13 | A33_12<br>1.13 | A33_13<br>1.25 | |
| A34 | A34_1<br>0.30 | A34_2<br>0.40 | A34_3<br>0.60 | A34_4<br>0.60 | A34_5<br>0.80 | A34_6<br>0.80 | A34_7<br>1.00 |
| A35 | A35_1<br>0.50 | A35_2<br>0.50 | A35_3<br>0.75 | A35_4<br>0.75 | A35_5<br>1.00 | A35_6<br>1.00 | A35_7<br>1.13 |
| | A35_8<br>1.25 | A35_9<br>1.50 | A35_10<br>1.50 | A35_11<br>1.75 | A35_12<br>1.63 | A35_13<br>1.75 | A35_14<br>2.00 |
| | A35_15<br>2.00 | A35_16<br>2.00 | A35_17<br>2.25 | A35_18<br>2.25 | A35_19<br>2.38 | A35_20<br>2.50 | A35_21<br>2.38 |
| A36 | A36_1<br>0.45 | A36_2<br>0.60 | A36_3<br>1.05 | A36_4<br>0.90 | A36_5<br>1.50 | A36_6<br>1.20 | A36_7<br>1.47 |
| A37 | A37_1<br>0.30 | A37_2<br>0.45 | A37_3<br>0.90 | A37_4<br>0.90 | A37_5<br>1.32 | A37_6<br>1.20 | A37_7<br>1.50 |
| A38 | A38_1<br>0.23 | A38_2<br>0.56 | A38_3<br>0.79 | A38_4<br>1.01 | A38_5<br>1.13 | | |
| A39 | A39_1<br>0.20 | A39_2<br>0.40 | A39_3<br>0.60 | A39_4<br>0.90 | A39_5<br>1.00 | | |
| A40 | A40_1<br>1.54 | A40_2<br>0.65 | A40_3<br>0.61 | A40_4<br>0.81 | A40_5<br>0.81 | A40_6<br>0.98 | A40_7<br>1.14 |
| | A40_8<br>1.30 | A40_9<br>1.46 | | | | | |
| A41 | A41_1<br>1.45 | A41_2<br>0.65 | A41_3<br>0.70 | A41_4<br>0.73 | A41_5<br>0.73 | A41_6<br>0.87 | A41_7<br>1.02 |
| | A41_8<br>1.31 | A41_9<br>1.31 | | | | | |

TABLE 8

Weight under situation principle for attack subtraction factors

| Game factor | Game Situation factor | | | | | | | | | | | | |
|---|---|---|---|---|---|---|---|---|---|---|---|---|---|
| B1 | B1_1<br>0.40 | B1_2<br>0.60 | B1_3<br>1.00 | B1_4<br>0.80 | B1_5<br>1.00 | B1_6<br>1.00 | B1_7<br>1.20 | B1_8<br>1.20 | B1_9<br>1.40 | B1_10<br>1.60 | B1_11<br>1.90 | B1_12<br>1.80 | B1_13<br>2.00 |
| B2 | B2_1<br>0.68 | B2_2<br>0.45 | B2_3<br>1.13 | B2_4<br>1.13 | B2_5<br>2.03 | B2_6<br>1.80 | B2_7<br>2.25 | | | | | | |
| B3 | B3_1<br>0.30 | B3_2<br>0.30 | B3_3<br>0.75 | B3_4<br>0.75 | B3_5<br>1.35 | B3_6<br>1.35 | B3_7<br>1.43 | | | | | | |
| B4 | B4_1<br>0.30 | B4_2<br>0.30 | B4_3<br>0.75 | B4_4<br>0.75 | B4_5<br>1.35 | B4_6<br>1.35 | B4_7<br>1.35 | | | | | | |
| B5 | B5_1<br>0.41 | B5_2<br>0.41 | B5_3<br>0.81 | B5_4<br>0.81 | B5_5<br>1.01 | B5_6<br>1.01 | B5_7<br>1.42 | B5_8<br>1.42 | B5_9<br>1.62 | B5_10<br>1.62 | B5_11<br>1.82 | B5_12<br>1.82 | B5_13<br>2.03 |
| B6 | B6_1<br>0.45 | B6_2<br>0.45 | B6_3<br>1.05 | B6_4<br>0.90 | B6_5<br>1.43 | B6_6<br>1.20 | B6_7<br>1.50 | | | | | | |
| B7 | B7_1<br>0.38 | B7_2<br>0.38 | B7_3<br>0.75 | B7_4<br>0.75 | B7_5<br>1.19 | B7_6<br>1.00 | B7_7<br>1.25 | | | | | | |
| B8 | B8_1<br>0.40 | B8_2<br>0.40 | B8_3<br>0.60 | B8_4<br>0.60 | B8_5<br>0.80 | B8_6<br>0.80 | B8_7<br>1.00 | B8_8<br>1.00 | B8_9<br>1.50 | B8_10<br>1.40 | B8_11<br>1.90 | B8_12<br>1.60 | B8_13<br>2.00 |
| B9 | B9_1<br>0.31 | B9_2<br>0.25 | B9_3<br>0.69 | B9_4<br>0.63 | B9_5<br>1.19 | B9_6<br>1.00 | B9_7<br>1.25 | | | | | | |
| B10 | B10_1<br>0.40 | B10_2<br>0.40 | B10_3<br>0.60 | B10_4<br>0.60 | B10_5<br>0.80 | B10_6<br>0.80 | B10_7<br>1.20 | B10_8<br>1.30 | B10_9<br>1.60 | B10_10<br>1.60 | B10_11<br>1.80 | B10_12<br>1.80 | B10_13<br>2.00 |
| B11 | B11_1<br>0.40 | B11_2<br>0.20 | B11_3<br>0.60 | B11_4<br>0.80 | B11_5<br>1.00 | B11_6<br>1.00 | B11_7<br>1.20 | B11_8<br>1.40 | B11_9<br>1.70 | B11_10<br>1.60 | B11_11<br>1.90 | B11_12<br>1.80 | B11_13<br>2.00 |
| B12 | B12_1<br>0.25 | B12_2<br>0.25 | B12_3<br>0.50 | B12_4<br>0.44 | B12_5<br>0.63 | B12_6<br>0.63 | B12_7<br>0.75 | B12_8<br>0.75 | B12_9<br>0.94 | B12_10<br>0.94 | B12_11<br>1.13 | B12_12<br>1.13 | B12_13<br>1.25 |
| B13 | B13_1<br>0.48 | B13_2<br>0.48 | B13_3<br>1.07 | B13_4<br>1.19 | B13_5<br>1.43 | B13_6<br>1.54 | B13_7<br>1.90 | B13_8<br>1.90 | B13_9<br>2.14 | B13_10<br>2.14 | B13_11<br>2.26 | B13_12<br>2.14 | |
| B14 | B14_1<br>0.43 | B14_2<br>0.43 | B14_3<br>1.06 | B14_4<br>1.06 | B14_5<br>1.49 | B14_6<br>1.49 | B14_7<br>1.91 | B14_8<br>1.70 | B14_9<br>1.81 | B14_10<br>1.91 | B14_11<br>2.02 | B14_12<br>1.91 | |
| B15 | B15_1<br>0.45 | B15_2<br>0.45 | B15_3<br>1.13 | B15_4<br>1.13 | B15_5<br>1.35 | B15_6<br>1.24 | B15_7<br>1.80 | B15_8<br>1.80 | B15_9<br>2.03 | B15_10<br>2.03 | B15_11<br>2.14 | B15_12<br>2.25 | |
| B16 | B16_1<br>0.30 | B16_2<br>0.45 | B16_3<br>0.75 | B16_4<br>0.75 | B16_5<br>0.98 | B16_6<br>1.05 | B16_7<br>1.35 | B16_8<br>1.28 | B16_9<br>1.20 | B16_10<br>1.35 | B16_11<br>1.43 | B16_12<br>1.50 | |
| B17 | B17_1<br>0.63 | B17_2<br>0.63 | B17_3<br>1.26 | B17_4<br>1.26 | B17_5<br>2.00 | B17_6<br>1.68 | B17_7<br>1.89 | | | | | | |
| B18 | B18_1<br>0.38 | B18_2<br>0.38 | B18_3<br>0.75 | B18_4<br>0.66 | B18_5<br>0.94 | B18_6<br>0.94 | B18_7<br>1.31 | B18_8<br>1.31 | B18_9<br>1.50 | B18_10<br>1.50 | B18_11<br>1.78 | B18_12<br>1.69 | B18_13<br>1.88 |
| B19 | B19_1<br>0.40 | B19_2<br>0.40 | B19_3<br>1.00 | B19_4<br>0.80 | B19_5<br>1.00 | B19_6<br>1.00 | B19_7<br>1.40 | B19_8<br>1.40 | B19_9<br>1.60 | B19_10<br>1.60 | B19_11<br>1.90 | B19_12<br>1.80 | B19_13<br>2.00 |
| B20 | B20_1<br>0.40 | B20_2<br>0.40 | B20_3<br>0.80 | B20_4<br>0.80 | B20_5<br>1.00 | B20_6<br>1.00 | B20_7<br>1.30 | B20_8<br>1.40 | B20_9<br>1.60 | B20_10<br>1.60 | B20_11<br>1.90 | B20_12<br>1.90 | B20_13<br>2.00 |
| B21 | B21_1<br>0.35 | B21_2<br>0.35 | B21_3<br>0.79 | B21_4<br>0.70 | B21_5<br>0.96 | B21_6<br>0.88 | B21_7<br>1.14 | B21_8<br>1.23 | B21_9<br>1.40 | B21_10<br>1.40 | B21_11<br>1.66 | B21_12<br>1.58 | B21_13<br>1.75 |
| B22 | B22_1<br>0.34 | B22_2<br>0.34 | B22_3<br>0.56 | B22_4<br>0.56 | B22_5<br>1.07 | B22_6<br>0.90 | B22_7<br>1.13 | | | | | | |
| B23 | B23_1<br>0.41 | B23_2<br>0.41 | B23_3<br>0.69 | B23_4<br>0.69 | B23_5<br>1.31 | B23_6<br>1.10 | B23_7<br>1.38 | | | | | | |

TABLE 8-continued

Weight under situation principle for attack subtraction factors

| Game factor | Game Situation factor | | | | | | |
|---|---|---|---|---|---|---|---|
| B24 | B24_1 | B24_2 | B24_3 | B24_4 | B24_5 | B24_6 | B24_7 |
|  | 0.31 | 0.25 | 0.81 | 0.75 | 1.19 | 1.13 | 1.25 |
| B25 | B25_1 | B25_2 | B25_3 | B25_4 | B25_5 | B25_6 | B25_7 |
|  | 0.35 | 0.35 | 1.05 | 1.05 | 1.66 | 1.40 | 1.75 |
| B26 | B26_1 | B26_2 | B26_3 | B26_4 | B26_5 | B26_6 | B26_7 |
|  | 0.30 | 0.40 | 0.55 | 0.60 | 0.90 | 0.80 | 1.00 |
| B27 | B27_1 | B27_2 | B27_3 | B27_4 | B27_5 | B27_6 | B27_7 |
|  | 0.20 | 0.20 | 0.55 | 0.50 | 0.95 | 0.80 | 1.00 |
| B28 | B28_1 | B28_2 | B28_3 | B28_4 | B28_5 | B28_6 | B28_7 |
|  | 0.40 | 0.40 | 1.00 | 1.00 | 1.20 | 1.20 | 1.40 |
|  | B28_8 | B28_9 | B28_10 | B28_11 | B28_12 | B28_13 |  |
|  | 1.20 | 1.60 | 1.60 | 1.90 | 1.80 | 2.00 |  |
| B29 | B29_1 | B29_2 | B29_3 | B29_4 | B29_5 | B29_6 | B29_7 |
|  | 0.35 | 0.35 | 0.53 | 0.70 | 0.88 | 0.88 | 1.23 |
|  | B29_8 | B29_9 | B29_10 | B29_11 | B29_12 | B29_13 |  |
|  | 1.05 | 1.40 | 1.23 | 1.66 | 1.58 | 1.75 |  |
| B30 | B30_1 | B30_2 | B30_3 | B30_4 | B30_5 |  |  |
|  | 0.19 | 0.34 | 0.63 | 1.00 | 1.25 |  |  |
| B31 | B31_1 | B31_2 | B31_3 | B31_4 | B31_5 |  |  |
|  | 0.21 | 0.28 | 0.69 | 1.10 | 1.38 |  |  |
| B32 | B32_1 | B32_2 | B32_3 | B32_4 | B32_5 |  |  |
|  | 0.26 | 0.70 | 1.05 | 1.40 | 1.75 |  |  |
| B33 | B33_1 | B33_2 | B33_3 | B33_4 | B33_5 | B33_6 | B33_7 |
|  | 1.60 | 1.40 | 1.20 | 1.20 | 1.20 | 1.20 | 1.60 |
|  | B33_8 | B33_9 |  |  |  |  |  |
|  | 1.80 | 2.00 |  |  |  |  |  |
| B34 | B34_1 | B34_2 | B34_3 | B34_4 | B34_5 | B34_6 | B34_7 |
|  | 1.40 | 1.05 | 1.05 | 1.05 | 1.05 | 1.05 | 1.05 |
|  | B34_8 | B34_9 |  |  |  |  |  |
|  | 1.40 | 1.75 |  |  |  |  |  |

TABLE 9

Weight under situation principle for defense addition factors

| Game factor | Game Situation factor | | | | | | |
|---|---|---|---|---|---|---|---|
| C1 | C1_1 | C1_2 | C1_3 | C1_4 | C1_5 | C1_6 | C1_7 |
|  | 0.68 | 0.68 | 1.35 | 1.58 | 2.03 | 2.14 | 2.25 |
| C2 | C2_1 | C2_2 | C2_3 | C2_4 | C2_5 | C2_6 | C2_7 |
|  | 0.85 | 0.85 | 1.28 | 1.38 | 1.70 | 2.13 | 1.91 |
| C3 | C3_1 | C3_2 | C3_3 | C3_4 | C3_5 | C3_6 | C3_7 |
|  | 0.80 | 0.80 | 1.20 | 1.20 | 1.60 | 1.90 | 1.80 |
| C4 | C4_1 | C4_2 | C4_3 | C4_4 | C4_5 | C4_6 | C4_7 |
|  | 0.35 | 0.35 | 1.05 | 1.05 | 1.58 | 1.66 | 1.75 |
| C5 | C5_1 | C5_2 | C5_3 | C5_4 | C5_5 | C5_6 | C5_7 |
|  | 0.25 | 0.25 | 0.31 | 0.38 | 0.50 | 0.50 | 0.56 |
|  | C5_8 | C5_9 | C5_10 | C5_11 | C5_12 | C5_13 | C5_14 |
|  | 0.50 | 0.69 | 0.63 | 0.88 | 0.75 | 0.94 | 0.94 |
|  | C5_15 | C5_16 | C5_17 | C5_18 | C5_19 | C5_20 | C5_21 |
|  | 0.94 | 1.06 | 1.06 | 1.13 | 1.06 | 1.19 | 1.25 |
| C6 | C6_1 | C6_2 | C6_3 | C6_4 | C6_5 | C6_6 | C6_7 |
|  | 0.43 | 0.43 | 0.64 | 0.64 | 0.85 | 0.85 | 0.85 |
|  | C6_8 | C6_9 | C6_10 | C6_11 | C6_12 | C6_13 | C6_14 |
|  | 1.06 | 1.38 | 1.38 | 1.28 | 1.28 | 1.59 | 1.38 |
|  | C6_15 | C6_16 | C6_17 | C6_18 | C6_19 | C6_20 | C6_21 |
|  | 1.28 | 1.49 | 1.70 | 1.91 | 1.91 | 2.02 | 2.13 |
| C7 | C7_1 | C7_2 | C7_3 | C7_4 | C7_5 | C7_6 | C7_7 |
|  | 1.50 | 1.35 | 1.20 | 0.90 | 0.90 | 0.75 | 0.60 |
|  | C7_8 | C7_9 |  |  |  |  |  |
|  | 0.45 | 0.45 |  |  |  |  |  |
| C8 | C8_1 | C8_2 | C8_3 | C8_4 | C8_5 | C8_6 | C8_7 |
|  | 0.30 | 0.30 | 0.60 | 0.60 | 1.05 | 1.20 | 1.50 |
| C9 | C9_1 | C9_2 | C9_3 | C9_4 | C9_5 | C9_6 | C9_7 |
|  | 0.40 | 0.40 | 0.60 | 0.60 | 0.80 | 1.20 | 1.20 |
|  | C9_8 | C9_9 | C9_10 | C9_11 | C9_12 | C9_13 |  |
|  | 1.40 | 1.60 | 1.60 | 1.80 | 1.90 | 2.00 |  |

TABLE 9-continued

Weight under situation principle for defense addition factors

| Game factor | Game Situation factor | | | | | | |
|---|---|---|---|---|---|---|---|
| C10 | C10_1<br>0.38 | C10_2<br>0.75 | C10_3<br>1.00 | C10_4<br>1.25 | | | |
| C11 | C11_1<br>0.30 | C11_2<br>0.75 | C11_3<br>1.20 | C11_4<br>1.35 | | | |
| C12 | C12_1<br>0.38 | C12_2<br>0.38 | C12_3<br>0.44 | C12_4<br>0.50 | C12_5<br>0.63 | C12_6<br>0.75 | C12_7<br>0.63 |
| | C12_8<br>0.69 | C12_9<br>1.06 | C12_10<br>0.88 | C12_11<br>1.19 | C12_12<br>1.13 | C12_13<br>1.13 | |
| C13 | C13_1<br>0.53 | C13_2<br>1.05 | C13_3<br>1.75 | C13_4<br>1.58 | | | |
| C14 | C14_1<br>0.25 | C14_2<br>0.25 | C14_3<br>0.63 | C14_4<br>0.75 | C14_5<br>1.00 | C14_6<br>1.19 | C14_7<br>1.00 |
| C15 | C15_1<br>0.40 | C15_2<br>0.40 | C15_3<br>0.70 | C15_4<br>0.80 | C15_5<br>0.90 | C15_6<br>1.00 | C15_7<br>1.50 |
| | C15_8<br>1.40 | C15_9<br>1.70 | C15_10<br>1.60 | C15_11<br>1.80 | C15_12<br>1.80 | C15_13<br>1.80 | |
| C16 | C16_1<br>0.53 | C16_2<br>1.05 | C16_3<br>1.58 | C16_4<br>1.75 | | | |
| C17 | C17_1<br>0.90 | C17_2<br>0.90 | C17_3<br>1.35 | C17_4<br>1.35 | C17_5<br>1.80 | C17_6<br>2.14 | C17_7<br>2.03 |
| C18 | C18_1<br>0.25 | C18_2<br>0.25 | C18_3<br>0.50 | C18_4<br>0.63 | C18_5<br>1.00 | C18_6<br>1.13 | C18_7<br>1.25 |
| C19 | C19_1<br>0.25 | C19_2<br>0.38 | C19_3<br>0.63 | C19_4<br>0.75 | C19_5<br>0.88 | C19_6<br>1.13 | C19_7<br>1.13 |
| C20 | C20_1<br>0.43 | C20_2<br>0.43 | C20_3<br>0.74 | C20_4<br>0.85 | C20_5<br>1.06 | C20_6<br>1.06 | C20_7<br>1.28 |
| | C20_8<br>1.49 | C20_9<br>1.81 | C20_10<br>1.70 | C20_11<br>2.02 | C20_12<br>1.91 | C20_13<br>1.91 | |
| C21 | C21_1<br>0.45 | C21_2<br>0.45 | C21_3<br>0.79 | C21_4<br>0.90 | C21_5<br>1.13 | C21_6<br>1.13 | C21_7<br>1.46 |
| | C21_8<br>1.35 | C21_9<br>1.91 | C21_10<br>1.80 | C21_11<br>2.25 | C21_12<br>1.80 | C21_13<br>1.91 | |
| C22 | C22_1<br>0.45 | C22_2<br>0.45 | C22_3<br>0.79 | C22_4<br>0.79 | C22_5<br>0.90 | C22_6<br>0.90 | C22_7<br>1.58 |
| | C22_8<br>1.35 | C22_9<br>1.91 | C22_10<br>1.69 | C22_11<br>2.03 | C22_12<br>2.03 | C22_13<br>2.25 | |
| C23 | C23_1<br>0.50 | C23_2<br>0.63 | C23_3<br>1.00 | C23_4<br>1.25 | | | |
| C24 | C24_1<br>0.40 | C24_2<br>0.40 | C24_3<br>0.80 | C24_4<br>0.80 | C24_5<br>1.00 | C24_6<br>1.00 | C24_7<br>1.30 |
| | C24_8<br>1.20 | C24_9<br>1.60 | C24_10<br>1.50 | C24_11<br>1.80 | C24_12<br>1.80 | C24_13<br>1.80 | |
| C25 | C25_1<br>1.90 | C25_2<br>1.19 | C25_3<br>0.95 | C25_4<br>1.19 | C25_5<br>1.19 | C25_6<br>1.31 | C25_7<br>1.43 |
| | C25_8<br>1.78 | C25_9<br>1.43 | C25_10<br>1.43 | C25_11<br>1.90 | C25_12<br>2.14 | C25_13<br>1.90 | |
| C26 | C26_1<br>0.38 | C26_2<br>0.63 | C26_3<br>1.13 | C26_4<br>1.13 | | | |
| C27 | C27_1<br>0.35 | C27_2<br>0.70 | C27_3<br>0.88 | C27_4<br>1.58 | C27_5<br>1.75 | | |
| C28 | C28_1<br>0.35 | C28_2<br>0.70 | C28_3<br>1.05 | C28_4<br>1.58 | C28_5<br>1.75 | | |
| C29 | C29_1<br>1.40 | C29_2<br>1.23 | C29_3<br>0.88 | C29_4<br>0.88 | C29_5<br>1.05 | C29_6<br>1.05 | C29_7<br>0.88 |
| | C29_8<br>1.40 | C29_9<br>1.75 | | | | | |
| C30 | C30_1<br>1.40 | C30_2<br>1.30 | C30_3<br>1.10 | C30_4<br>1.20 | C30_5<br>1.20 | C30_6<br>1.40 | C30_7<br>1.60 |
| | C30_8<br>1.80 | C30_9<br>2.00 | | | | | |

TABLE 10

Weight under situation principle for defense subtraction factors

| Game factor | Game Situation factor | | | | | | |
|---|---|---|---|---|---|---|---|
| D1 | D1_1<br>0.25 | D1_2<br>0.25 | D1_3<br>0.50 | D1_4<br>0.50 | D1_5<br>0.50 | D1_6<br>0.50 | D1_7<br>0.75 |
|  | D1_8<br>0.56 | D1_9<br>0.63 | D1_10<br>0.88 | D1_11<br>0.88 | D1_12<br>0.75 | D1_13<br>0.75 | D1_14<br>0.75 |
|  | D1_15<br>0.81 | D1_16<br>1.00 | D1_17<br>1.00 | D1_18<br>1.13 | D1_19<br>1.13 | D1_20<br>1.13 | D1_21<br>1.19 |
| D2 | D2_1<br>0.45 | D2_2<br>0.45 | D2_3<br>0.68 | D2_4<br>0.68 | D2_5<br>0.90 | D2_6<br>0.90 | D2_7<br>1.13 |
|  | D2_8<br>1.13 | D2_9<br>1.58 | D2_10<br>1.46 | D2_11<br>1.80 | D2_12<br>1.80 | D2_13<br>1.80 | D2_14<br>1.58 |
|  | D2_15<br>1.58 | D2_16<br>1.80 | D2_17<br>1.91 | D2_18<br>2.14 | D2_19<br>2.03 | D2_20<br>2.14 | D2_21<br>2.14 |
| D3 | D3_1<br>0.38 | D3_2<br>0.38 | D3_3<br>0.38 | D3_4<br>0.56 | D3_5<br>0.94 | D3_6<br>0.94 | D3_7<br>0.94 |
|  | D3_8<br>1.13 | D3_9<br>1.50 | D3_10<br>1.31 | D3_11<br>1.88 | D3_12<br>1.69 | D3_13<br>1.78 |  |
| D4 | D4_1<br>0.45 | D4_2<br>0.45 | D4_3<br>0.67 | D4_4<br>0.67 | D4_5<br>0.89 | D4_6<br>0.89 | D4_7<br>1.00 |
|  | D4_8<br>1.11 | D4_9<br>1.56 | D4_10<br>1.56 | D4_11<br>1.78 | D4_12<br>1.78 | D4_13<br>1.78 | D4_14<br>1.89 |
|  | D4_15<br>1.89 | D4_16<br>2.00 | D4_17<br>2.00 | D4_18<br>2.11 | D4_19<br>2.00 | D4_20<br>2.11 | D4_21<br>2.23 |
| D5 | D5_1<br>0.45 | D5_2<br>0.45 | D5_3<br>0.56 | D5_4<br>0.68 | D5_5<br>0.90 | D5_6<br>0.79 | D5_7<br>1.13 |
|  | D5_8<br>1.13 | D5_9<br>1.58 | D5_10<br>1.35 | D5_11<br>1.69 | D5_12<br>1.80 | D5_13<br>1.80 | D5_14<br>1.80 |
|  | D5_15<br>1.91 | D5_16<br>1.91 | D5_17<br>2.03 | D5_18<br>2.14 | D5_19<br>2.14 | D5_20<br>2.14 | D5_21<br>2.14 |
| D6 | D6_1<br>0.38 | D6_2<br>0.38 | D6_3<br>0.56 | D6_4<br>0.56 | D6_5<br>0.94 | D6_6<br>0.94 | D6_7<br>1.13 |
|  | D6_8<br>1.31 | D6_9<br>1.50 | D6_10<br>1.59 | D6_11<br>1.78 | D6_12<br>1.69 | D6_13<br>1.69 |  |
| D7 | D7_1<br>0.44 | D7_2<br>0.53 | D7_3<br>1.23 | D7_4<br>1.05 | D7_5<br>1.66 | D7_6<br>1.58 | D7_7<br>1.75 |
| D8 | D8_1<br>0.30 | D8_2<br>0.30 | D8_3<br>0.60 | D8_4<br>0.50 | D8_5<br>0.95 | D8_6<br>0.80 | D8_7<br>1.00 |
| D9 | D9_1<br>0.35 | D9_2<br>0.20 | D9_3<br>0.55 | D9_4<br>0.60 | D9_5<br>0.95 | D9_6<br>0.80 | D9_7<br>0.90 |
| D10 | D10_1<br>0.60 | D10_2<br>0.40 | D10_3<br>1.40 | D10_4<br>1.20 | D10_5<br>1.90 | D10_6<br>1.60 | D10_7<br>2.00 |
| D11 | D11_1<br>0.38 | D11_2<br>0.25 | D11_3<br>0.56 | D11_4<br>0.50 | D11_5<br>1.19 | D11_6<br>1.13 | D11_7<br>1.19 |
| D12 | D12_1<br>0.60 | D12_2<br>0.40 | D12_3<br>1.20 | D12_4<br>1.20 | D12_5<br>2.00 | D12_6<br>1.80 | D12_7<br>2.00 |
| D13 | D13_1<br>0.41 | D13_2<br>0.41 | D13_3<br>0.83 | D13_4<br>0.83 | D13_5<br>1.31 | D13_6<br>1.10 | D13_7<br>1.38 |
| D14 | D14_1<br>0.75 | D14_2<br>0.56 | D14_3<br>1.13 | D14_4<br>1.13 | D14_5<br>1.78 | D14_6<br>1.50 | D14_7<br>1.88 |
| D15 | D15_1<br>0.60 | D15_2<br>0.30 | D15_3<br>0.75 | D15_4<br>0.75 | D15_5<br>1.35 | D15_6<br>1.20 | D15_7<br>1.43 |
| D16 | D16_1<br>0.35 | D16_2<br>0.53 | D16_3<br>0.88 | D16_4<br>0.88 | D16_5<br>1.40 | D16_6<br>1.40 | D16_7<br>1.75 |
| D17 | D17_1<br>0.60 | D17_2<br>0.60 | D17_3<br>1.40 | D17_4<br>1.20 | D17_5<br>1.90 | D17_6<br>1.60 | D17_7<br>1.80 |
| D18 | D18_1<br>0.60 | D18_2<br>0.40 | D18_3<br>0.80 | D18_4<br>0.90 | D18_5<br>1.20 | D18_6<br>1.00 | D18_7<br>1.40 |
|  | D18_8<br>1.50 | D18_9<br>1.70 | D18_10<br>1.60 | D18_11<br>1.90 | D18_12<br>1.80 | D18_13<br>2.00 |  |
| D19 | D19_1<br>0.60 | D19_2<br>0.45 | D19_3<br>0.90 | D19_4<br>0.90 | D19_5<br>1.35 | D19_6<br>1.20 | D19_7<br>1.50 |
| D20 | D20_1<br>0.30 | D20_2<br>0.45 | D20_3<br>0.75 | D20_4<br>1.35 | D20_5<br>1.50 |  |  |
| D21 | D21_1<br>0.40 | D21_2<br>0.99 | D21_3<br>1.19 | D21_4<br>1.58 | D21_5<br>1.98 |  |  |
| D22 | D22_1<br>0.38 | D22_2<br>0.94 | D22_3<br>1.31 | D22_4<br>1.69 | D22_5<br>1.88 |  |  |
| D23 | D23_1<br>1.58 | D23_2<br>1.80 | D23_3<br>1.58 | D23_4<br>1.58 | D23_5<br>1.35 | D23_6<br>1.35 | D23_7<br>1.58 |
|  | D23_8<br>2.03 | D23_9<br>2.03 |  |  |  |  |  |

TABLE 10-continued

Weight under situation principle for defense subtraction factors

| Game factor | Game Situation factor | | | | | | |
|---|---|---|---|---|---|---|---|
| D24 | D24_1 1.80 | D24_2 1.58 | D24_3 1.58 | D24_4 1.58 | D24_5 1.35 | D24_6 1.58 | D24_7 1.80 |
| | D24_8 2.03 | D24_9 2.25 | | | | | |

Each of the game situation factor weight is expressed into (each game factor median×each game situation factor median)÷400. When evaluating a player based on the multiplication of each game factor median and each game situation factor median, it is expected that the results become too high, feeling for the number is too low, and a feeling of refusal will stir up. Thus, as it is decided that the number is divided by a given number as much as the degree that can reduce a feeling of refusal while increasing the degree of sensitivity for the number, the median multiplication is divided by 400. This is because considering that two points or three points are increased when one shooting is successful, the value 1000 being the multiplication of the maximum median of the game factor 100 and the maximum median of the game situation factors 10 is divided by 400 to obtain an addition point or a subtraction point of about 2.5.

In step S14, the contribution degree calculation unit within the manager server calculates the degree of contribution by each player using addition factors (game situation factors× corresponding weight)−subtraction factors (game situation factors×corresponding weight) based on game situation factors, weight, etc.

Unlike an existing evaluation formula shown in Table 11 below, a newly developed athlete evaluation formula of the present invention is game contents to which game situation factors such as Table 12 are applied. Thus, after a game is finished, skills shown by an athlete can be recorded. For example, a case of a score record being one of game factors generated by a player Seo Hoon will be taken as an example.

TABLE 11

Point evaluation in existing record table

| | 2F | 3F | FT | PTS |
|---|---|---|---|---|
| Seo Hoon | 9 | 1 | 4 | 14 |

TABLE 12

Point evaluation of situation factor to which the present invention is applied

| Situation | Point |
|---|---|
| Point in disadvantageous point (over −7) situation | 8 |
| Point in advantageous (over +7) situation | |
| Inferiority point seesaw approach (−6~−4) entry point in disadvantageous point (over −7) situation | 1 |
| Predominant situation (over +7) point in advantageous seesaw approach point (+6~+4) situation | |
| Inferiority seesaw approach (−6~−4) point in disadvantageous seesaw approach point (−6~−4) situation | 1 |
| Predominant seesaw approach (+6~+4) point in advantageous seesaw approach point (+6~+4) situation | |
| Inferiority seesaw situation (−1~−3) point in disadvantageous seesaw approach point (−6~−4) situation | |

TABLE 12-continued

Point evaluation of situation factor to which the present invention is applied

| Situation | Point |
|---|---|
| Predominant seesaw approach (+6~+4) point in advantageous seesaw approach point (+1~+3) situation | |
| Inferiority seesaw situation (−1~−3) point in disadvantageous seesaw situation (−1~−3) | |
| Predominant seesaw situation (+1~+3) point in advantageous seesaw situation (+1~+3) | 1 |
| Tie situation point in disadvantageous seesaw situation (−1~−3) | |
| Predominant seesaw situation (+1~+3) point in tie situation | 1 |
| Predominant seesaw situation (+1~+3) point in disadvantageous seesaw situation (−1~−3) | |
| Tie point simultaneously with attack time end or quarter end in disadvantageous seesaw situation (−1~−3) | |
| Reverse point simultaneously with attack time end or quarter end in disadvantageous seesaw situation (−1~−3) | |
| Reverse point simultaneously with attack time end or quarter end in tie situation | |
| Tie point in last attack with game end time being left several seconds in disadvantageous seesaw situation (−1~−3) | |
| Reverse point in last attack with game end time being left several seconds in tie situation | |
| Tie point simultaneously with game end buzzer in disadvantageous seesaw situation (−1~−3) | |
| Reverse point simultaneously with game end buzzer in disadvantageous seesaw situation (−1~−3) | |
| Reverse point simultaneously with game end buzzer in tie situation | |

The reason why the number of the frequency and the number of the existing frequency in the newly developed situation factors are different, i.e., 12 and 14, is that a situation when one obtained free throw is successful is considering not that the number of success of a free throw is input in a situation factor.

When comparing Table 11 and Table 12, the quantitative evaluation used in the existing evaluation formula only shows that Seo Hoon is successful in 14 shooting such as one three-point shoot, nine two-point shoots and four free throws, and scores "2F×2+3F×3+FT×1=9×2+1×3+4×1=(25)". Although Seo scored a very high point as absolute evaluation, the number of successful shoots by Seo Hoon does not represent the situation in which Seo Hoon is located and the flow of a game. However, the input under the game situation factors is qualitative evaluation, which well shows a game situation of a corresponding athlete (Seo Hoon). Seo Hoon was successful in eight shooting in the disadvantageous point (over −7) situation, and was also successful each shooting in the disadvantageous point seesaw approach (−6~−4) entry situation in an advantageous point situation (over −7), a disadvantageous point seesaw approach (−6~−4) in a disadvantageous point seesaw approach (−6~−4) situation, a disadvantageous point seesaw situation (+1~+3) in a disadvantageous point seesaw situation (+1~+3), and a disadvantageous point seesaw situation (+1~+3) in a tie situation. The input of shooting number in which Seo Hoon was successful under a situation factors can be interpreted as follows. The situation in which Seo Hoon is placed in a game showed that Seo Hoon was usually a disadvantageous point state of over −7, and had about one advantageous point situation. However, considering that Cheongju S K to which Seo Hoon belongs was defeated by a score of 97 to 91 in an out match with Wonju T G, and the advantageous point situation of over −7 points is many, it can be estimated that Cheongju S K led a disadvantageous point situation in the first stage of 0 to 0, Wonju T G reversed as the game proceeds, and continues to lead the game. In fact, in this game, as estimated above, Cheongju S K was in the advantageous point situation during the game and until the game in a situation that he maintained the disadvantageous point situation of +3~+4 at the first stage of the game and was reversed. As such, the newly developed athlete evaluation formula through the game factors and the game situation factors according to the present invention is configured to estimate the flow of a game through record of one athlete, and also can estimate whether which player gave what contribution, error in which situation through the result of play record input, unlike the quantitative record mode. Furthermore, based on this, although each player scored the same point, the results are different even in the same point since weights are already given on a situation basis. Thus, a player who scored small points can be evaluated.

Further, Table 13 shows the results in which the skills of a player are classified according to attack addition, attack subtraction, defense addition and defense subtraction The results of the game contents that were shown by players in the game through Table 13 show that players who give lots of contribution to a team upon attack also generate lots of attack error, and players who give lots of contribution upon defense generates lots of defense error to a team. In the concrete, Jae Cob had a high team contribution degree by scoring the first place point in attack addition, and generated lots of errors in proportion to attack by scoring a very high points in attack subtraction. On the contrary, the team contribution degree in defense addition is low compared to contribution to a team in attack addition. In defense subtraction, error is also low in defense since the width of activation in defense contribution is relatively low. Thus, Jae Cob was evaluated as a player who had the most excellent activity in a target game. Roderic Ha Bal scored the second place point, which is high in the team contribution degree in attack addition, but relatively generated lots of error in attack subtraction, thus generating lots of subtraction point Furthermore, what the degree of contribution to a team in defense addition is low but a relatively higher score in defense subtraction was evaluate as a player who does not assign contribution to a team in defense and has a significant disadvantage in defense. Resultantly, Roderic Ha Bal showed a blind point of defense in a target research game, and contributed lots of error compared to the number of attempts in attack. Furthermore, Roderic Ha Bal showed that the number of addition or subtraction in defense is small. This showed that Roderic Ha Bal is lack in positive participation in defense and did attack-oriented play. Hwang In scored a high point from the viewpoint that contributed a lot a team in attack addition, but generated scores that assign lots of error in attack sub traction

TABLE 13

Results I using athlete evaluation formula of the present invention

| Team | Player | Attack addition | Attack subtraction | Defense addition | Defense subtraction |
|---|---|---|---|---|---|
| Wonju TG | Jae Cob | ①491.72 | ●111.92 | 362.38 | 85.83 |
| Wonju TG | Regi Tar Zend | 317.83 | 93.80 | ②452.40 | ●125.21 |
| Wonju TG | Shin Sung | 302.25 | 49.14 | ③393.25 | 104.76 |
| Wonju TG | Hea Jae | 315.49 | 72.72 | ④395.80 | 106.34 |
| Cheongju SK | Jae Jones | 233.46 | 46.50 | ①470.38 | ●130.23 |
| Cheongju SK | Seo Hoon | ③360.05 | 83.02 | 306.58 | ●190.64 |
| Cheongju SK | Roderic Ha Bal | ②388.04 | ●111.91 | 148.10 | 106.42 |
| Wonju TG | Yang Min | 158.98 | 37.72 | 198.30 | 81.41 |
| Cheongju SK | Cho Hyun | 225.17 | ●105.02 | 176.20 | 79.30 |
| Cheongju SK | Hwang In | ④336.93 | ●128.53 | 146.43 | ●145.15 |
| Cheongju SK | Seock Il | 50.95 | 13.50 | 0.00 | 0.00 |
| Wonju TG | Kim Gi | 38.75 | 19.54 | 20.70 | 38.08 |

A player who scored the greatest attack addition points is Jae Cob, who scored 491.72. Next, Roderic Ha Bal, Seo Hoon and Hwang In scored 388.04, 360.05 and 336.93, and showed a high attack ability. A player who scored the greatest defense addition point is Jae Jones, who scored 470.38. Next, Regi Tar Zend, Hea Jae and Shin Sung scored 452.40, 395.80 and 393.25, respectively. On the contrary, a player who generated the largest errors in the attack subtraction point is Hwang In 128.53 points, which shows the basic ability of attack. Next, Jae Cob, Roderic Ha Bal and Cho Hyun input 111.92, 111.91 and 105.02, respectively. In defense subtraction, Seo Hoon is a demerit mark of 190.64, which shows the results that do not help a team in the defense portion. Next, Hwang In, Jae Jones and Regi Tar Zend showed the defense subtraction of 145.15, 130.23 and 125.21, respectively.

and defense subtraction. Thus he was evaluated to be low in the ranking. Hwang In played an active part compared to other guards by participating in attack rather than defense, but generated lots of error in attack and lots of error in defense. As such, it is possible to evaluate and interpret the ability of players in various manners through attack addition, attack subtraction, defense addition and defense subtraction, which are obtained by the players.

Players can be compared based on scores and the type of balance, which are generated by the players in attack addition, attack subtraction, defense addition and defense subtraction. This analysis corresponds to a comparison analysis of the type in which players act in a game. Thereafter, Table 14 shows that a game type shown by a player is arrange in a two-dimensional space using a multi-dimensional scale method.

TABLE 14

Type of game using multi-dimensional scale method

| Player | X coordinate | Y coordinate | Player | X coordinate | Y coordinate |
|---|---|---|---|---|---|
| Jae Cob | 1.2945 | −0.6694 | Roderic Ha Bal | 0.5676 | −0.9624 |
| Regi Tar Zend | 0.9448 | 0.4905 | Yang Min | −0.965 | 0.3091 |
| Shin Sung | 0.162 | 0.7712 | Cho Hyun | −0.1945 | −0.7385 |
| Hea Jae | 0.4551 | 0.4792 | Hwang In | 0.8955 | −1.0635 |
| Jae Jones | 0.269 | 1.1991 | Seock Il | −2.5534 | −0.2245 |
| Seo Hoon | 1.3216 | 0.4824 | Kim Gi | −2.1975 | −0.0731 |

The above coordinates standardize addition or subtraction points of factors, and then use Euclidean Distance Scale. The addition or subtraction points being the great factors employed a ration scale as a continuous type parameter. For this, it used two-dimensional spatial coordinates. In characteristics in attack and defense, a player who contributed a lot in a team upon attack relatively made lots of error in a team attack. A player who contributed a lot in a team upon defense also made lots of error in defense.

As shown in Appendix A, among players who attended a target research game, Jae Cob, Cho Hyun, Roderic Ha Bal and Roderic Ha Bal are grouped into one group A, and Shin Sung, Seo Hoon, Hea Jae and Regi Tar Zend are grouped into another group B. They showed a similar game type. Kim Gi, Seock Il and Yang Min are not included in the two groups.

The above figure will be described with reference to "Results using the athlete evaluation formula of Table 13 according to the present invention". The group A is a player who was evaluated to have a higher attack addition and subtraction points than a defense addition and subtraction points. The group B is a player who was evaluated to have a higher defense addition and subtraction point than an attack addition and subtraction point. Therefore, the players of the group A usually showed the attack-oriented type, and the players of the group B usually showed the defense-oriented type. Furthermore, Kim Gi and Seock Il obtained a low point. It is necessary to monitor may games of them, but Kim Gi and Seock Il participated in defense along with Yang Min. Nevertheless, they did not obtain a high point in any part in the addition and subtraction factors.

As a result, although there are players who contributed to a team in view of attack and players who contributed to a team in view of defense, existing play record factors are not evaluated for defense, and factors to record error portions are lack from the viewpoint of attack. Thus, athlete evaluation covering both attack and defense has not been performed.

TABLE 15

Results using athlete evaluation formula of the present invention

| Team | Player | Rank | Addition factor | Subtraction factor | Acquired point |
|---|---|---|---|---|---|
| Wonju TG | Jae Cob | 1 | ①854.10 | 197.75 | 656.35 |
| Wonju TG | Regi Tar Zend | 2 | ②770.23 | ●219.01 | 551.22 |
| Wonju TG | Shin Sung | 3 | 695.50 | 153.90 | 541.60 |
| Wonju TG | Hea Jae | 4 | ③711.29 | 179.06 | 532.24 |
| Cheongju SK | Jae Jones | 5 | ④703.83 | 176.73 | 527.11 |
| Cheongju SK | Seo Hoon | 6 | 666.63 | ●273.66 | 392.97 |
| Cheongju SK | Roderic Ha Bal | 7 | 536.14 | ●218.33 | 317.81 |
| Wonju TG | Yang Min | 8 | 357.28 | 119.13 | 238.16 |
| Cheongju SK | Cho Hyun | 9 | 401.37 | 184.32 | 217.05 |

TABLE 15-continued

Results using athlete evaluation formula of the present invention

| Team | Player | Rank | Addition factor | Subtraction factor | Acquired point |
|---|---|---|---|---|---|
| Cheongju SK | Hwang In | 10 | 483.35 | ●273.68 | 209.67 |
| Cheongju SK | Seock Il | 11 | 50.95 | 13.50 | 37.45 |
| Wonju TG | Kim Gi | 12 | 59.45 | 57.62 | 1.83 |

Table 15 shows that attack addition, attack subtraction, defense addition and defense subtraction of Table 14 are divided by addition factors and subtraction factors, and acquired points are calculated by subtracting the subtraction factors from the addition factors. The rank is decided on the basis of acquired points. From the above result, a player who has a high addition factor point showed a relatively low subtraction factor point, and a player who has a high subtraction factor point showed a relatively addition factor point.

Appendix B below shows that the addition factor points and the subtraction factor points presented in Table 15 are dotted on a two-dimensional space. Appendix B shows all participation players at the same time as the addition factor points and the subtraction factor points, helping to evaluate the players visually. As can be seen from Appendix B, a linear effect exists between the addition factor points and the subtraction factor points.

As can be seen from Table 15, the best player of Wonju T G showed better skills than players of Cheongju S K, and wined a victory. Further, considering that Wonju T G led Cheongju S K all the way of a game, it can be seen that the game factors and the game situation factors of the present invention and an application process thereto are proper.

Further, in step S15, the value of athletes is estimated according to the game contribution degree.

Therefore, as the 129 game factors and the 1277 game situation factors are subdivided through the value estimation method, and actual results of players are input, lots of situation factors are presented and are objectified on a situation basis using weights, unlike the existing play record method that tries to describe lots of things with a small number of game factors. Thus, as meaningful underground factors can be found, a more efficient value estimation mode than the existing athlete contribution evaluation method is possible. In generating weights so as to evaluate the player contribution degree, the sensitiveness for the number is considered using the median without using an average as the representative value. Further, in order to represent the last analysis results similar to numerical values of goal scores, the weight is divided by 400. It is thus possible to increase the degree of the sensitivity for the number of players, and to reduce a feeling of refusal. It is thus possible to perform the qualitative evaluation of objectified players through the above method.

Figure 6:
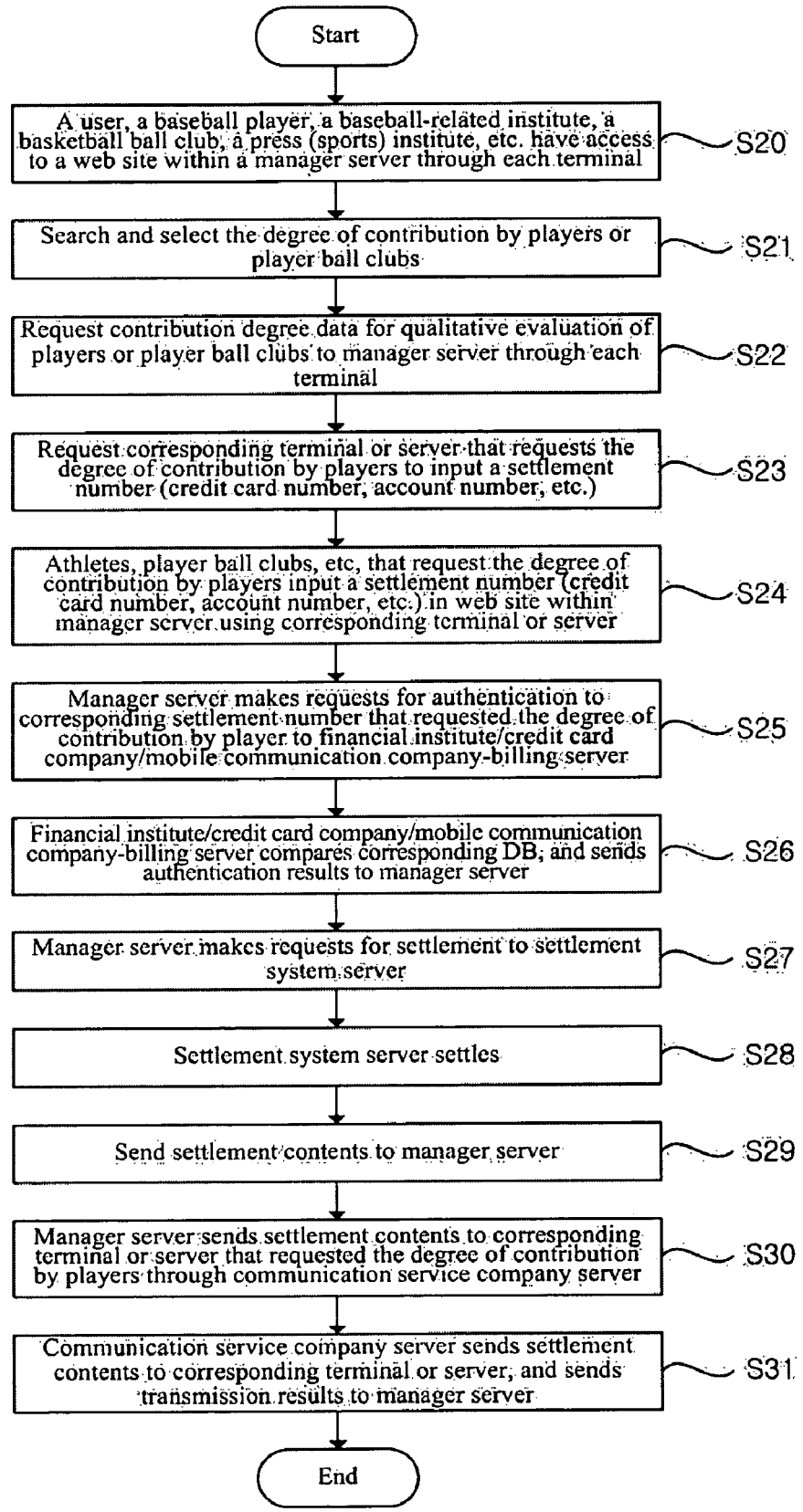
FIG. 6 is a flowchart illustrating a process of providing the degree of contribution data and sending settlement authentication and results in the method of estimating the value of athletes using the game achievement evaluation model according to another embodiment of the present invention.

FIG. 6 is a flowchart illustrating a process of providing the degree of contribution data and sending settlement authentication and results in the method of estimating the value of athletes using the game achievement evaluation model according to another embodiment of the present invention.

As shown in FIG. 6, in step S20, a user, a baseball player, a baseball-related institute, a basketball ball club, a press (sports) institute, etc. have access to a web site within a manager server through each terminal. In step S21, the degree of contribution by players or the player ball clubs is searched and selected. If contribution degree data for qualitative evaluation of the players or the player ball clubs are requested to the manager server through each terminal (step S22), the manager server requests a corresponding terminal or server that requests the degree of contribution by the players to input a settlement number (credit card number, account number, etc.) (step S23). In step S24, the athletes, the player ball clubs, etc, that request the degree of contribution by the players input a settlement number (credit card number, account number, etc.) in the web site within the manager server using a corresponding terminal or server. In this case, the settlement number can include a account number of a financial institute or a credit card number of a credit card company.

Then, in step S25, a corresponding settlement number that requested the degree of contribution by the player in the manager server is requested for authentication to a financial institute/credit card company/mobile communication company billing server. In step S26, the financial institute/credit card company/mobile communication company-billing server compares a data of a corresponding server, and sends an authentication result to the manager server. If the manager server requests settlement to the settlement system server (step S27), the settlement system server settles through the credit card number, the account number, the mobile phone, etc. (step S28). In step S29, the settlement system server sends the settlement contents to the manager server. In step S30, the manager server sends the settlement contents to a corresponding terminal or server that requested the degree of contribution by the players through the communication service company server. In step S31, the communication service company server sends the settlement contents to a corresponding terminal or server, and sends the transmission results to the manager server.

Therefore, if the user, the baseball player, the baseball-related institute, the basketball ball club and the press (sports) institutes request the degree of contribution by players or player ball clubs, they have their settlement numbers authenticated in the financial institute/credit card company/mobile communication company billing server before payment. The payment system server pays, the communication service company server sends settlement information, transmission information, etc. to a corresponding terminal and server via e-mail, SMS of a mobile phone, a messenger or the like. Thus reliability with customers can be constructed.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. That is, those skilled in the art will understand that the present invention can be applied to players of soccer, baseball, volleyball, handball, etc.

INDUSTRIAL APPLICABILITY

According to the present invention, unlike quantity-based record evaluation by the existing athlete contribution evaluation method, objectified quality evaluation can be performed in such a manner that with game situations being classified into attack addition (contribution), attack subtraction (error), defense addition (contribution) and defense subtraction (error), 129 game factors are named based on the classified factors, the assignment principle is set, the game factors are set to detailed 1277 game situation factors, and the game factors and the game situation factors becomes numerical values.

Furthermore, the existing record input method is dependent upon quantitative record only, and thus does not include situation information on how player plays a game under what situation. However, in a newly developed athlete evaluation formula, what achievements obtained by one athlete are generated in what situation can be exactly recorded. At the same time, the flow of a game can be traced. Moreover, by subdividing the 129 game factors and 1277 game situation factors and inputting actual results of a player, lots of situation factors can be presented unlike the existing play record method that tries to described lots of things with a small number of game factors. Thus, as meaningful underground factors can be found, a more efficient value estimation mode than the existing athlete contribution evaluation method is possible. In generating weights so as to evaluate the player contribution degree, the sensitiveness for the number is considered using the median without using an average as the representative value. Further, in order to represent the last analysis results similar to numerical values of goal scores, the weight is divided by 400. It is thus possible to increase the degree of the sensitivity for the number of players, and to reduce a feeling of refusal.

In addition, if a user, a baseball player, a baseball-related institute, a basketball ball club and a press (sports) institutes request the degree of contribution by players or player ball clubs, they have their settlement numbers authenticated in the financial institute/credit card company/mobile communication company billing server before payment. The payment system server pays, the communication service company server sends settlement information, transmission information, etc. to a corresponding terminal and server via e-mail, SMS of a mobile phone, a messenger or the like. Thus reliability with customers can be constructed.

APPENDIX A
Classification of players according to the type of game
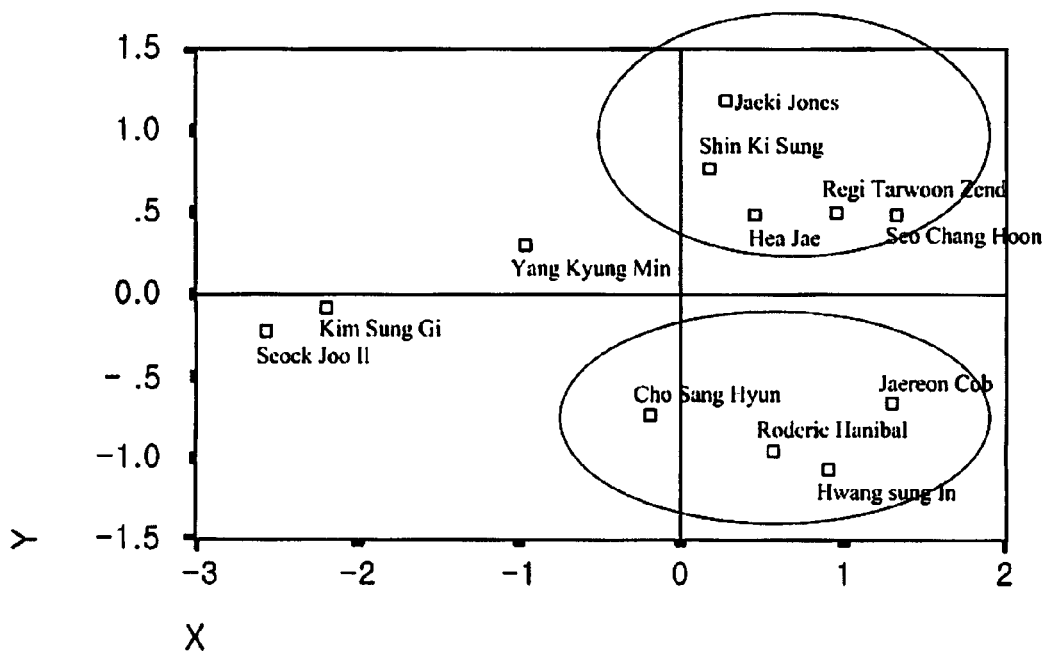

APPENDIX B
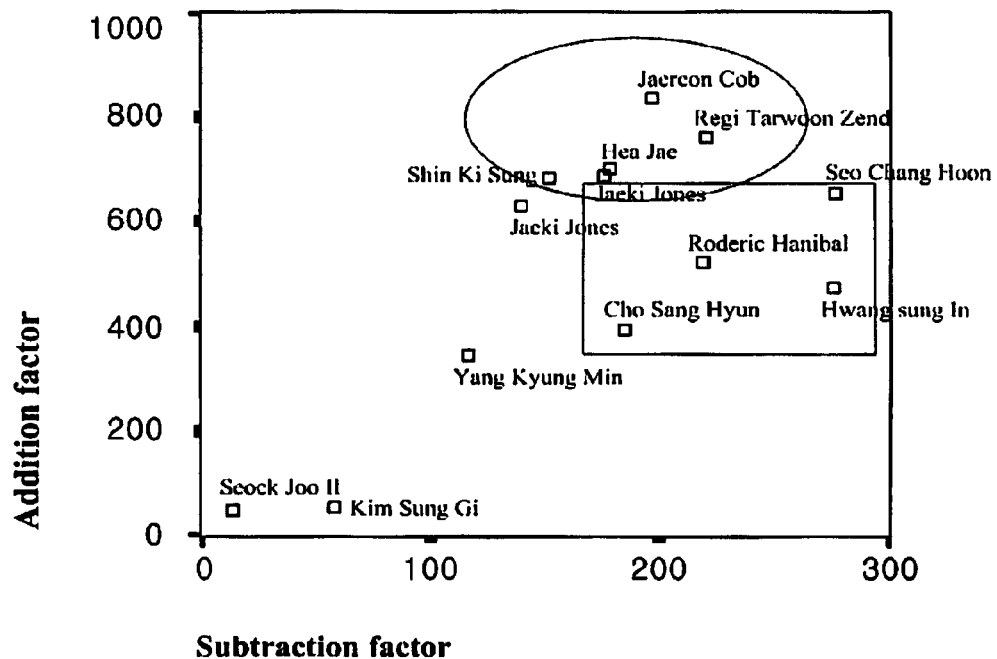

What is claimed is:

1. A system for estimating the value of athletes and athletic ball clubs using a game achievement evaluation model, the system comprising:

a manager server configured to receive a member joining request when a user has access to a web site that includes the degree of contribution for qualitative evaluation of the athletes or the athletic ball clubs for the purpose of annual salary calculation of professional athletes, the scout of amateurs and a mercenary scout, an athlete draft, an athlete trade, configured to register members and assign Identifiers (IDs) to the members, configured to store and manage the members who joined the web site in a manager server database (DB), and configured to set game factors, with the degree of contribution by the athletes being classified into attack addition indicating a contribution, attack subtraction indicating an error, defense addition indicating a contribution and defense subtraction indicating an error according to game situations, based on the classified factors, set the game factors to detailed game situation factors, assign numerical values to the game factors and the game situation factors with a different weight, and send quantitative results of the degree of contribution to a corresponding server or terminal when the user requests the results through the corresponding server or terminal;

a user terminal configured to access to a web site within the manager server to make requests for member joining in order to know the degree of contribution for qualitative evaluation of the athletes or the athlete ball club for the purpose of annual salary calculation of the professional athletes, the scout of amateurs and the mercenary scout, the athlete draft, or the athlete trade, configured to assign a member with an ID from the manager server after becoming a member, and configured to request the degree of quantitative contribution of the athletes to the manager server and receive the degree of contribution data of the athletes;

an athlete terminal configured to access to a web site within the manager server to make requests for member joining in order to know the degree of contribution for qualitative evaluation of the athletes or the athlete ball club for the purpose of annual salary calculation of the professional athletes, the scout of amateurs and mercenary scout, the athlete draft, or the athlete trade, configured to assign a member with an ID from the manager server after becoming a member, and configured to request the degree of quantitative contribution of the athletes to the manager server and receive the degree of contribution data of the athletes;

an athlete related institute server configured to access to a web site within the manager server to make requests for member joining in order to know the degree of contribution for qualitative evaluation of the athletes or the athlete ball club for the purpose of annual salary calculation of the professional athletes, the scout of amateurs and mercenary scout, the athlete draft, or the athlete trade, configured to assign a member with an ID from the manager server after becoming a member, and configured to request the degree of quantitative contribution of the athletes to the manager server and receive the degree of contribution data of the athletes;

an athlete club server configured to access a web site within the manager server to make requests for member joining in order to know the degree of contribution for qualitative evaluation of the athletes or the athlete ball club for the purpose of annual salary calculation of the professional athletes, the scout of amateurs and mercenary scout, the athlete draft, or the athlete trade, configured to assign with an ID from the manager server after becoming a member, and configured to request the degree of quantitative contribution of the athletes to the manager server and receive the degree of contribution data of the athletes;

a press institute server configured to access to a web site within the manager server to make requests for member joining in order to know the degree of contribution for qualitative evaluation of the athletes or the athlete ball club for the purpose of annual salary calculation of the professional athletes, the scout of amateurs and mercenary scout, the athlete draft, or the athlete trade, configured to assign with an ID from the manager server after becoming a member, and configured to request the degree of quantitative contribution of the athletes to the manager server and receive the degree of contribution data of the athletes;

a financial institute/credit card company/mobile communication company billing server configured to receive an authentication request for one or a plurality of financial information, card information and mobile communication information, which are settlement numbers of the user, from the manager server, and configured to compare one or a plurality of financial information, card information and mobile communication information with information stored in a corresponding database among the financial institute server, the credit card company server and the mobile communication company billing server, and conveying the authentication result to the manager server;

a payment system server configured to receive one or the plurality of the settlement numbers among the user, who are authenticated by the financial institute/credit card company/mobile communication company billing server, from the manager server, and confirm the settlement number and then send the settlement results to the manager server; and a communication service company server configured to receive the degree of contribution information of the players and the settlement information from the manager server after being settled by the settlement system server, and configured to send the degree of contribution information by the players and the settlement information, which are received from the manager server, to a terminal, a user or an athlete mobile phone of the user via e-mail, short message service of a mobile phone, or a messenger.

2. The system as claimed in claim 1, wherein the manager server comprises:

a member subscription unit configured to receive a member joining request through the server or terminal;

a member permission unit configured to authorize the member joining request, and then assign an ID to the member;

a member information database configured to store and manage members;

an athlete contribution degree database configured to store and manage the degree of contribution by athletes;

a game factor unit having an attack addition game factor unit indicating attack contribution portions including team morale increase contribution addition generated by a game situation of an athlete, an attack subtraction game factor unit indicating attack error portions including point acquisition cancellation error subtraction, a defense addition game factor unit indicating defense contribution portions including full possible losing point dissipation contribution addition, and a defense subtraction game factor unit indicating defense error portions including full self-blame possible losing point error subtraction;

a game situation factor unit including an attack addition game situation factor unit indicating detailed items of attack addition game factors indicating attack contribution portions generated by a game situation of an athlete, an attack subtraction game situation factor unit indicating detailed items of attack subtraction game factors indicating attack error portions, a defense addition game situation factor unit indicating detailed items of defense addition game factors indicating defense contribution portions, and a defense subtraction game situation factor unit indicating detailed items of defense subtraction game factors indicating defense error portions;

a median setting unit configured to set representative values for respective detailed items that constitute the game factor unit and the game situation factor unit;

a weight setting unit configured to multiply the game factor median and the game situation factor median set in the median setting unit; and a contribution degree calculation unit configured to calculate the degree of contribution by athletes based on a difference between addition factors including contribution factors for attack and defense addition to which weights are applied, and subtraction factors including error factors for attack and defense subtraction to which weights are applied.

3. A method of estimating the value of athletes using a game achievement evaluation model, wherein a value calculation process comprises the steps of:

(a) setting, by a game factor unit within a manager server, attack addition game factors of a number of items, attack subtraction game factors of a number of items, defense addition game factors of a number of items and defense subtraction game factors of a number of items;

(b) setting, by a game situation factor unit within the manager server, game situation factors of items for each of the items of the attack addition game factors, the items of the attack subtraction game factors, the items of the defense addition game factors and the items of the defense subtraction game factors;

(c) setting, by a median setting unit within the manager server, the median for each of the game factors and the game situation factors under the game situation principle for the attack addition game factors, the attack subtraction game factors, the defense addition game factors and the defense subtraction game factors;

(d) setting, by a weight setting unit within the manager server, weight for each of the game situation factors under the game situation principle for the attack addition game factors, the attack subtraction game factors, the defense addition game factors and the defense subtraction game factors to the median of each game factor multiplied by the median of each game situation factor divided by 400;

(e) calculating, by a contribution degree calculation unit within the manager server, the degree of game contribution by the athletes based on a difference between addition factors including a game situation factor multiplied by a corresponding weight and a subtraction factor including a game situation factor multiplied by a corresponding weight; and (f) calculating the value of the athletes based on the degree of game contribution.

4. The method as claimed in claim 3, wherein in step (a), detailed items of the attack addition game factor unit include full shooting capture ability contribution addition, shooting chance capture ability contribution addition, possible losing point removal contribution addition, full team morale-inspired contribution addition, team morale-inspired contribution addition, high degree-skill contribution addition, full disadvantage overcome ability contribution addition, disadvantage overcome ability contribution addition, disadvantage overcome fail contribution addition, full point-possible securing contribution addition, score-possible providing contribution addition, score record cancellation-considered contribution addition, full score chance ability loss contribution addition, point chance ability loss contribution addition, alternate score additional contribution addition, lucky score addition contribution addition, indirect chance fostering contribution addition, direct chance assistance contribution addition, indirect chance sacrifice contribution addition, direct chance sacrifice contribution addition, athlete defense shrinkage contribution addition, opponent team defense shrinkage contribution addition, attack time re-application contribution addition, full point cooperation contribution addition, point cooperation contribution addition, teamwork completion cooperation contribution addition, teamwork cooperation contribution addition, positive participation contribution addition, shooting chance cooperation contribution addition, full shooting chance cooperation contribution addition, swift attack cooperation contribution addition, full swift attack cooperation contribution addition, possession acquisition contribution addition, free throw possession ability contribution addition, full possession acquisition contribution addition, possession acquisition-side contribution addition, score record acquisition contribution addition, opponent teamwork degeneracy contribution addition, opponent team formation obstruction contribution addition, opponent defense disturbance contribution addition and right shooting timing contribution addition;

detailed items of the attack subtraction game factor unit include point acquisition cancellation error subtraction, direction team-moral degeneracy error subtraction, indirect team moral degeneracy error subtraction, possession-possible chance removal error subtraction, possession loss providing error subtraction, indirect possession loss providing error subtraction, possession loss-possible providing error subtraction, possible losing point providing error subtraction, indirect possible losing point providing error subtraction, full possible losing point providing error subtraction, score-possible removal error subtraction, indirect score-possible removal error subtraction, full score chance dissipation error subtraction, indirect score chance dissipation error subtraction, general full score chance dissipation error subtraction, general indirect score chance dissipation error subtraction, game basic capability lack error subtraction, score addition chance dissipation error subtraction, victory factor removal error subtraction, unreasonable shooting attempt error subtraction, right shooting timing lack error subtraction, teamwork cooperation lack error subtraction, full teamwork cooperation lack error subtraction, positive participation lack error subtraction, full positive participation lack error subtraction, prediction ability lack error subtraction, personal defense shrinkage load error subtraction, team member personal defense shrinkage load error subtraction, team defense shrinkage degeneracy error subtraction, teamwork lowering fostering error subtraction, teamwork formation obstruction error subtraction, instant chance cooperation lack error subtraction, opponent swift attack-possible chance assignment error subtraction and opponent free throw-possible assignment error subtraction;

detailed items of the defense addition game factor unit include full possible losing point dissipation contribution addition, possible losing point dissipation contribution addition, full losing point allowance dissipation contribution addition, possession acquisition-possible assignment contribution addition, shooting fail factor assignment contribution addition, full shooting fail factor assignment contribution addition, shooting mental shrinkage contribution addition, counter team morale lowering contribution addition, direct the other party morale lowering contribution addition, possible losing point previous removal contribution addition, game rhythm interception contribution addition, teamwork stability opponent assignment contribution addition, losing point minimum-possible assignment contribution addition, optimal defense ability contribution addition, full optimal defense ability contribution addition, defense positive participation contribution addition, full defense positive participation contribution addition, teamwork assistance contribution addition, error inducing factor assignment contribution addition, full error-inducing assignment contribution addition, score chance-possible assignment contribution addition, full score-possible assignment contribution addition, the other party personal defense shrinkage contribution addition, opponent team defense shrinkage contribution addition, defense confusion recovery contribution addition, possession acquisition contribution addition, opponent teamwork formation obstruction contribution addition, opponent team member formation obstruction contribution addition, swift attack-possible chance providing contribution addition and positive sacrifice participation contribution addition; and detailed items of the defense subtraction game factor unit include minimum self-blame losing point assignment error subtraction, full self-blame losing point assignment error subtraction, full self-blame possible losing point error subtraction, maximum self-blame losing point assignment error subtraction, countermeasure absence losing point error subtraction, countermeasure absence possible losing point error subtraction, countermeasure absence-inducing error subtraction, assistance self-blame losing point-considered error subtraction, assistance self-blame-possible losing point-considered error subtraction, situation coping ability lack error subtraction, assistance coping ability lack error subtraction, basic defense ability lack error subtraction, indirect opponent team morale-inspired error subtraction, direct opponent team morale-inspired error subtraction, personal defense shrinkage error subtraction, personal defense shrinkage fostering error subtraction, team defense shrinkage fostering error subtraction, mentality control ability lack error subtraction, opponent teamwork consolidation chance providing error subtraction, teamwork collapse curse providing error subtraction, possible losing point increase-induced error subtraction, game flow prevention ability lack error subtraction, team-pattern confusion assignment error subtraction and team member formation difficulty providing error subtraction.

5. The method as claimed in claim 3, wherein in step (b), the game situation factors for the items of the attack addition game factors, the items of the attack subtraction game factors, the items of the defense addition game factors, and the items of the defense subtraction game factors are divided into 7 items, 13 items, 21 items, 5 items, 9 items, 12 items and 4 items, the 7 items are a contribution in a disadvantageous point situation of lower than −7 or in an advantageous point situation of over +7, a contribution in a disadvantageous point seesaw approach situation of −6 to −4, a contribution in an advantageous point seesaw approach situation +6 to +4, a contribution in a disadvantageous point seesaw situation of −1 to −3, a contribution in an advantageous point seesaw situation of +1 to +3 and a contribution in a tie situation;

the 13 items are a contribution in a disadvantageous point situation of lower than −7, a contribution in an advantageous situation of over +7, a disadvantageous point seesaw approach of −6 to −4 entry possible contributions in an advantageous point situation of lower than −7, a disadvantageous point situation of over +7 entry-possible contributions in a disadvantageous point seesaw approach situation of +6 to +4, a contribution within a disadvantageous point seesaw approach of −6 to −4 in disadvantageous point seesaw approach situation of −6 to −4, a possible contribution within a disadvantageous point seesaw approach of +6 +4 in a seesaw approach situation of +6 to +4, a disadvantageous point seesaw situation of −1 to −3 entry-possible contributions in an advantageous point seesaw approach situation of −6 to −4, a disadvantageous point seesaw approach situation of +6 to +4 entry-possible contributions in a disadvantageous point seesaw situation of +1 to +3, a possible contribution within a disadvantageous point seesaw situation of −1 to −3 in a disadvantageous point seesaw situation of −1 to −3, a possible contribution within a disadvantageous point seesaw situation of +1 to +3 in a disadvantageous point seesaw situation of +1 to +3, a tie situation entry-possible contribution in a disadvantageous point seesaw situation of −1 to −3, a disadvantageous point seesaw situation of +1 to +3entry-possible contributions in a tie situation, and disadvantageous point seesaw situation of +1 to +3 entry-possible contribution in a disadvantageous point seesaw situation of −1 to −3;

the 21 items are Point in disadvantageous point situation of lower than −7, a Point in advantageous situation of over +7, a disadvantageous point seesaw approach from −6 to −4 entry points in an advantageous point situation of lower than −7, a disadvantageous point situation of over +7 points in a disadvantageous point seesaw approach situation of +6 to +4, a point within a disadvantageous point seesaw approach of −6 to −4 in an advantageous point seesaw approach situation of −6 to −4, a point within a disadvantageous point seesaw approach of +6 to +4 in a disadvantageous point seesaw approach of +6 to +4, a disadvantageous point seesaw situation of −1 to −3 points in a disadvantageous point seesaw approach situation of −6to −4, a disadvantageous point seesaw approach situation of +6 to +4 points in a disadvantageous point seesaw situation of +1 to +3, a point within a disadvantageous point seesaw situation of −1 to −3 in a disadvantageous point seesaw situation of −1 to −3, a point within a disadvantageous point seesaw situation of +1 to +3 in a disadvantageous point seesaw situation of +1 to +3 a tie situation point in a disadvantageous point seesaw situation of −1 to −3, a disadvantageous point seesaw situation of +1 to +3 points in a tie situation, a disadvantageous point seesaw situation of +1 to +3 points in a disadvantageous point seesaw situation of −1 to −3 a tie point simultaneously with attack time end or quarter end in a disadvantageous seesaw situation of −1 to −3, a reverse point simultaneously with attack time end or quarter end in a disadvantageous seesaw situation of −1 to −3, a reverse point simultaneously with attack time end or quarter end in tie situation, a tie point in last attack with game end time being left several seconds in a disadvantageous seesaw situation of −1 to −3, a reverse point in last attack with game end time being left several seconds in a tie situation, a tie point simultaneously with game end buzzer in a disadvantageous seesaw situation of −1 to −3, a reverse point simultaneously with game end buzzer in a disadvantageous seesaw situation of −1 to −3 and a reverse point simultaneously with game end buzzer in tie situation;

the 5 items are one foul record, a second foul record, a third foul record, a fourth foul record and a walkout foul record;

the 9 items are walk-out in extra game and one or more participation stops, walk-out after five minutes in the fourth quarter, walk-out before five minutes in the fourth quarter, walk-out after five minutes in the third quarter, walk-out before five minutes in the third quarter, walk-out after five minutes in the second quarter, walk-out before five minutes in the second quarter, walk-out after five minutes in the first quarter, and walk-out before five minutes in the first quarter;

the 12 items are a shooting error in a disadvantageous point situation of lower than −7, a shooting error in an advantageous point situation of over +7, a shooting error in a disadvantageous point seesaw approach situation of −6 to −4, a shooting error in a disadvantageous point seesaw approach situation of +6 to +4, a shooting error in a disadvantageous point seesaw situation of −1 to −3, shooting error in a disadvantageous point seesaw situation of +1 to +3, a shooting error in a tie situation, tie shooting error in a last attack with several seconds being left before a game ends in a disadvantageous point seesaw situation of −1 to −3, reverse point shooting error in the last attack with several seconds being left before a game ends in a tie situation, a tie shooting error simultaneously with a game end buzzer in a disadvantageous seesaw situation of −1 to −3, reverse point shooting error simultaneously with a game end buzzer in a disadvantageous seesaw situation of −1 to −3, and reverse point shooting error simultaneously with a game end buzzer in a tie situation; and the 4 items are an advantageous and disadvantageous situation of ±7 points, an advantageous and disadvantageous seesaw approach situation of ±6 to ±4 points, an advantageous and disadvantageous seesaw situation of ±3 to ±1 points, and contribution in a tie situation.

\* \* \* \* \*